(12) United States Patent
Martin et al.

(10) Patent No.: US 11,829,114 B2
(45) Date of Patent: Nov. 28, 2023

(54) SYSTEMS AND METHODS OF HIERARCHICAL SMART ASSET CONTROL AND INDUSTRIAL SYSTEM OPTIMIZATION

(71) Applicant: SCHNEIDER ELECTRIC SYSTEMS USA, INC., Foxboro, MA (US)

(72) Inventors: Peter G Martin, N. Carver, MA (US); Donald C Clark, Amesbury, MA (US); Richard L Linscott, Plainville, MA (US)

(73) Assignee: SCHNEIDER ELECTRIC SYSTEMS USA, INC., Foxboro (MA)

(*) Notice: Subject to any disclaimer, the term of this patent is extended or adjusted under 35 U.S.C. 154(b) by 363 days.

(21) Appl. No.: 15/767,821

(22) PCT Filed: Oct. 12, 2016

(86) PCT No.: PCT/US2016/056679
§ 371 (c)(1),
(2) Date: Apr. 12, 2018

(87) PCT Pub. No.: WO2017/066348
PCT Pub. Date: Apr. 20, 2017

(65) Prior Publication Data
US 2018/0299849 A1    Oct. 18, 2018

Related U.S. Application Data

(60) Provisional application No. 62/240,742, filed on Oct. 13, 2015, provisional application No. 62/279,224, filed on Jan. 15, 2016, provisional application No. 62/354,667, filed on Jun. 24, 2016, provisional application No. 62/406,926, filed on Oct. 11, 2016.

(51) Int. Cl.
*G05B 19/4069*  (2006.01)
*G05B 19/042*   (2006.01)
(Continued)

(52) U.S. Cl.
CPC ......... *G05B 19/0426* (2013.01); *G05B 15/02* (2013.01); *G05B 19/056* (2013.01);
(Continued)

(58) Field of Classification Search
CPC .............. G05B 19/0426; G05B 19/056; G05B 19/4069; G05B 2219/23005; G05B 2219/23261; G05B 2219/23293
(Continued)

(56) References Cited

U.S. PATENT DOCUMENTS 3,876,872 A  4/1975  Spitz
4,607,325 A  8/1986  Horn
(Continued)

FOREIGN PATENT DOCUMENTS

WO   2017066350 A1   4/2017

OTHER PUBLICATIONS

Wang et al., "Agent-based Intelligent Control System Design For Real-time Distributed Manufacturing Environments" Agent-based Manufacturing Workshop—Autonomous Agents'98—Minneapolis/St. Paul, May 9-13, 1998, pp. 152-159 (Year: 1998).*
(Continued)

*Primary Examiner* — Emilio J Saavedra
(74) *Attorney, Agent, or Firm* — Locke Lord LLP

(57) ABSTRACT

Systems and methods of a Hierarchical Smart Asset Control Application development and Integrated Smart Asset Control System optimization are disclosed. In various embodiments, the system may develop a Hierarchical Asset Control Application and corresponding control hardware requirements. This can be used to create an Integrated Smart Asset Control System in order execute various processes for a set of equipment elements. The smart assets associated with the system may utilize intelligent agents to balance operational constraints and operational objects in order to determine
(Continued)

real-time optimized operational parameters for a process and implement the appropriate controls to facilitate achieving the improved operational objectives.

53 Claims, 49 Drawing Sheets

(51) Int. Cl.
  *G05B 15/02* (2006.01)
  *G05B 19/05* (2006.01)
(52) U.S. Cl.
  CPC .......... *G05B 19/4069* (2013.01); *G05B 2219/23005* (2013.01); *G05B 2219/23261* (2013.01); *G05B 2219/23293* (2013.01); *Y02P 90/02* (2015.11)
(58) Field of Classification Search
  USPC ....................................................... 700/275
  See application file for complete search history.

(56) References Cited

U.S. PATENT DOCUMENTS

| | | | | |
|---|---|---|---|---|
| 6,108,616 | A * | 8/2000 | Borchers | G05B 23/0213 700/51 |
| 9,454,647 | B1 * | 9/2016 | Richards | G06F 21/123 |
| 9,697,355 | B1 * | 7/2017 | Park | G06F 21/552 |
| 2003/0167265 | A1 * | 9/2003 | Corynen | G06Q 10/04 |
| 2003/0229482 | A1 | 12/2003 | Cook et al. | |
| 2008/0097630 | A1 | 4/2008 | Weatherhead et al. | |
| 2009/0077055 | A1 | 3/2009 | Dillon et al. | |
| 2011/0106277 | A1 | 5/2011 | Sayyar-Rodsari et al. | |
| 2012/0317058 | A1 | 12/2012 | Abhulimen | |
| 2013/0198847 | A1 * | 8/2013 | Sampigethaya | H04L 63/1433 726/25 |
| 2015/0039112 | A1 | 2/2015 | Resnick et al. | |
| 2015/0148919 | A1 * | 5/2015 | Watson | G06N 7/005 700/31 |
| 2016/0020955 | A1 * | 1/2016 | Bunch, Jr. | H04L 41/046 709/223 |
| 2018/0307192 | A1 | 10/2018 | Linscott et al. | |

OTHER PUBLICATIONS

Scheidt, "Intelligent Agent-Based Control" Johns Hopkins APL Technical Digest, vol. 23, No. 4 (2002), pp. 383-395 (Year: 2002).*
International Search Report for International Patent Application No. PCT/US2016/056679, dated Dec. 28, 2016, 2 pages.
Written Opinion of the International Searching Authority for International Patent Application No. PCT/US2016/056679, dated Dec. 28, 2016, 10 pages.
International Search Report and Written Opinion issued in PCT Application No. PCT/US2016/056681 dated Jan. 26, 2017, 7 pages.

* cited by examiner

|  | MANUAL | AUTOMATIC |
|---|---|---|
| PREDICTIVE | Manual predictive control | Automatic predictive control |
| FEEDBACK | Manual feedback control | Automatic feedback control |

*FIG. 4E*

| Intelligent Asset Template | |
|---|---|
| Element Name | Value |
| Asset Identification | |
| Asset Name | |
| Asset Category | |
| Asset Type | |
| Asset Model | |
| Asset Serial Number | |
| Asset Vendor | |
| Asset Application | |
| Industry Category | |
| Application Type | |
| Asset Site | |
| Asset Area | |
| Asset Process Cell | |
| Asset Unit | |
| Asset Equipment Module | |
| Asset Control Module | |
| Asset List of Supported States | |
| Asset Intelligent Agent Constraints | |
| Asset Intelligent Agent Availability | |
| Asset Intelligent Agent Criticality | |
| Asset Intelligent Agent Platform | |
| Asset Intelligent Agent Cyber-Security Rules | |
| Asset Intelligent Agent Characteristics | |
| Dynamic Memory Requirements | |
| Persistent Memory Requirements | |
| Operating System Characteristic | |
| Asset Application Constraints | |
| Asset Safety Constraint 1 | |
| ... Asset Safety Constraint N | |
| Asset Environmental Constraint 1 | |
| ... Asset Environmental Constraint N | |
| Asset Reliability Constraint 1 | |
| ... Asset Reliability Constraint N | |

SYSTEMS AND METHODS OF HIERARCHICAL SMART ASSET CONTROL AND INDUSTRIAL SYSTEM OPTIMIZATION

CROSS-REFERENCE TO RELATED APPLICATIONS

This application claims priority to and benefit from the following provisional patent applications: (1) U.S. Provisional Application Ser. No. 62/354,667 titled "Cyber Physical Systems" filed on Jun. 24, 2016, (2) U.S. Provisional Application Ser. No. 62/240,742 titled "Architecture For Connecting Objects In The Industrial Internet Of Things" filed on Oct. 13, 2015, (3) U.S. Provisional Application Ser. No. 62/279,224 titled "System And Methods For Device To Enterprise Level Intrinsic Control" filed on Jan. 15, 2016, (4) U.S. Provisional Application Ser. No. 62/406,926 titled "Systems And Methods Of Hierarchical Asset Control Application Development and Optimization" filed on Oct. 11, 2016. The entire contents of the aforementioned patent applications are expressly incorporated by reference herein.

BACKGROUND

Existing process control systems evolved out of the pneumatic and electronic analog control systems that preceded them. These early control systems were designed to provide process control functions for a control loop or a number of related control loops of a production process in an autonomous or semi-autonomous, but coordinated manner, with the coordination often being achieved through the appropriate settings of set points across the multiple controllers. As such the architecture of early control systems was aligned to the process flow of the production process with each control typically limited to the control of a very small component of the overall production flow of the operation. As a result, each controller could be reasonably applied to the component of the operation it was responsible to control.

With the introduction of digital computer technology as the delivery vehicle for process control, the potential scope of automatic coordinated control increased dramatically. But in order to make these emerging digital control systems market acceptable they were programmed to directly replicate the functionality and architecture of the analog systems that preceded them. To accomplish this, one solution provided a software configuration environment for process control based on "software blocks" to perform the exact functions of the analog control system components. As such, the control system architectures that evolved after the initial introduction of digital technologies were aligned to the process flows of the production operation and therefore were designed to be configured to control from a process-centric perspective. This alignment and architecture worked quite well for the last 60 years and has been the basis of process control system software design ever since.

Initially, the job of configuring the process control functions in these process-centric automation systems was effectively accomplished by the engineers in industrial plants who had configured the traditional analog control systems. This was because the control software was designed to replicate the functionality and components of analog control systems. The transfer of knowledge from analog to digital control was very effective.

The scope of control of many of the early digital control systems was typically about the same scope that had been implemented in analog systems. Perhaps, this was due to the fact that the specifications of control systems had been done with the thought being that an analog control system would be utilized or perhaps it was due to the comfort level of the engineers experienced using analog systems. In any case, as digital systems were introduced, the scope of control did not tend to expand to the potential offered by digital control systems. During this phase the limitations of process-centric designs did not become obvious.

Over time, as process control engineers became more proficient and comfortable using digital process control systems, a natural tendency arose to want to integrally control larger and larger operational domains with a single automation system. During the 1980s there was a push to control entire process units in a coordinated manner. Over time, a desire emerged to control entire plant areas, trains, and even entire plants utilizing a single coordinated control strategy. The belief was that the more unified and coordinated the control strategy could be across larger operational domains, the more efficient the operation would be. However, a significant limitation to the process-centric design of the automation systems surfaced that made implementation of such a strategy not feasible. A process-centric perspective of a few control loops or, perhaps even an entire process unit seemed manageable, but as the scope increased the complexity increased exponentially. A process-centric view over large operational domains presents complex and challenging coordinated control challenges as illustrated by the example piping and instrument diagram 100 of a partial operation depicted in FIG. 1. In fact, the complexity of the process-centric perspective was so extreme that only the industrial operations with huge central engineering functions continued to move toward large domain coordinated control. Most industrial operations continued to control their plants much in the same manner as they had during the analog control system period. As a result, much of the potential benefit of moving from analog to digital control was not realized.

A new class of control system known as Enterprise Control System (ECS) was designed in an effort to enable large domain coordinated control by combining the traditional digital control system technology with open industrial software. Although the combined architecture was a step forward, the process-centric approach to control strategy design still limited the effective scope of coordinated control strategies.

The process-centric design of traditional control software remained as a preferred way of developing control strategies by industrial and industrial automation suppliers. When batch control strategies became available, it helped simplify some of the complexities of the process centric automation and control systems. Batch control strategies require a low layer of process and logic control for the basic equipment and loops in a plant. But over this basic control is a higher level of batch control in which the control is oriented to the process units, trains, areas and the products being produced in them. Although the batch control strategies were much simpler than if they had been attempted through the strict process centric perspective, the complexity level associated with engineering, operating and maintaining the automation and control system remained relatively high. Moreover, the batch control strategies also did not address various challenges related to reliability and integrity of the system, for example, in the event of failure.

BRIEF DESCRIPTION OF THE DRAWINGS

FIG. 4E is a diagram illustrating example mechanisms of achieving control of a Hierarchical Asset Control Application in accordance with various embodiments of the present disclosure.

FIG. 8C is an illustration of an intelligent asset template used to determine a smart asset list for developing a Hierarchical Asset Control Application in accordance with various embodiments of the present disclosure.

DETAILED DESCRIPTION

Figure 1:
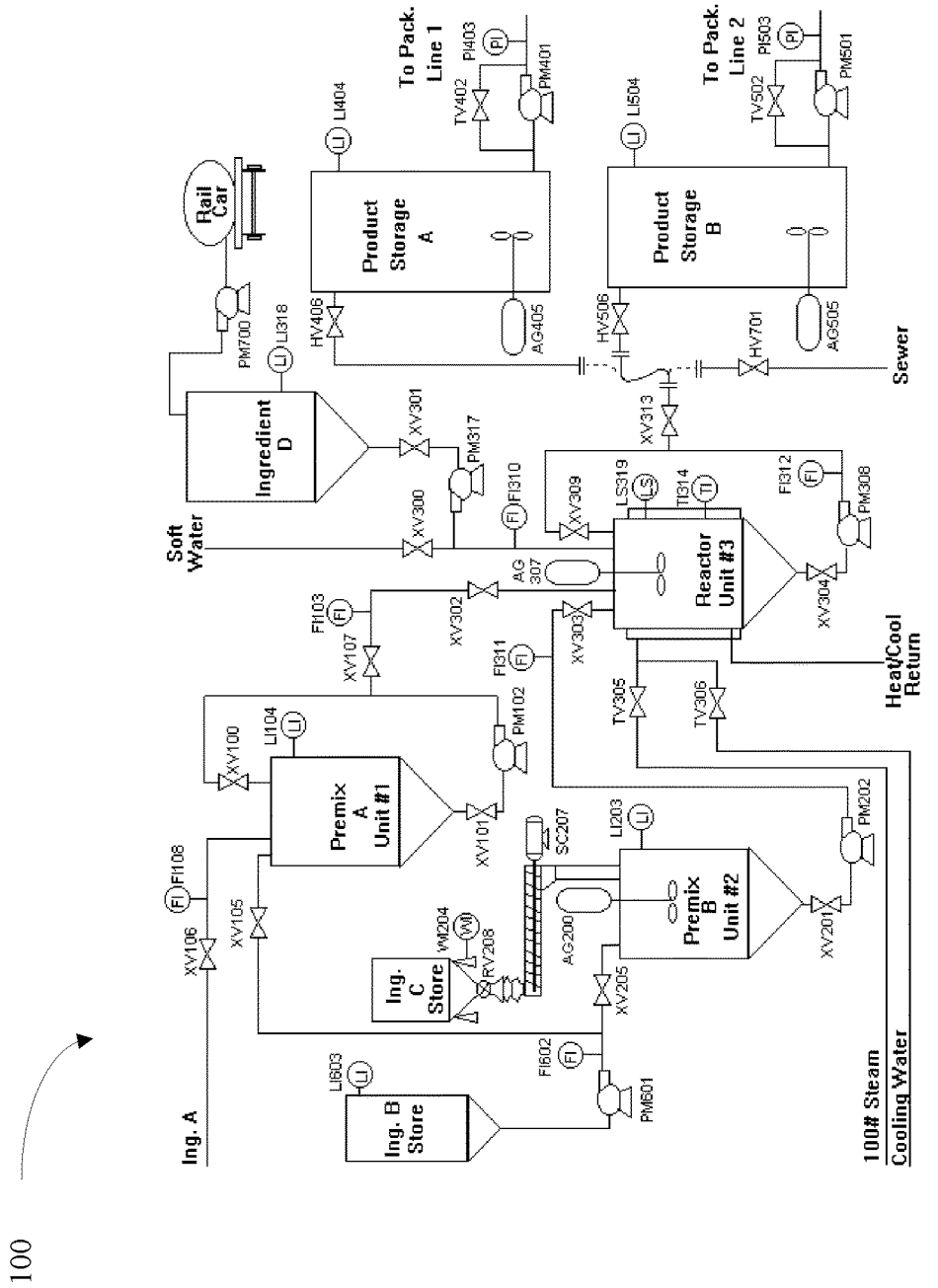
FIG. 1 is a diagram illustrating various equipment elements associated with an industrial system.

Embodiments of a method of Hierarchical Asset Control Application process development may comprise, accessing an equipment list; identifying industrial equipment elements; selecting an intelligent asset template from an intelligent asset template library to instantiate an intelligent agent for an equipment element; populating the selected template with operational constraints and operational objective data; and connecting iteratively, the instantiated intelligent agent to develop a Hierarchical Asset Control Application.

In some embodiments of the method, the populated selected intelligent asset template includes intelligent agent instantiation information, validation is performed on the Hierarchical Asset Control Application, simulation is performed on the Hierarchical Asset Control Application, corresponding control hardware requirements are based on the developed Hierarchical Asset Control Application, the developed Hierarchical Asset Control Application and the corresponding control hardware requirements are integrated with the equipment elements to create an Integrated Smart Asset Control System, and/or the Integrated Smart Asset Control System includes more than one smart asset control level.

In other embodiments the method may further comprise, aggregating one or more intelligent asset templates to instantiate an intelligent agent for incorporation with a smart asset, instantiating an intelligent asset template for a smart asset grouping for an intelligent asset template is instantiated for a smart asset set, and/or the intelligent asset template is configured to include application specific data.

In other embodiments the method may further comprise, determining asset operational library type and industry specific hierarchical control application default requirements, the intelligent asset application is developed as an intelligent agent for the particular equipment element control model, the intelligent asset template includes data parameters including, suggested asset interconnects with assets, operational constraints, operational objectives, high availability/criticality parameter, or industry specific industrial applications, the intelligent asset template includes vendor device-specific model information, and/or the intelligent asset template includes operational parameters from generic device type models.

In other embodiments the method may further comprise, determining operational constraint parameters including reliability, environmental, or safety, determining operational objective parameters including energy cost, materials cost, production value, or profitability, determining operational efficiency parameters, connecting iteratively includes grouping related smart assets into smart asset groupings that define parent/child control relationship across smart assets, and/or simulating the Hierarchical Asset Control Application involved generating virtualized equipment element data and executing process control elements.

Embodiments of a system of Hierarchical Asset Control Application process development may comprise, accessing, with a processor, an equipment list; identifying, with the processor, industrial equipment elements; selecting, with the processor, an intelligent asset template from an intelligent asset template library to instantiate an intelligent agent for an equipment element; populating, with the processor, the selected template with operational constraints and operational objective data; and connecting iteratively, with the processor, the instantiated intelligent agent to develop a Hierarchical Asset Control Application.

In some embodiments of the system, the populated selected intelligent asset template includes intelligent agent instantiation information, validation is performed on the Hierarchical Asset Control Application, simulation is performed on the Hierarchical Asset Control Application, corresponding control hardware requirements are based on the developed Hierarchical Asset Control Application, the developed Hierarchical Asset Control Application and the corresponding control hardware requirements are integrated with the equipment elements to create an Integrated Smart Asset Control System, and/or the Integrated Smart Asset Control System includes more than one smart asset control level.

In other embodiments the system may further comprise, aggregating one or more intelligent asset templates to instantiate an intelligent agent for incorporation with a smart asset, instantiating an intelligent asset template for a smart asset grouping for an intelligent asset template is instantiated for a smart asset set, and/or the intelligent asset template is configured to include application specific data.

In other embodiments the system may further comprise, determining asset operational library type and industry specific hierarchical control application default requirements, the intelligent asset application is developed as an intelligent agent for the particular equipment element control model, the intelligent asset template includes data parameters including, suggested asset interconnects with assets, operational constraints, operational objectives, high availability/criticality parameter, or industry specific industrial applications, the intelligent asset template includes vendor device-specific model information, and/or the intelligent asset template includes operational parameters from generic device type models.

In other embodiments the system may further comprise, determining operational constraint parameters including reliability, environmental, or safety, determining operational objective parameters including energy cost, materials cost, production value, or profitability, determining operational efficiency parameters, connecting iteratively includes grouping related smart assets into smart asset groupings that define parent/child control relationship across smart assets, and/or simulating the Hierarchical Asset Control Application involved generating virtualized equipment element data and executing process control elements.

Other embodiments of a method of Hierarchical Asset Control Application process development may comprise, accessing an equipment list; identifying industrial equipment elements; selecting an intelligent asset template from an intelligent asset template library to instantiate an asset application model for an equipment element; populating the selected template with operational constraints and operational objective data; connecting iteratively, the instantiated asset application models to develop a Hierarchical Asset Control Application; and wherein the populated selected intelligent asset template includes intelligent agent instantiation information.

Embodiments of a method of Integrated Smart Asset Control System optimization, may comprise, accessing asset automation operational process parameters associated for an asset within an Integrated Smart Asset Control System; developing a multi-faceted dynamic process constraints accounting for operational constraints associated with the automation operational process; evaluating a multi-faceted dynamic process constraint model to balance operational process constraints and process objectives; determining an optimized process operation point for the multi-faceted dynamic process constraints; determining a hierarchical smart asset control action utilizing the optimized process operation point; and executing the hierarchical smart asset control action to transition from current operational values to operational values to achieve the balanced operational constraints.

In other embodiments the method may comprise, wherein the operational constraints are developed by a smart asset associated with a smart asset group within the Integrated Smart Asset Control System, the hierarchical asset control actions effectuate control change of a smart asset associated with the Integrated Smart Asset Control System, determining an optimized process operation point is based on reliability, safety, and environmental process operational constraints, optimized process operation point determination is achieved based on asset constraint aggregation across each smart asset in a smart asset grouping, the reliability constraint is determined for the smart asset set is determined utilizing a reliability risk model, the real time reliability constraint is defined as: RT Reliability Risk=MAX (Operational Reliability Risk, Conditional Reliability Risk, Reliability Safety Risk), the environmental constraint is determined for the smart asset set is determined utilizing an environmental risk model, the real time reliability constraint is defined as: RT Environmental Risk=MAX (Operational Environmental Risk, Conditional Environmental Risk, Reliability Environmental Risk), the safety constraint is determined for the smart asset set is determined utilizing a safety risk model, the real time reliability constraint is defined as: RT Safety Risk=MAX (Operational Safety Risk, Conditional Safety Risk, Reliability Safety Risk), access to a smart asset is dynamically controlled based on aggregated real time security data, and/or the aggregated real time security data includes both Integrated Smart Asset Control System specific and external security data.

In other embodiments the method may comprise, determining an optimized process operation point is derived utilizing linear analysis, the development of the multi-faceted process constraint is derived utilizing non-linear analysis, the hierarchical smart asset control action instructs a parametric operational state for a smart asset or group of smart assets, the hierarchical smart asset control action instructs a parametric operational set point for a smart asset or group of smart assets, the hierarchical smart asset control action instructs a parametric operational constraint threshold for a smart asset or group of smart assets, the accessing smart asset automation operational process parameters associated with a hierarchical smart asset system/group is retrieved from a data store, and/or the operational process parameters include historic or real time data.

In other embodiments the method may comprise, aggregating smart asset operational data; and using smart asset operational data to improve efficiency or prospective process command selections.

Embodiments of a system of Integrated Smart Asset Control System optimization, may comprise, accessing, with a processor, asset automation operational process parameters associated for an asset within an Integrated Smart Asset Control System; developing, with the processor, a multi-faceted dynamic process constraints accounting for operational constraints associated with the automation operational process; evaluating, with the processor, a multi-faceted dynamic process constraint model to balance operational process constraints and process objectives; determining, with the processor, an optimized process operation point for the multi-faceted dynamic process constraints; determining, with the processor, a hierarchical smart asset control action utilizing the optimized process operation point; and executing, with the processor, the hierarchical smart asset control action to transition from current operational values to operational values to achieve the balanced operational constraints.

In other embodiments the system may comprise, wherein the operational constraints are developed by a smart asset associated with a smart asset group within the Integrated Smart Asset Control System, the hierarchical asset control actions effectuate control change of a smart asset associated with the Integrated Smart Asset Control System, determining an optimized process operation point is based on reliability, safety, and environmental process operational constraints, optimized process operation point determination is achieved based on asset constraint aggregation across each smart asset in a smart asset grouping, the reliability constraint is determined for the smart asset set is determined utilizing a reliability risk model, the real time reliability constraint is defined as: RT Reliability Risk=MAX (Operational Reliability Risk, Conditional Reliability Risk, Reliability Safety Risk), the environmental constraint is determined for the smart asset set is determined utilizing an environmental risk model, the real time reliability constraint is defined as: RT Environmental Risk=MAX (Operational Environmental Risk, Conditional Environmental Risk, Reliability Environmental Risk), the safety constraint is determined for the smart asset set is determined utilizing a safety risk model, the real time reliability constraint is defined as: RT Safety Risk=MAX (Operational Safety Risk, Conditional Safety Risk, Reliability Safety Risk), access to a smart asset is dynamically controlled based on aggregated real time security data, and/or the aggregated real time security data includes both Integrated Smart Asset Control System specific and external security data.

In other embodiments the system may comprise, determining an optimized process operation point is derived utilizing linear analysis, the development of the multi-faceted process constraint is derived utilizing non-linear analysis, the hierarchical smart asset control action instructs a parametric operational state for a smart asset or group of smart assets, the hierarchical smart asset control action instructs a parametric operational set point for a smart asset or group of smart assets, the hierarchical smart asset control action instructs a parametric operational constraint threshold for a smart asset or group of smart assets, the accessing smart asset automation operational process parameters associated with a hierarchical smart asset system/group is retrieved from a data store, and/or the operational process parameters include historic or real time data.

In other embodiments the system may comprise, aggregating smart asset operational data; and using smart asset operational data to improve efficiency or prospective process command selections.

Other embodiments of a method of Integrated Smart Asset Control System optimization may comprise, accessing smart asset automation operational process parameters; developing multi-faceted dynamic constraints at a smart asset level accounting for operational constraints associated with the automation operational process; evaluating multi-faceted dynamic process constraint model for the smart asset to balance operational process constraints and process objectives; determining an optimized process operation point for the smart asset for the multi-faceted dynamic process constraints; transmitting data elements request by a parent used in part by the parent to determine a smart asset control action for the child smart asset; receiving a smart asset control action generated from the optimized process operation point; and executing the hierarchical smart asset control action to transition from current operational values to operational values to achieve the balanced operational constraints.

1. Hierarchical Asset Control Application Development

An industrial equipment operation/process is fundamentally a grouping of equipment elements organized in a particular way working together to execute a process. The ANSI/ISA-88 standard is one methodology for organizing plant equipment In contrast to the process-centric model discussed above, in accordance with the present disclosure, a hierarchical view of the operation/process can be developed as a hierarchical collection of assets, rather than a single control "process." By modeling individual assets and groups of assets across a hierarchy, significant gains in efficiencies and efficacies may be achieved through increased granular control resolution. Such an asset-centric view of control facilitates development and execution of a unified control strategy for the industrial equipment operation/process without the drawbacks of the traditional process-centric control development approach.

The following description of the figures illustrates how underlying equipment elements for an industrial system is used to develop a Hierarchical Asset Control Application and corresponding control hardware. Once the Hierarchical Asset Control Application and corresponding control hardware are validated, they can be integrated with the underlying equipment elements to create an Integrated Smart Asset Control System that effectively and efficiently executes an industrial process through hierarchical control of smart asset and smart asset groupings. In some implementations, the Integrated Smart Asset Control System may be controlled and managed to optimize a variety of operational constraints and/or objectives.

Figure 2A:
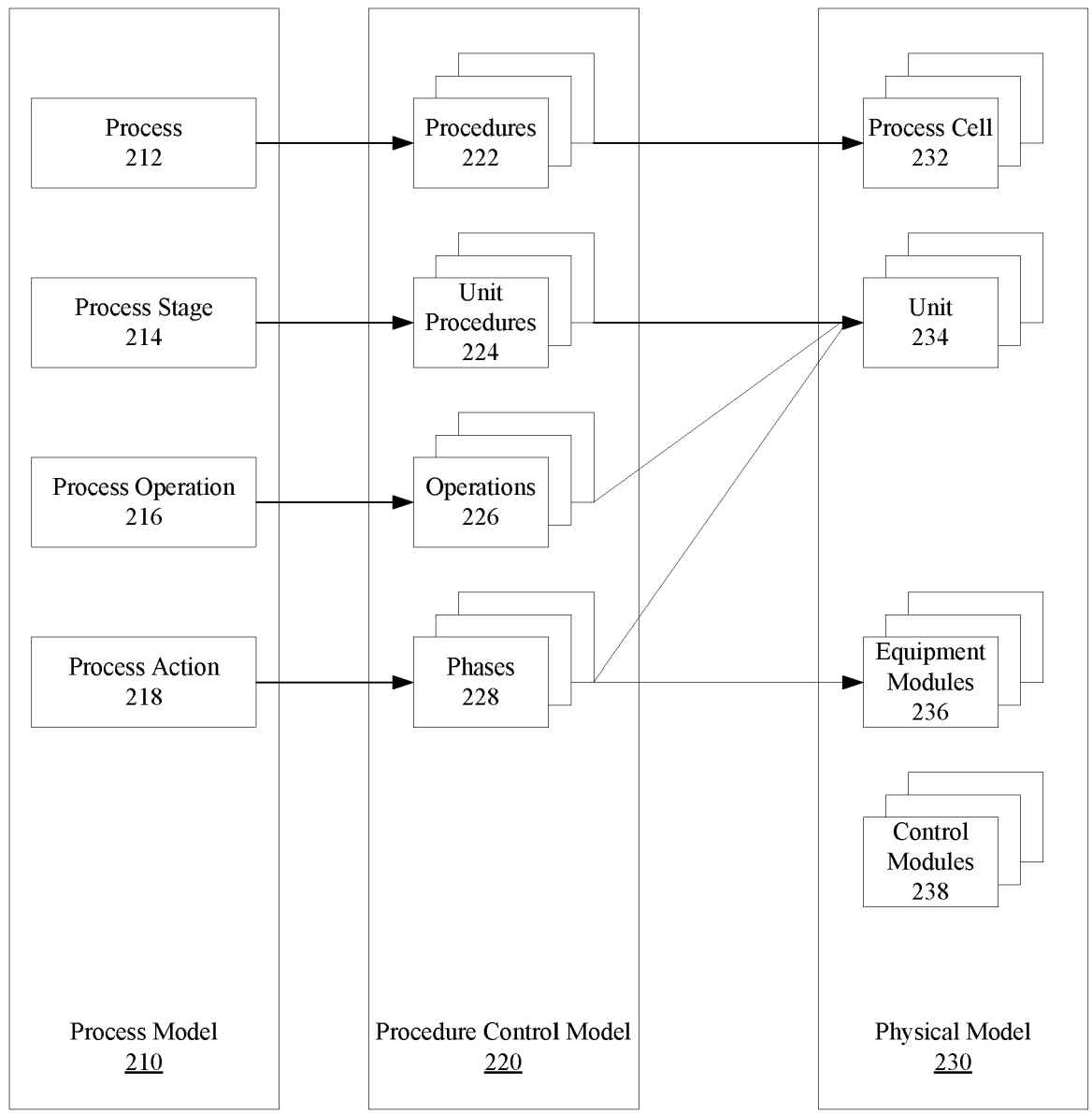
FIG. 2A is a diagram illustrating various embodiments of the ANSI/ISA-88 standard for describing lower level equipment elements and corresponding process/procedures groupings.

FIG. 2A illustrates various aspects of the ANSFISA-88 standard for describing equipment and process, process control procedures and equipment 200. The general relationship between the process model 210, the procedural control model 220, and the physical model 230 is illustrated. A process 212 is a sequence of activities for action to be taken on material or energy. A process stage 214 is part of a process that generally operates independently from other process stages. Process operation 216 is a processing activity that usually results in a change in the material being processed. Minor processing activities that are combined are a process action 218. A procedure 222 is the highest level in the procedure control model 220 hierarchy and defines the strategy for carrying out processing. Unit procedures 224 consists of an ordered set of operations. Operation 226 is an ordered set of phases that defines a processing sequence. The smallest element of procedural control is a phase 228. A process cell 232 is capable of orchestrating all processing activities. Units 234 coordinate the functions of the lower level entities. Equipment modules 236 coordinate the functions of other equipment modules. Control modules 238 are the lowest level group of equipment that can carry out control.

Figure 2B:
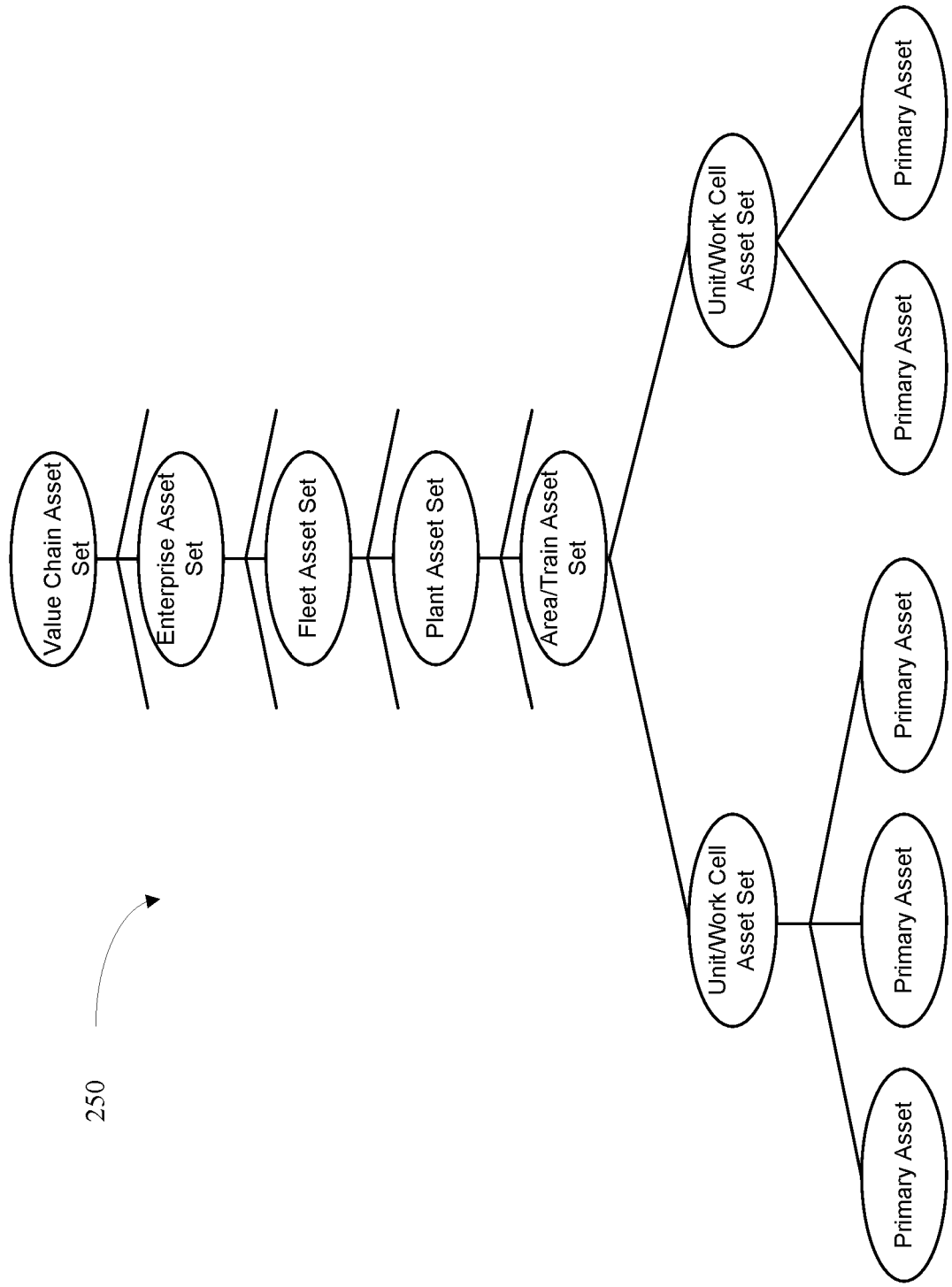
FIG. 2B is a diagram illustrating an industrial topology of an equipment elements.

FIG. 2B is a diagram illustrating a typical industrial topology 250 of an example industrial equipment operation/process in accordance with the present disclosure. Generally, the topology 250 is unique to an industrial operation as it describes the underlying equipment assets involved in the operation and how those assets interoperate to perform their functions and produce business output. As depicted, the topology 250 is hierarchical and includes primary assets at the lowest level. These primary assets combine into asset sets, which in turn combine into more complex asset sets and so on. For example, primary assets can combine into work cell asset sets (or process units) one level up. The work cell asset sets in turn can combine into area/train asset sets one level up. The area/train asset sets further combine into higher level sets called plant asset sets. The plant asset sets combine into fleet asset sets, which in turn combine into enterprise asset sets, and finally into value chain asset sets.

Figure 2C:
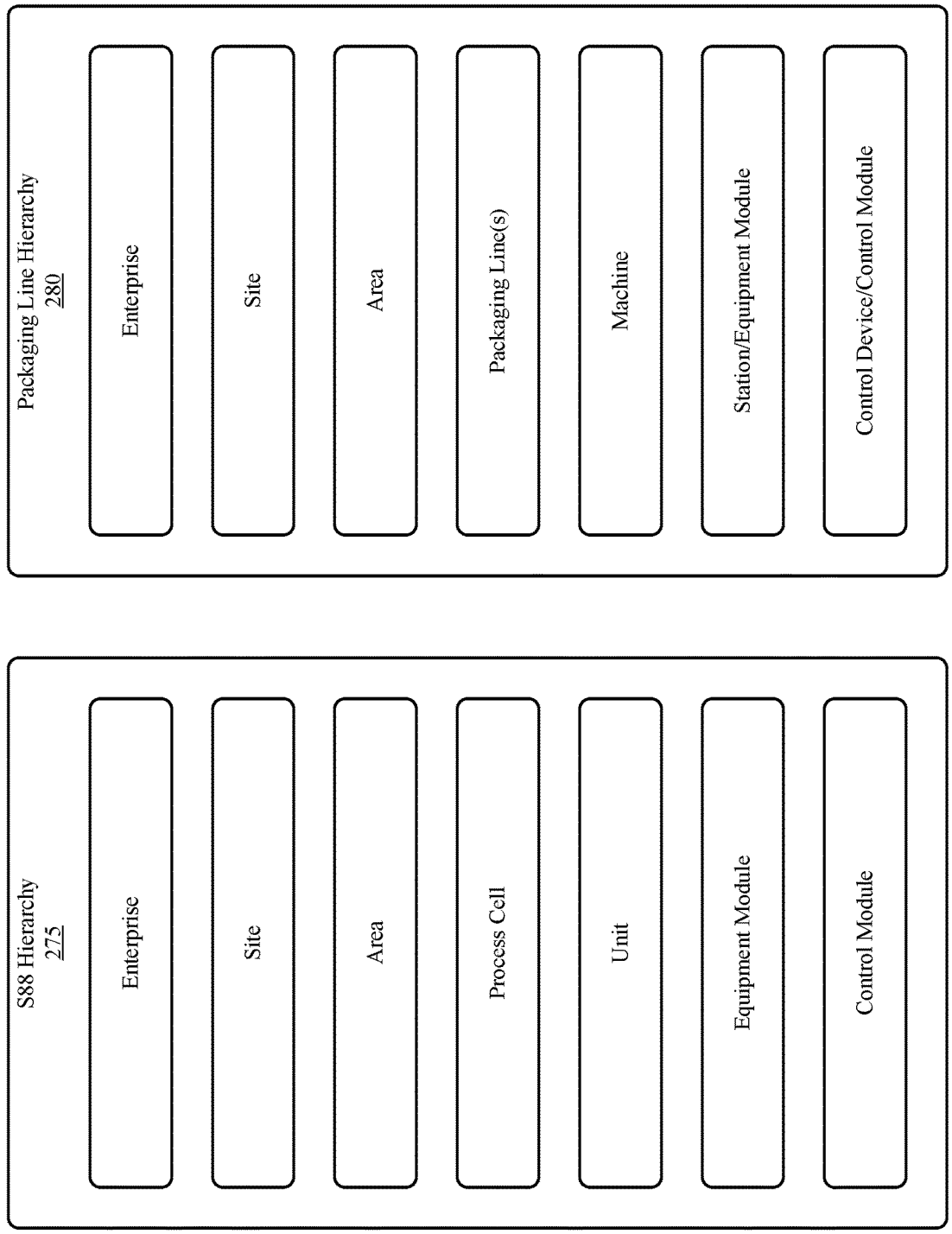
FIG. 2C is a diagram illustrating an extended example ANSI/ISA-88 physical equipment hierarchy/packaging line.

FIG. 2C, illustrates an example mapping of the ANSI/ISA-88 a physical equipment element hierarchy 275 with a packaging line hierarchy 280 is depicted.

Figure 5A:
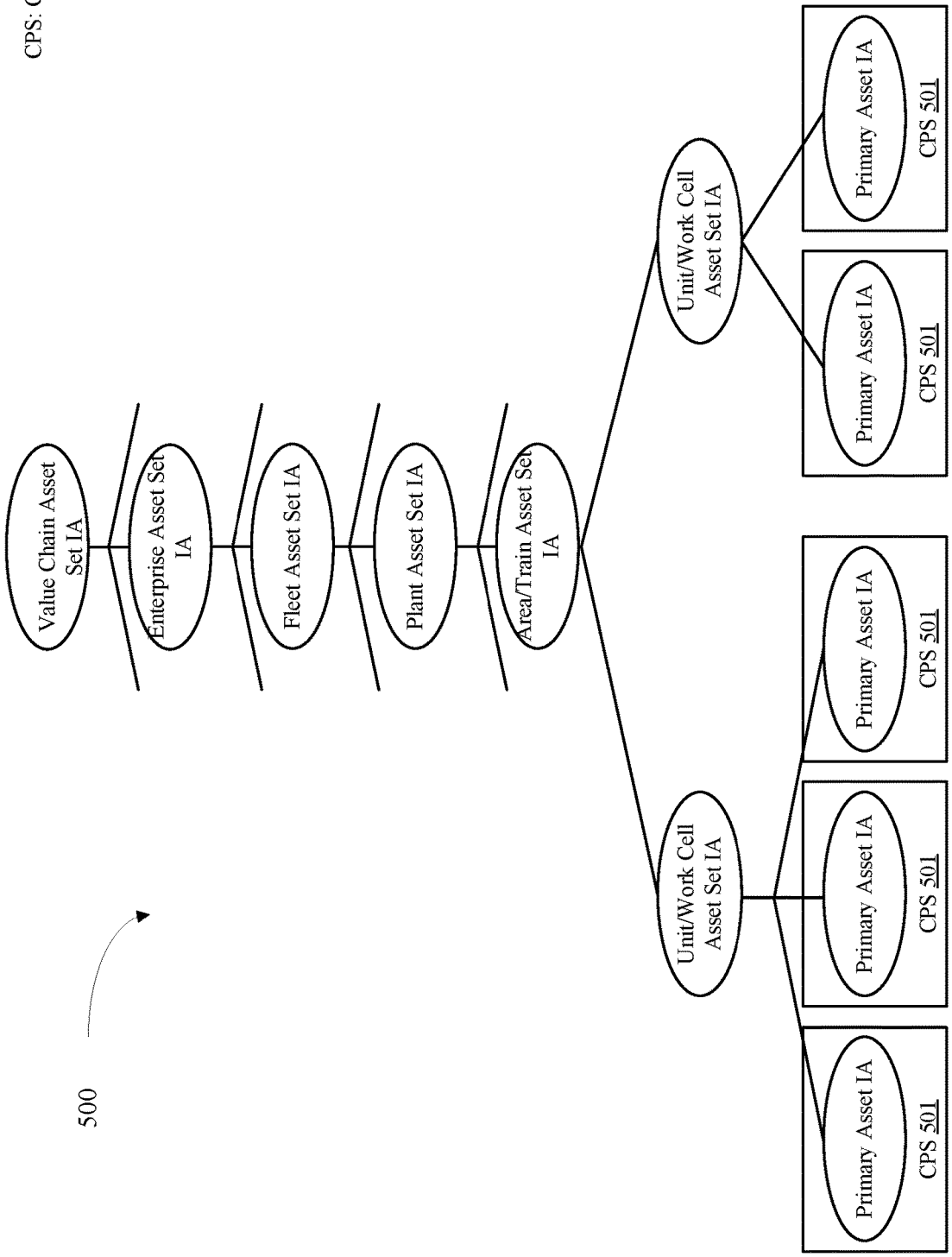
FIG. 5A is a diagram illustrating an implementation of an Integrated Smart Asset Control System (ISACS) in accordance with various embodiments of the present disclosure.
Figure 5B:
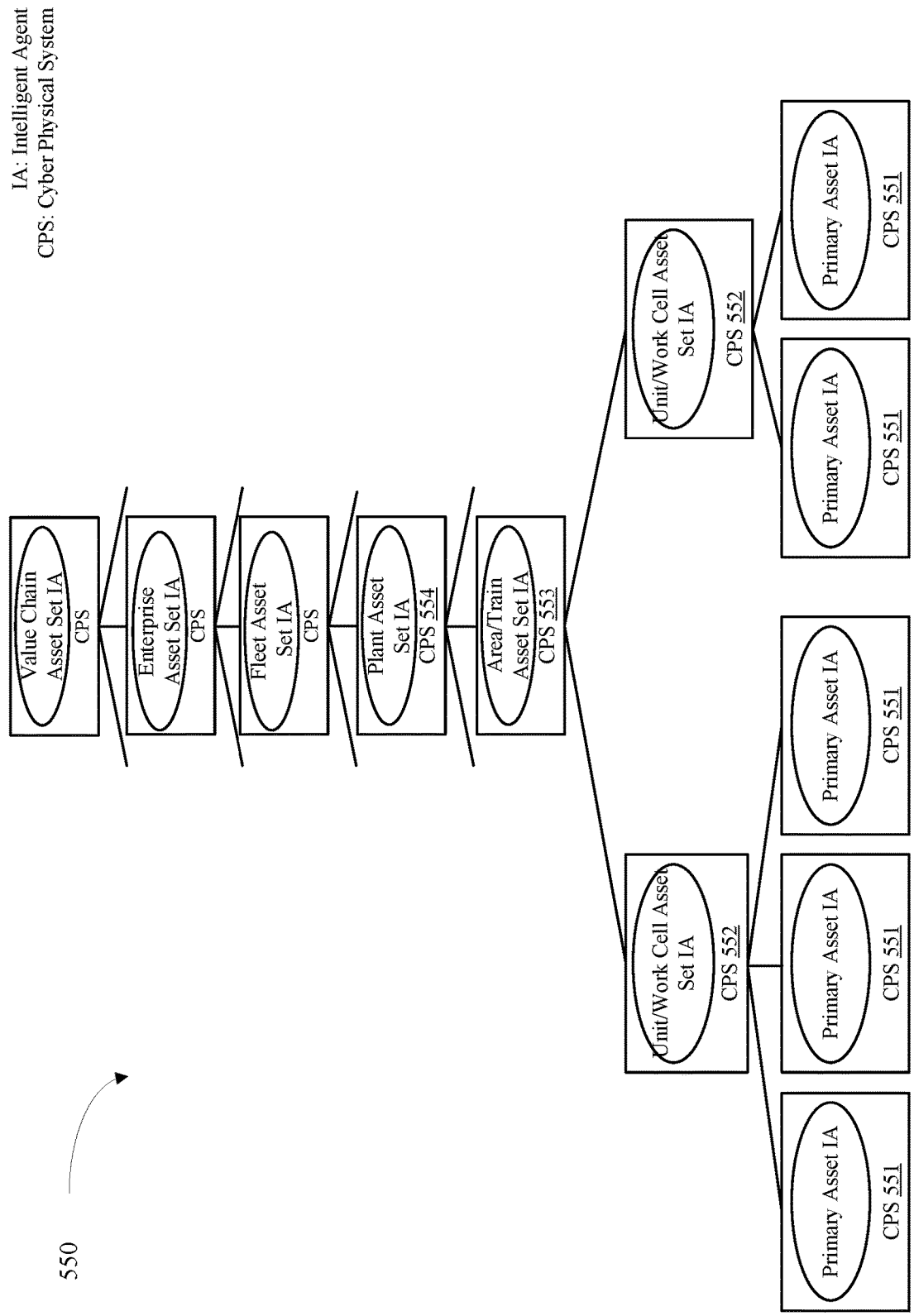
FIG. 5B is a diagram illustrating an implementation of an Integrated Smart Asset Control System in accordance with various embodiments of the present disclosure.

In accordance with the present disclosure, the Hierarchical Asset Control Application and corresponding control hardware are developed to facilitate optimized granular control of smart assets (described below) in contrast to the typical industrial equipment topology 200. In other words, automation system architecture can be developed for each industrial operation in a way that ensures the architect architecture and topology of the automation system closely corresponds to or matches with the architecture and topology of the industrial operation. This alignment between the two architectures simplifies the tasks of designing and maintaining automation systems by relevant users (e.g., engineers, maintenance personnel and operators) as those users do not need to understand and reconcile two differences in the underlying equipment architectures 200 and the development of the Hierarchical Asset Control Application and corresponding control hardware that are layered on top of and integrated with the typical industrial equipment topology 200. Diagrams of examples of smart asset Integrated Smart Asset Control System developed in accordance with the embodiments of the disclosure are illustrated in FIGS. 5A and 5B and developed using smart asset building blocks illustrated in FIGS. 3A, 3B, and 3C and described in greater detail below.

Figure 3A:
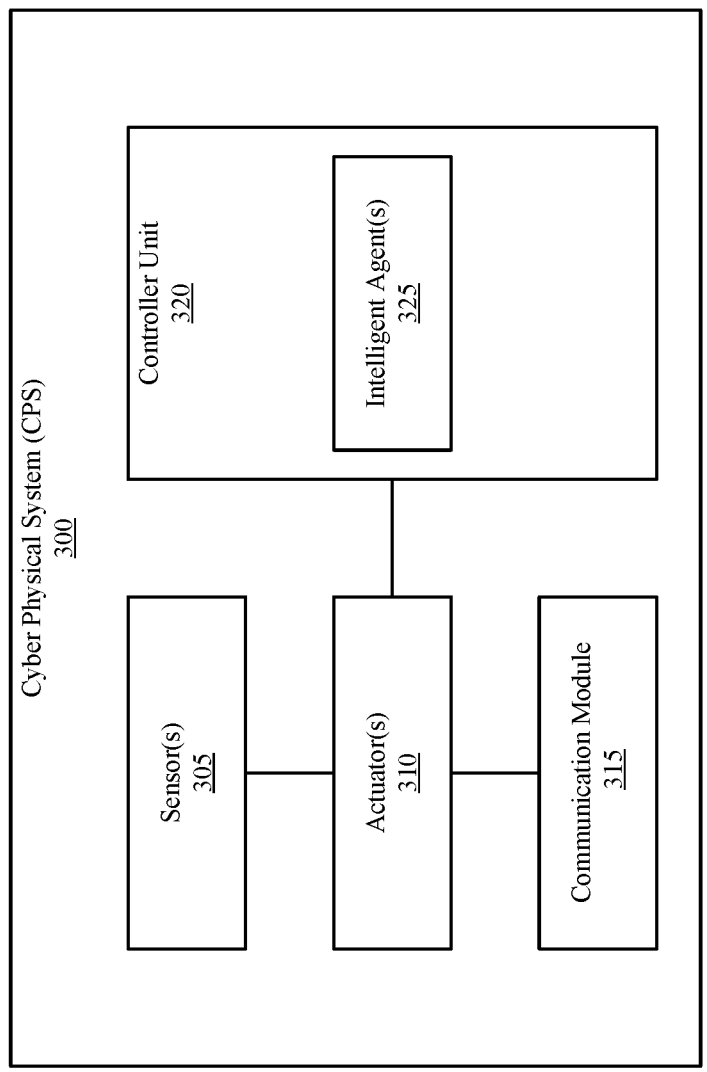
FIG. 3A is a diagram illustrating components of a Cyber Physical System (CPS) in accordance with various embodiments of the present disclosure.
Figure 3B:
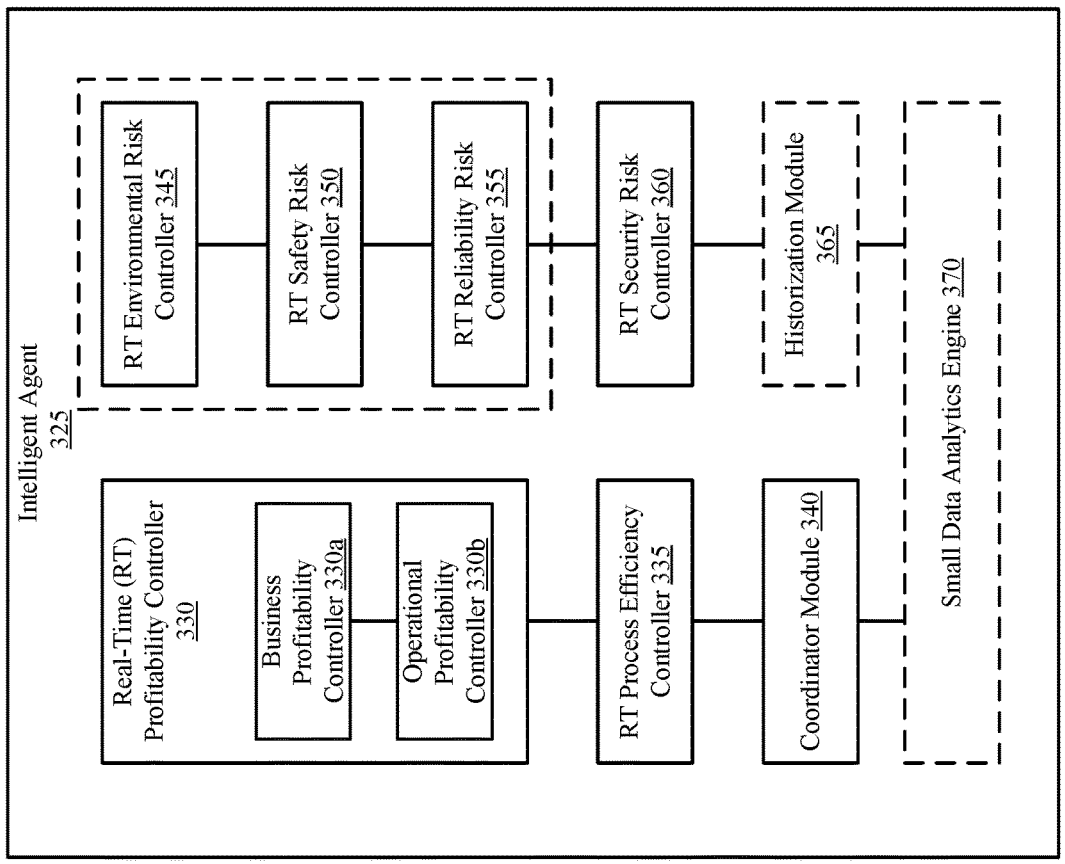
FIG. 3B is a diagram illustrating example components or controller modules for an intelligent agent in a CPS associated with a smart asset or smart asset grouping in accordance with various embodiments of the present disclosure.
Figure 3C:
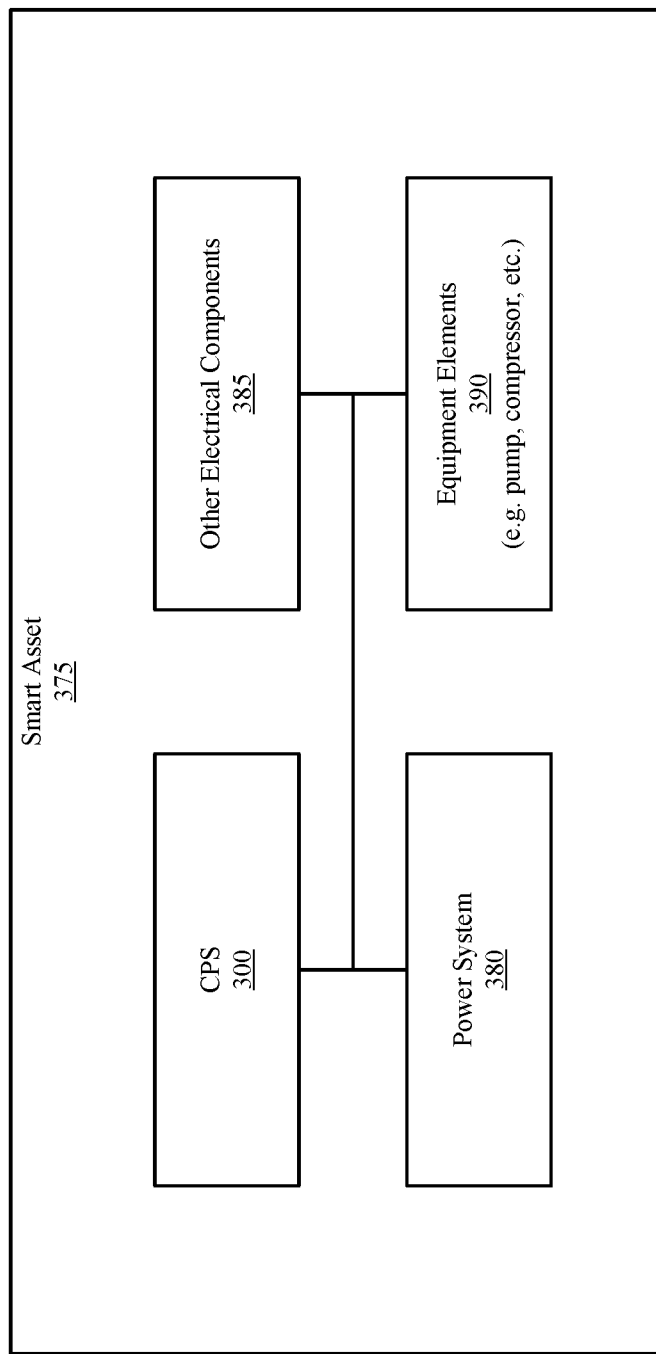
FIG. 3C is a diagram illustrating elements of a smart asset in accordance with various embodiments of the present disclosure.

An industrial operation, in accordance with the present disclosure, can be viewed as a collection of hierarchical smart assets, rather than a single "process." Such a hierarchical smart asset-centric view facilitates development and execution of a unified control strategy for the industrial operation without the drawbacks of the traditional process-centric approach. FIGS. 3A, 3B, and 3C illustrates aspects of smart assets that are the building blocks associated with developing a Hierarchical Asset Control Application and corresponding control hardware that facilitate granular controls and optimization, such as those described with regard to the example of FIGS. 4A, 4B, and 4C.

One aspect of developing a Hierarchical Asset Control Application and corresponding control hardware in accordance with the present disclosure involves utilizing a cyber-physical system (CPS) as a building-block element. A CPS is an autonomous or semi-autonomous control system including sensors and/or actuators and an associated hardware (e.g., a processor or a computer) capable of executing software code/modules in the form of intelligent agents (IAs) or "avatars" implementing measurement and control functions. FIG. 3A is a diagram illustrating example components of a CPS in accordance with some embodiments of the present disclosure. As depicted, a CPS 300 can include one or more sensors 305, one or more actuators 310, a controller unit 320 and a communication module 315 among other components. In some embodiments, a sensor 305 and an actuator 310 can be embodied in a single device or unit. The actuators 310 can be embedded or networked into a smart asset. One or more intelligent agents 325 in the controller unit 320 can implement a control strategy or algorithm to transform inputs such as measurement data from the one or more sensors 305 and any set points into an output signal to improve the operational efficiency and/or other characteristics of the smart asset. The communication module 315 can facilitate receiving of data from the one or more sensors 305 and sending of the output signal to the one or more actuators 310. In some embodiments, the communication module 315 can include a network interface that enables flow of data between the CPS 300 and other CPSs and/or higher level asset sets in the Integrated Smart Asset Control System. The network interface can include one or more of a network adaptor card, a wireless network interface card (e.g., SMS interface, Wi-Fi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater. In some embodiments, the communication module 315 can leverage the Internet of Things (IoT) data to combine with other CPSs to form part of an Integrated Smart Asset Control System that communicate with elements beyond the underlying industrial equipment, Hierarchical Asset Control Application and corresponding control hardware.

Extended control aspects of an Integrated Smart Asset Control System can be grouped into two general categories of real-time control as (1) operational objectives and (2) operational constraints. For example, providing real-time control for the basic objectives of a business such as profitability, operational profitability, and operational efficiency can be one category of operational objectives. The second category of operational constraints can provide real-time control on the dynamic constraints on the objectives such as safety risk, environmental risk, and security risk. FIG. 3B illustrates example components of an avatar or an intelligent agent 325 in a CPS associated with a smart asset or smart asset set for providing real-time control of the basic objectives of a business and dynamic constraints of objectives (i.e., real-time control over profitability, reliability, process efficiency, safety risk, environment risk, and security risk). In some embodiments, the intelligent agent 325 can include a RT profitability controller 330, a real time process efficiency controller 335, a real time reliability risk controller 355, a real time environmental risk controller 345 and a real time safety risk controller 350. In other embodiments, the intelligent agent 325 may also include a real time security risk controller 360. It should be noted that in some embodiments, the intelligent agent 325 may include more or less controllers (or control modules), thereby providing control over more or less domains depending on the particular implementation. In some embodiments, a coordinator module 340 may be included in the intelligent agent 325 for coordinating the execution of the controllers according to a control hierarchy associated with an Integrated Smart Asset Control System such as the one described in reference to FIG. 5B. In other embodiments, the intelligent agent 325 can include other modules besides the real time controllers. Examples of such modules can include, but are not limited to, a historization module 365 and a small (or big) data analytics engine 370. The real time controls facilitated by intelligent agent 325 make granular smart asset or smart asset grouping control possible for an Integrated Smart Asset Control System, it also facilitates Integrated Smart Asset Control System operational optimization and system management.

One aspect of the Integrated Smart Asset Control System development is the rapid implementation of avatars/intelligent agents corresponding to the underlying for plant equipment elements. Plants are made up of a large number of equipment elements to be monitored and controlled. For avatars/intelligent agents to fully monitor/manage data associated with various aspects of the plant equipment elements, (such as security, safety, environmental, reliability, performance, profitability, data and/or the like), a number of attributes associated with each smart asset can be considered and managed by an avatars/intelligent agent. In some embodiments, avatars/intelligent agents are developed by using general templates developed based on vendor provided operational specifications, operational characteristics can be created as a library and provided for types of plant equipment assets that allow a user to rapidly connect the equipment elements to the cyber avatars/instantiated intelligent agents to develop a Hierarchical Asset Control Application. In some implementations, higher level intelligent asset templates can connect the lower level smart assets together to form the higher level smart assets groupings to continue Hierarchical Asset Control Applications development.

FIG. 3C is a diagram that illustrates example components of a smart asset 375 in accordance with some embodiments of the present disclosure. The smart asset 375 can include a CPS 300 described in reference to FIG. 3A and other electrical components 385 (e.g., switches), a power system 380 and the underlying equipment element 390 (e.g., the mechanical hardware such as a pump, compressor, etc.). With the sensors, actuators, a controller including an intelligent agent, a communication module, the smart asset 375 via the intelligent agent can autonomously or semi-autonomously monitor and control its performance and operation. In some embodiments, the smart asset 375 can utilize the communication module including a network interface to connect to a communication network to communicate with other smart assets and smart asset sets, and/or report asset data, process data, asset health, alarms and events, and/or other data as appropriate for the particular application, to a remote computer or server system.

CPSs and intelligent agents enable design and development of a Hierarchical Asset Control Application and corresponding control hardware that can be integrated with the equipment elements of a typical industrial topology to create an Integrated Smart Asset Control System. With the decline in price, and power requirements and corresponding increase in memory and compute capability, and networkability, CPSs/intelligent agents can be integrated with each piece equipment element of a typical industrial topology at a smart asset and/or smart asset grouping levels to create, efficiently and effectively manage, control, and in some instances optimize the Integrated Smart Asset Control System. By aligning CPSs/intelligent agents with the smart assets and smart asset groupings, the overall control problem of an industrial operation can be partitioned into multiple smaller control problems for multiple autonomous or semi-autonomous control system components that can be networked together in flexible combinations. This breakdown of the control problem into smaller manageable pieces significantly reduces the complexity of the overall control problem and provides various other advantages that are discussed throughout this disclosure. Such an overall control system using a baseline of equipment elements from a typical industrial topology integrated with a hierarchy of smart assets and smart asset sets, each of which include an autonomous or semi-autonomous system comprising an intelligent agent to provide real time control for the smart asset, smart asset set, or another smart asset grouping is defined herein as an Integrated Smart Asset Control System (ISACS). FIGS. 5A and 5B illustrate examples of Integrated Smart Asset Control System hierarchical smart asset organization and are described in greater detail below.

Extended Control Hierarchy

Figure 4A:
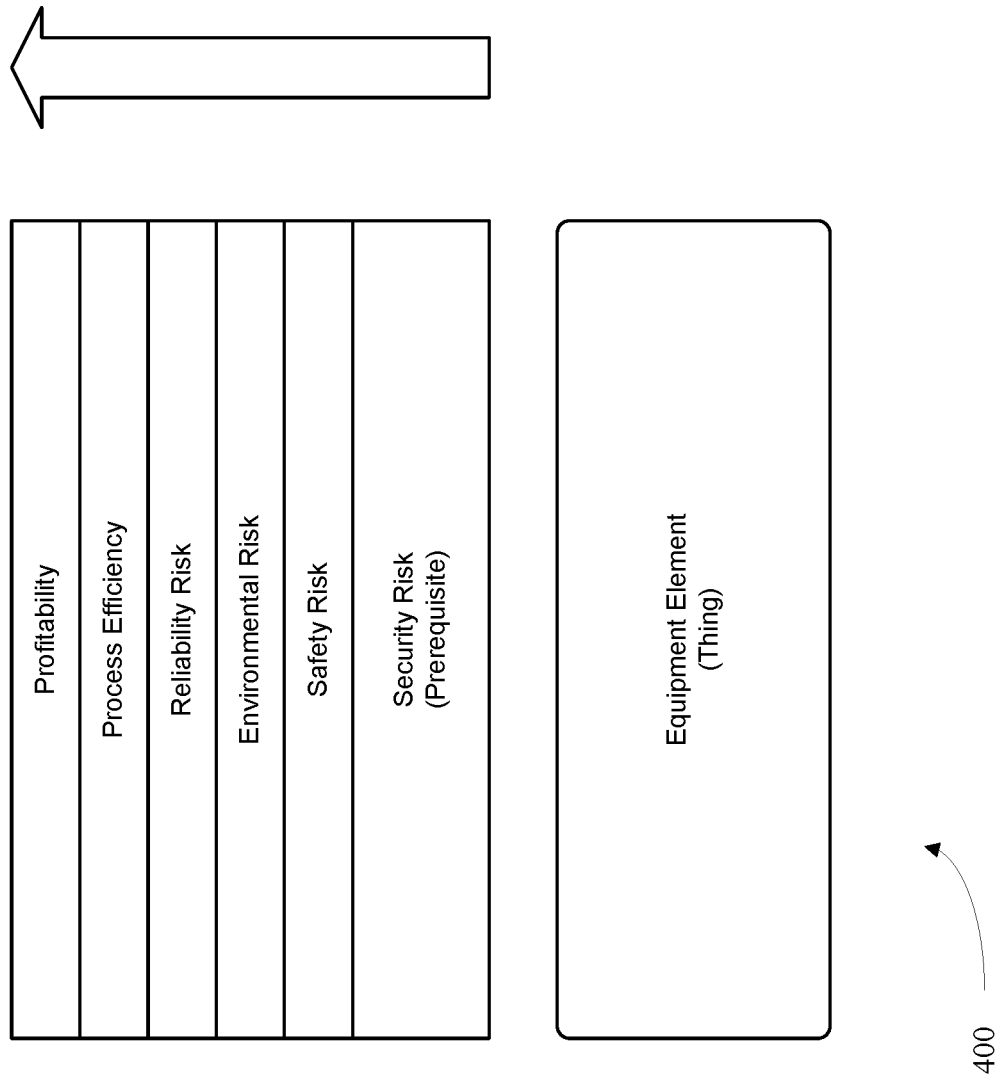
FIG. 4A is a diagram illustrating an extended control hierarchy for Hierarchical Asset Control Application implementations of real-time operational constraint/objective controls in accordance with various embodiments of the present disclosure.

An extended control hierarchy such as the one depicted in FIG. 4A can be developed for application of real-time controls in industrial operations. Once smart assets are created and implemented as a Hierarchical Asset Control Application in accordance with the embodiments of the disclosure described herein, smart management and optimization is significantly improved and granular operational objective and operational constraint control and optimization may be realized. FIG. 4A illustrates a spectrum of operational constraint/operational objective variables 400 that can be controlled/optimized for smart assets/groups of smart assets 375. It is to be understood that depending on the operational characteristics associated with a particular implementation, other prioritized spectrums are also possible. It is also possible to have the operational constraints and objectives variables 400 equally distributed for each smart asset-every smart asset has the ability to manage all the operational constraints and objective variables 400 as appropriate. As illustrated in FIG. 4A, an embodiment of prioritized operational constraints/objectives can be managed across each of the levels in the hierarchy or distributed and split across different levels of the hierarchy. For example, distributed constraint/objective management illustrated in FIG. 4A, involves security risk, being a prerequisite, and as such is controlled, managed and optimized at the lowest level in the hierarchy. Safety risk and environmental risk are located at the next lowest levels of the hierarchy, respectively, due to the critical nature of these two risks. Above safety risk and environment risk is asset reliability risk, since a reduction in reliability can result in reduced asset performance or even asset failure which would severely limit the value from the asset. Above reliability can be traditional process control for efficiency. Finally, where contextually appropriate, is real-time profitability control. Bringing each component of industrial operations into safety risk, environmental risk, reliability risk, efficiency and profitability control can help drive maximum value from each smart asset and form one way to optimize the Hierarchical Asset Control Application and corresponding control hardware. The Hierarchical Asset Control Application and corresponding control hardware, in some embodiments, applies the extended real-time controls to each equipment asset, unit/work cell, area/train, plant, fleet, enterprise and/or value chain. Accordingly, each smart asset and smart asset set or other smart asset grouping can operate in a safe, financially, and environmentally optimal manner. In this way, the entire enterprise and value chains can be brought under real time control and facilitates optimization of control and management in real time for several operational constraints/operational objectives.

2. Extended Real-Time Control

The Hierarchical Asset Control Application (HACA) as described above not only addresses the challenges associated with controlling the operational efficiency of industrial operations, but also facilitates implementation of a unified control strategy. Beyond operational efficiency, other new domains are in need of effective real-time control. In some embodiments, the Hierarchical Asset Control Application can be extended to effectively control these new domains such as, but not limited to: reliability risk, safety risk, environmental risk, and profitability.

It should be appreciated while various types and numbers of constraints, such as safety risk, and various types and numbers of objectives, such as real time operating profit are described herein, there are no limitations as to the type and number of constraints or objectives contemplated herein.

Traditionally, most of the variables associated with the measurement and management of the profitability of industrial operations changed infrequently. For example, in the past, industrial plant management could typically develop contracts with their electricity suppliers which effectively set the price per unit of electricity for up to a year. With the price constant for a year at a time there was no need to try to control it. Today, with the deregulation of electric power grids throughout the world, the price of electricity can and often does change on a much more frequent basis. For example, in the open power grid in the United States, the price can change every 15 minutes. In the United Kingdom, the price can change every 20 minutes. So, this business variable (i.e., price of electricity or energy cost) that had been more or less constant in the past is now experiencing real-time variation. This is also true in many regions of the world for natural gas, raw materials and production value (the value of products produced in an industrial operation). The traditional approach to trying to manage these business variables with monthly data generated by Enterprise Resource Planning (ERP) reports is no longer sufficient. The Hierarchical Asset Control Application can facilitate this transition in industry from being able to manage business variables in a transactional manner to real-time control by enabling extended real-time control in smart assets and smart asset sets or other smart asset groupings.

Figure 4B:
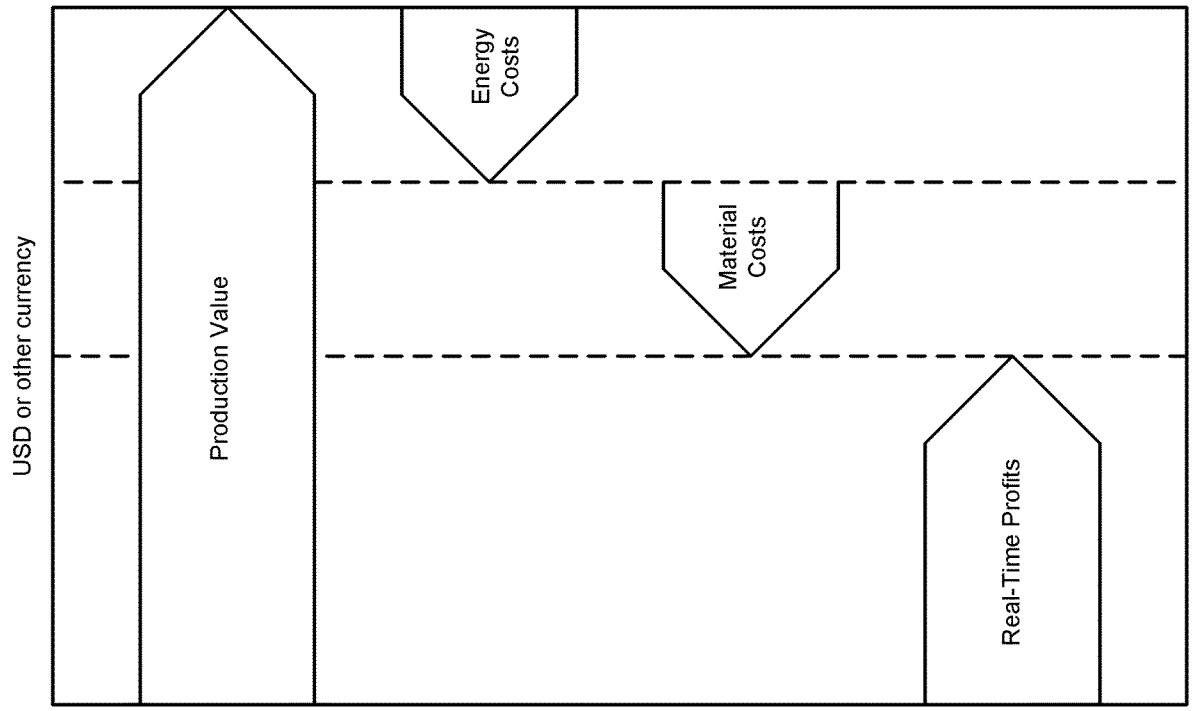
FIG. 4B is a diagram illustrating components controlling real-time profitability of a Hierarchical Asset Control Application in accordance with various embodiments of the present disclosure.

In some embodiments, some business variables of industrial operations experiencing real-time variability include, but are not limited to: energy cost (the cost of energy per consumed unit), material cost (the cost of raw material per consumed unit) and production value (the value per unit of products produced). Since these three composite variables tend to fight each other they can be controlled together to maximize operational profitability as the waterfall diagram in FIG. 4B depicts. All four of the components in this waterfall diagram experience a degree of real-time variability and as such are candidates for effective real-time controls as provided by the Hierarchical Asset Control Application.

Figure 4C:
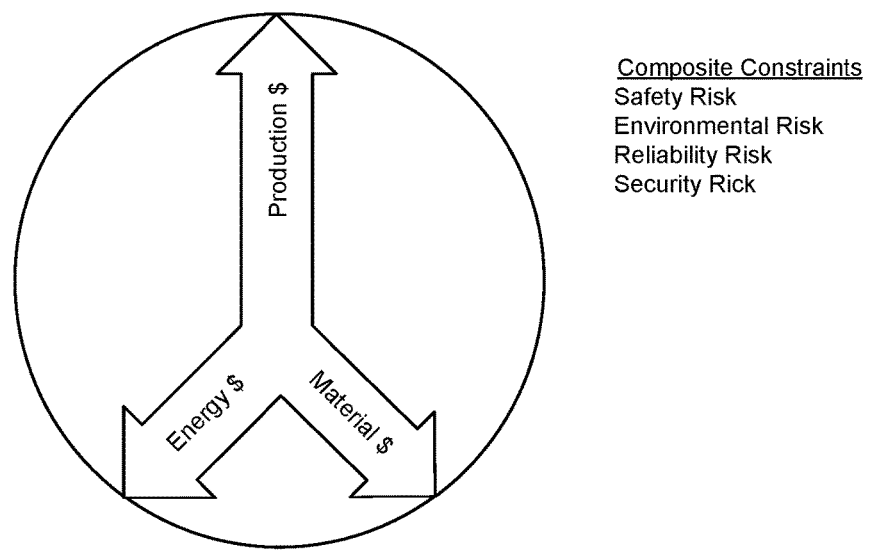
FIG. 4C is a diagram illustrating a simplified representation of a multi-objective optimization problem including the components of FIG. 4B.

The components of the waterfall diagram depicted in FIG. 4B represent a constrained, multi-objective optimization problem as shown in a simplified diagram of FIG. 4C. Although this model is a gross simplification of the actual optimization challenge, it serves to demonstrate some of the characteristics of the extended control domain. For example, the three components of real-time profitability are typically constrained by a composite of safety risk, environmental risk and equipment limits in terms of maximum operational throughput and reliability. Since maximum operational throughput is generally a fixed value that may not be controlled when the operation is in progress, the constraints that may generally be controlled are safety risk, operational risk and the reliability of the equipment, referred to as the reliability risk. The combination of these models shows how real-time process control can be extended beyond just the traditional approach to control for operational efficiency improvement to include real-time control of safety risk, environmental risk, reliability and profitability within a Hierarchical Asset Control Application.

Figure 4D:
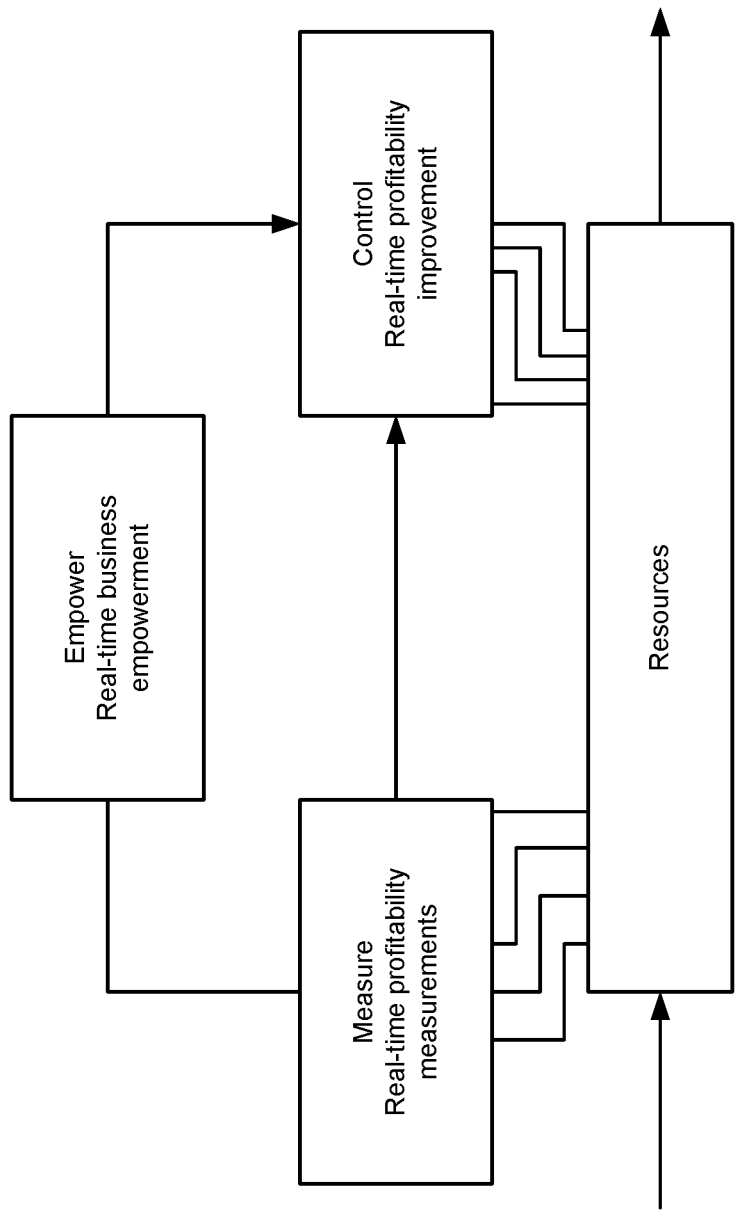
FIG. 4D is a diagram illustrating a real-time control loop to improve operational profitability of a Hierarchical Asset Control Application in accordance with various embodiments of the present disclosure.

The application of real-time control to an objective, such as improve operational profitability, is depicted in FIG. 4D. A prerequisite for control of such an objective, is the ability to measure the variables to be controlled. In this case, it involves measuring operational profitability through real-time accounting (RTA). RTA is described in detail in U.S. Pat. No. 7,685,029 titled "Method for Real-Time Activity-Based Accounting," which is incorporated herein by reference in its entirety. Once the measurements are made, the information and RTAs can be gathered and displayed in real-time decision support dashboards for consideration by personnel responsible for the subject section of the operation. Using this information, the personnel can supervise the automatic control of profitability in some embodiments. In other embodiments, direct manually control of profitability in a manner similar to manual process control is also possible. In other embodiments a combination of automatic control and manual operation is also possible. In the case of the automatic control approach, an automatic profit controller can be implemented. The automatic control approach may be preferable over the manual control approach in instances where speed, complexity of analyses and repeatability are important considerations. In this manner, the real-time profitability of the operation can be controlled.

As noted above, real-time profitability is constrained by the reliability risk, safety risk, and environmental risk constraints of the section of the operation under consideration. The profitability of the operation may be improved by effectively controlling these risks. To control these risks, an autonomous or semi-autonomous control system can measure each of these constraint variables in real-time, empowering the appropriate personnel with the real-time measurement information. In some embodiments, the real-time measurement information along with any other inputs can be used by the autonomous or semi-autonomous control system to control each variable in turn. Applying real-time control to these constraint variables may result in a lifting of the constraints enabling more operational profitability in a safe and environmentally sustainable manner, which are important for most production and manufacturing operations.

Real-Time Control Model

As used herein, real-time control incorporates decisions based on measurements to impact a desired outcome in a timeframe associated with the time constant of an operational or business process. Real-time control can include automatic and manual control executed either on feedback or predictive measurements as depicted in FIG. 4E.

Applying extended control by the Hierarchical Asset Control Application includes utilizing real-time measurements available within the Hierarchical Asset Control Application to apply real-time controls to improve security rules, safety risk, environmental risk, reliability risk, efficiency (traditional process control) and profitability in real time. As with traditional process control which is applied to increase operational efficiency, the actual variables under direct control may be lower level variables than those of the objective for the control. For example, for the objective of improving operational efficiency, the actual direct control can be performed on variables or operation parameters such as flow, level, temperature and pressure of the assets. Improving the control of these variables to values that improve operational efficiency meets the objective in some embodiments. The same is true for objectives such as security risk, safety risk, environmental risk, reliability risk and profitability objective.

The appropriate mechanisms for control of a Hierarchical Asset Control Application can be categorized along two dimensions as depicted in FIG. 4E. The control can either be manual or automatic, and it can either be based on feedback, predictive and/or any suitable techniques. All four categories in the diagram represent valid options for applying controls to a Hierarchical Asset Control Application. One example progression can be from manual feedback control, to automatic feedback control, to manual predictive control, to automatic predictive control. This order can vary in different implementations. The cost of feedback control is typically considerably less than the cost of predictive control and, therefore, unless significant incremental value can be realized by applying predictive control most industrial operations may utilize feedback approaches.

Manual control is typically the most appropriate approach when engineers are trying to learn the dynamics of a system in order to better characterize or model the system to develop and apply automatic control. Since many of the objective variables being brought under control through the extended control characteristic of asset control systems have not been measured or characterized in real-time previously, manual control approaches may be utilized until the characteristics of the objective variables is understood to the point at which automatic control can be effectively developed.

Automatic controls have been implemented in two basic ways in industrial operations. First is logic control that was developed for machine control applications but has been utilized in many other applications. Second is algorithmic process control that was developed for more continuous process applications. Combinations of these two traditional control approaches can be utilized to provide automatic control of profitability objectives, reliability risk, safety risk, environmental risk, and/or security rules from across the entire ISCAS from the smart asset and smart asset set or other smart asset groupings all the way to the enterprise level in some embodiments of the present disclosure.

FIG. 5A illustrates a Hierarchical Asset Control Application and corresponding control hardware as an Integrated Smart Asset Control System 500 for an example industrial equipment operation/process in accordance with a first embodiment of the present disclosure. An industrial equipment operation/process can comprise primary (or base) smart assets 501 with integrated functions at the lowest level. In the case of an oil refinery for instance, the primary smart assets 501 can be equipment such as pumps to force crude oil to move in a specific direction and heat exchangers to heat incoming crude oil. Each of these primary smart assets 501 can be autonomously or semi-autonomously controlled by a Cyber Physical System (CPS) having an intelligent agent to ensure optimal or effective operation as described above or linked as a grouping of smart assets also controlled as an element within a Hierarchical Asset Control Application and corresponding control hardware.

As depicted, in some embodiments, each CPS in the Integrated Smart Asset Control System is aligned with a smart asset, and has its own autonomous or semi-autonomous control system including an avatar or intelligent agent (IA) that defines and executes a control strategy specific to the smart asset and in some instance to the smart asset as part of the Hierarchical Asset Control Applications and corresponding control hardware. For example, the Hierarchical Asset Control Applications and corresponding control hardware and underlying equipment elements working together to form an Integrated Smart Asset Control System 500 illustrated in FIG. 5A, each of the low level smart assets (e.g., primary assets) can have a CPS including an intelligent agent that is responsible for the autonomous or semi-autonomous control of the smart asset. Similarly, (as show in FIG. 5B) higher level smart assets (e.g., smart asset sets) can have their own intelligent agents that effectively incorporate the lower level smart assets and/or smart asset sets and/or coordinate the activities of intelligent agents at the lower levels. For example, the intelligent agents controlling the overall unit/work cell can be incorporated into intelligent agents controlling trains/areas. The train/area intelligent agents can be incorporated into plant intelligent agents, which can be incorporated into fleet intelligent agents, which in turn can be incorporated into enterprise intelligent agents and finally into value chain intelligent agents. In other words, in the Hierarchical Asset Control Applications and corresponding control hardware and corresponding integrated smart asset control system, the control strategy at the higher level subsumes the control strategies at the lower levels facilitated by intelligent agent characteristics such as polymorphism, inheritance, late binding, encapsulation, and/or the like.

In some embodiments, the control system associated with each CPS controls the functions within the associated asset and the transfer of any information required from other CPSs or required to be sent to other CPSs. Since the control system within each CPS provides appropriate control for the sensor based data associated with the smart asset, most of the base data generated within each CPS is used inside the control strategy for the CPS and does not need to be accessed anywhere else in the overall plant system. Moreover, effective autonomous or semi-autonomous control of the primary assets by the intelligent agents prior to their incorporation into the hierarchical smart asset set control strategy means that the smart asset set level or other smart asset grouping control becomes much simpler to design and build.

The smart asset control system thus brings entire enterprises and value chains into real-time control to provide improvements in unified and coordinated operation of industrial businesses to drive significant bottom-line improvements. Moreover, with this architecture, the control can be expanded to the enterprise control system level and even to the value chain control system level. This asset-centric perspective of industrial operations and enterprises not only makes the control strategies associated with them simpler to design, implement and execute, it actually represents the way in which industrial companies perceive their basic operations. For example, engineers in industrial operations typically understand and describe the operation from an asset perspective. This natural alignment with the way industrial personnel understand their operations and jobs improves their understanding of the automation system because the system is aligning with their perspective.

It should be noted that other than the lowest (primary smart asset) level of the architecture depicted in FIG. 5A or 5B which is coupled to a CPS, the topology of the Integrated Smart Asset Control System can be defined by software and developed as a Hierarchical Asset Control Application and corresponding control hardware. As such, the resulting Integrated Smart Asset Control System in accordance with a first embodiment of the present disclosure has a software-defined architecture as a Hierarchical Asset Control Application.

Figure 7:
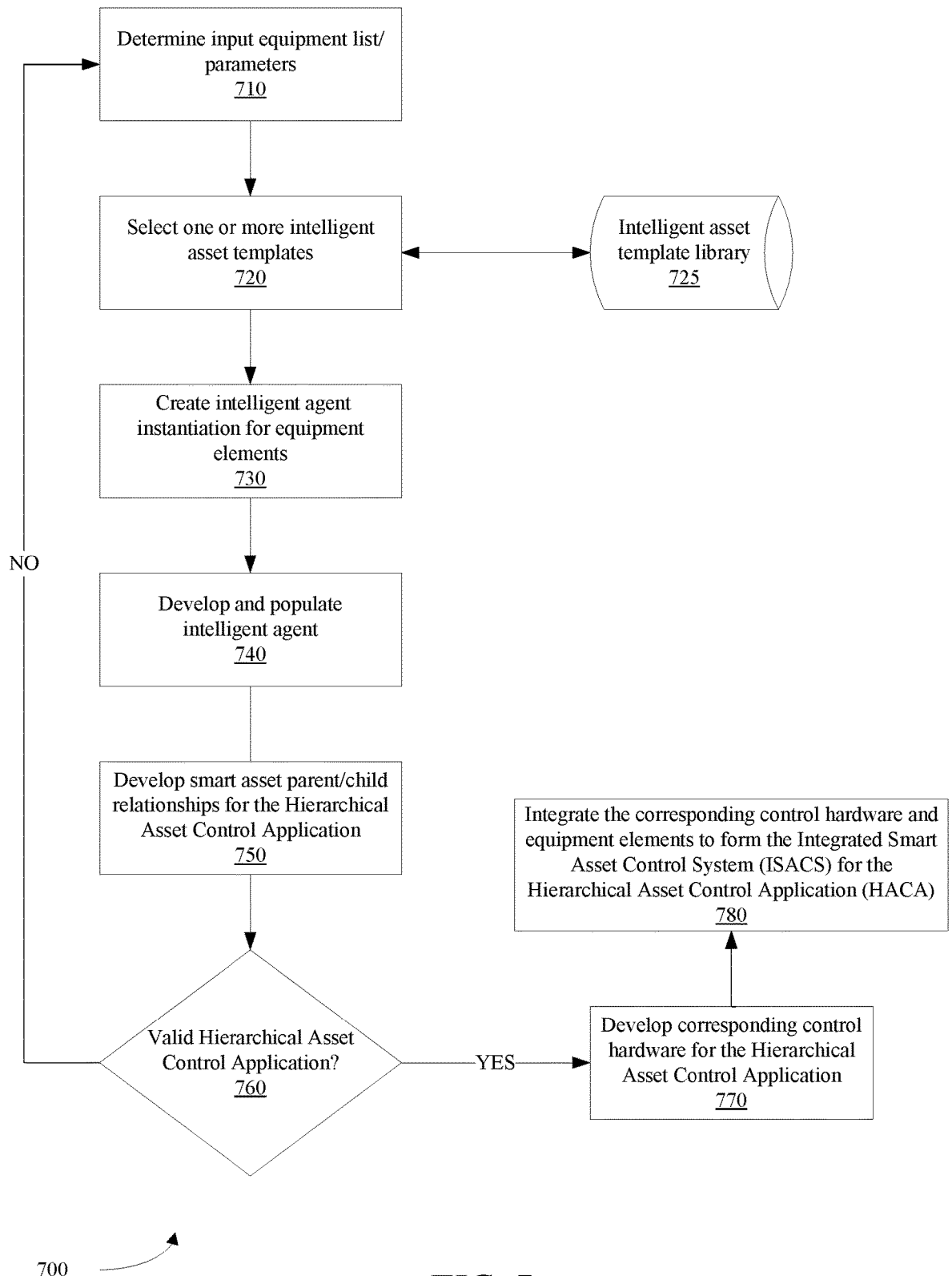
FIG. 7 is a flow diagram illustrating a method of Hierarchical Asset Control Application and corresponding control hardware development and integration to create an Integrated Smart Asset Control System in accordance with various embodiments of the present disclosure.

FIG. 5B illustrates an Integrated Smart Asset Control System for an example in accordance with a second embodiment of the present disclosure. In this embodiment, higher level asset sets can also have an associated CPS having an intelligent agent 550. For example, as depicted in FIG. 5B, each primary smart asset 551, unit/work cell 552, area/train 553, plant 554, fleet, enterprise and value chain smart asset sets can have an associated CPS including an intelligent agent. As such, the topology of the Integrated Smart Asset Control System as depicted in FIG. 5B can be defined by a combination of hardware and software as a Hierarchical Asset Control Application and corresponding control hardware. In some embodiments, a CPS associated with a smart asset set can have a different set of components from a CPS associated with a smart asset. For example, types of sensors and actuators in a CPS associated with a primary smart asset can be different from those in a CPS associated with a smart asset set. Components such as specific types of sensors and actuators can be selected based on the environment in which a smart asset or smart asset set operates. FIGS. 7-8E discuss in greater detail how a Hierarchical Asset Control Applications and corresponding control hardware can be developed.

Figure 6:
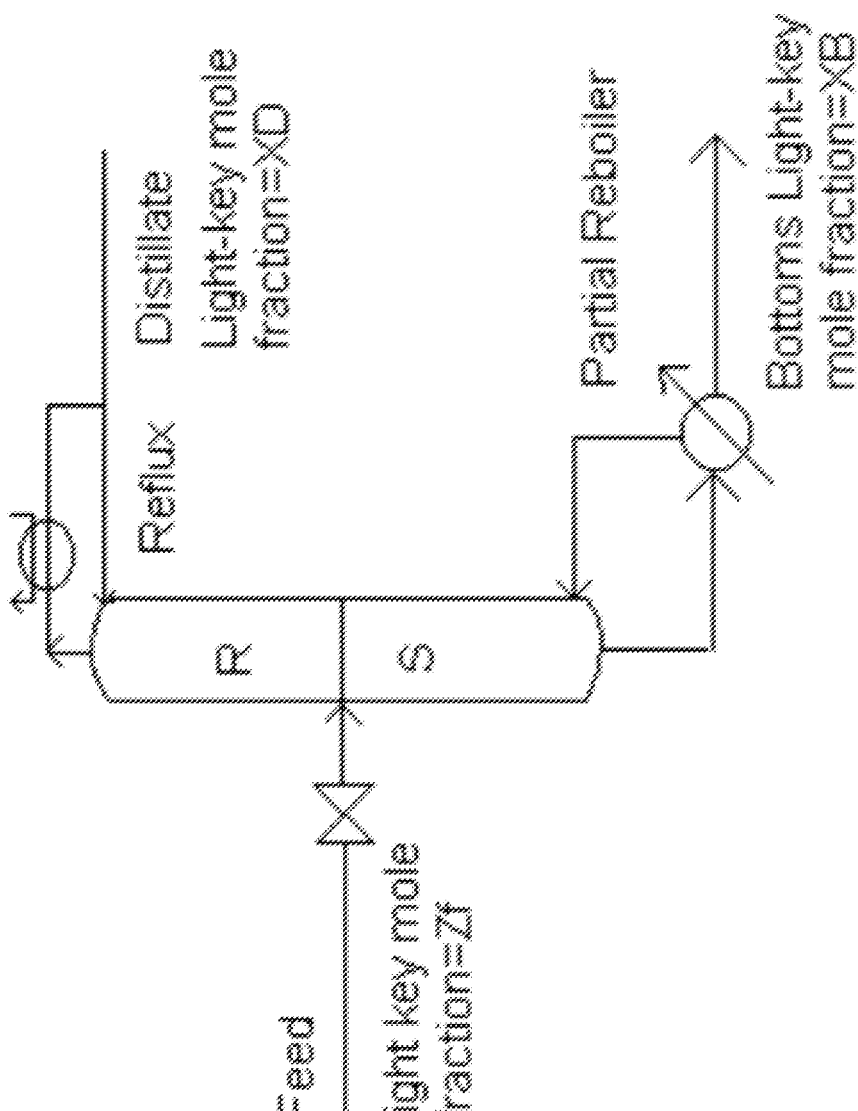
FIG. 6 is an example of industrial equipment elements that can be controlled and integrated with a Hierarchical Asset Control Application (Hierarchical Asset Control Applications) and corresponding control hardware to form an Integrated Smart Asset Control System in accordance with various embodiments of the present disclosure.

FIG. 6 illustrates another example of underlying industrial equipment operation/process, as a foundation upon which a Hierarchical Asset Control Application and corresponding control hardware may be applied to physical equipment hierarchy in accordance with some embodiments of the present disclosure.

FIG. 6 depicts a distillation column 600 (e.g., in an oil refinery). Once configured as smart assets/smart asset groupings incorporating CPS and intelligent agent components, the distillation column can be considered a unit asset set within a Hierarchical Asset Control Applications. In the example, the equipment/can be broken down into three basic sections: feed, bottoms, distillate. The bottoms section is made up of a collection of equipment including pumps, valves, measurement devices, etc. The smart asset control system is developed and provides each of the three equipment modules with a Cyber Physical System ("CPS") including an avatar/intelligent agent that are responsible for providing monitoring and control functions for the underlying equipment. The Hierarchical Asset Control Application and system control hardware also provides the distillation column smart asset set with an intelligent agent that can coordinate the lower level intelligent agents associated with and controlling the three equipment modules. In some embodiments, the Integrated Smart Asset Control System or smart asset control system can provide a CPS to the distillation column smart asset set as well as the three equipment modules.

As will be discussed in greater detail, in FIGS. 7-8E, the development of a Hierarchical Asset Control Applications and corresponding control hardware involves accessing a library of intelligent asset templates that are instantiated as instances of the smart asset avatar/intelligent agent. For example, the distillation column described in FIG. 6 may correspond with an intelligent asset template (described in FIG. 8C in greater detail). In some implementations the equipment elements of FIG. 6 may also be used to define and identify corresponding intelligent asset templates to develop a Hierarchical Asset Control Application for the components of the distillation column as well as the distillation column itself. The intelligent asset templates can include information and control actions related to security, safety, environment, reliability, performance, profitability, and the like (an example template is shown in FIG. 8C and described in greater detail below). Operators may interact with the Hierarchical Asset Control System at low levels and/or at higher levels. The avatar templates/libraries allow high level operator adjustments to automatically be sent as commands to the lower level plant assets facilitated through asset control/efficiency elements of a template and the developed Hierarchical Asset Control Applications.

Hierarchical Asset Control Application Development

FIG. 7 is a flow diagram illustrating a method of Hierarchical Asset Control Application and corresponding control hardware development and integration to create an Integrated Smart Asset Control System in accordance with various embodiments of the present disclosure. It is to be understood that depending on the implementation and application the system facilitates and various aspects of the feature and functionally described herein may be implemented across any number of computing devices implementation some of the components illustrated in FIG. 27. For example, Hierarchical Asset Control Applications development, control hardware identification, aspects of Integrated Smart Control Asset Systems integration, run time optimizations, and/or system management and/or control may be implemented as desktop application, mobile applications, cloud computing based applications and/or any other number of computer elements or implementations. Elements of the overall flow for developing a Hierarchical Asset Control Application, are described in more detail in FIGS. 8A-8E. FIGS. 9-12 illustrate aspects of Hierarchical Asset Control Application and corresponding control hardware development and integration to create an Integrated Smart Asset Control System according to an example involving Exothermic Reactor equipment elements.

As illustrated in FIG. 7, Hierarchical Asset Control Application development process 700 involves first determining a list industrial equipment elements that the will be controlled and in some instances the context in which the equipment elements will be controlled 710 to facilitate an operational industrial application. From the equipment element list, a first equipment element is selected and the system queries an intelligent asset template library 725 to select on or more intelligent asset templates 720. The system instantiates the intelligent agent template for a smart asset (or a group of smart assets) 730. Once instantiated, the intelligent agent data including operational characteristics, objective and constraint data is commissioned and developed from the appropriate data sources or database(s) 740. One element of the intelligent agent data involves smart asset parent/child control information, as well as smart asset interconnectivity information. This information is used to develop the smart asset parent child control relationships as the Hierarchical Asset Control Application is developed 750. The Hierarchical Asset Control Application is validated 760 and if approved used to develop corresponding implementation control hardware requirements. An Integrated Smart Asset Control System can be developed as the Hierarchical Asset Control Application; any corresponding control hardware elements are integrated with the underlying industrial equipment elements 770. Finally, the corresponding control hardware and equipment elements are integrated to form the Integrated Smart Asset Control System to develop a turnkey hierarchical industrial process control system 780 (e.g., as illustrated in FIG. 5B).

Figure 8A:
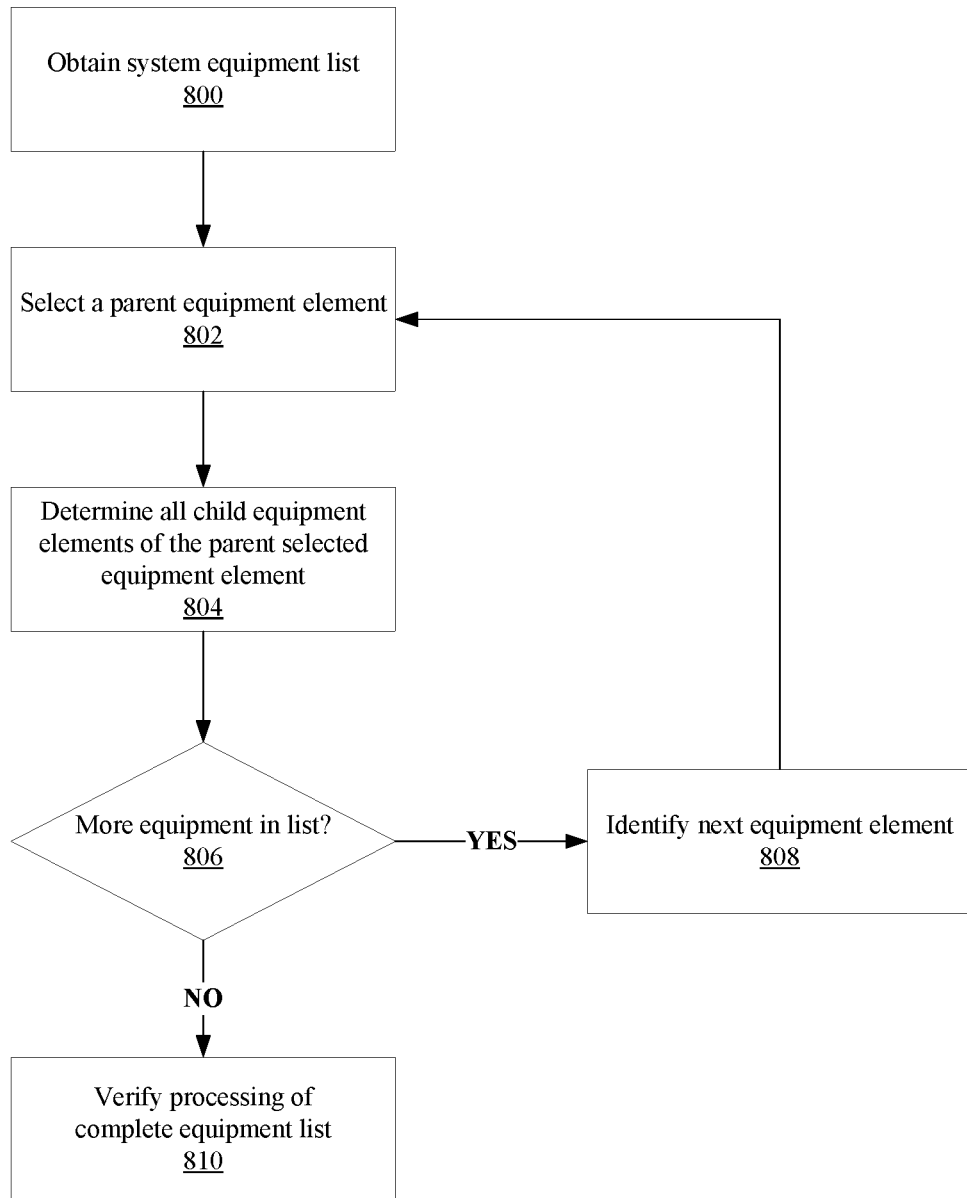
FIG. 8A is a flow diagram illustrating determining a system equipment list for developing a Hierarchical Asset Control Application in accordance with various embodiments of the present disclosure.

FIG. 8A is a flow diagram illustrating aspects of determining and verifying equipment elements in greater detail in accordance with various embodiments of the present disclosure. This logic flow represents various processes which correspond to enumerating equipment elements and characteristic parameters which describe that equipment 710. An equipment list is obtained 800 which may correspond to a complete or a portion of an industrial system to be transformed into a virtual industrial system. Obtaining this equipment list may be manual or automatic in nature and need not be a listing of equipment for a complete system. Once obtained, an equipment element on the list is selected 802. Depending on the particular implementation, there may be several methods by which to select this first equipment element. It may be selected based on criticality, size, known associated children assets, or any other characteristic or any combination. Any equipment may be chosen, so long as it part of the system to be analyzed. As the equipment element is analyzed for its own characteristics, any equipment determined as a "child" to this equipment is also captured in the characterization 804. It should be appreciated that one "parent" equipment may have several "child" equipment relationships and principals of the disclose provide for the converse. The system will query of each equipment element has been identified 806 and if not each equipment element of the entire list will be identified 808 and analyzed. A verification that each equipment element has been processed 810 will be performed after the last equipment element on the equipment list has been processed.

Determination of equipment may be created by automated or user directed methods or accessed in an equipment library, or some combination of both. When entered, the system may query each logical location for a specified piece of equipment and receive information describing various characteristics of the device. Automated methods may include "crawler" functionality where given a series of logical addresses, the system itself may query each logical location for a specified equipment element and receive information describing various characteristics of that equipment element.

Once a complete equipment list has been determined, an equipment mapping is processed where each piece of physical equipment is mapped with one or more intelligent asset templates 720. An example of an intelligent asset template and corresponding data elements 840 is illustrated in FIG. 8C. To assist in the mapping of each piece of physical equipment, an intelligent asset template library 725 is accessed for each equipment element. If it is determined that one or more characteristics of the physical equipment match that of the virtual intelligent asset template, a mapping is formed.

It should be appreciated this mapping of physical equipment to intelligent asset template need not be a one to one relationship. A many to one relationship may exist determined in part by the relative complexity of the characteristics associated with the physical equipment. It should be appreciated that an intelligent agent may be created for each smart asset, a group of smarts assets organized as a smart asset set, a group of smart asset sets organized as a smart asset unit or, a smart asset may be composed of one or more equipment elements. Further, principles of this disclosure contemplate that more than one intelligent asset template may be used to describe a single equipment elements or more than one intelligent agent may be used to describe a single smart asset or single set of smart assets, or other grouping of smart assets.

As the mapping is completed for each piece of physical equipment, an intelligent asset data structure is created for each equipment element 730. There are several possible relationships between equipment elements and intelligent agent templates. They include a one to one relationship between the equipment element and intelligent asset template, as well as many to one relationship between the equipment element and intelligent asset template. It should be appreciated; each piece of equipment is transformed into a virtual smart asset which represents each instance of the physical equipment.

To develop an accurate virtual model of the equipment elements for incorporation into a Hierarchical Asset Control Application, several characteristics are developed and populated into an intelligent agent data structure for each equipment element 740. Data amounts and types contained in the intelligent agent data structure may include asset identification data, asset industrial application data, physical modeling data including, but not limited to availability, platform, and security constraints, as well as hardware and system characteristics to describe the equipment element in detail.

This process continues for all equipment element within the industrial application until proposed hierarchical arrangement of parent to child asset control relationships are developed 750. This mapping further develops the virtual intelligent agent data structures of each equipment element to form a complete virtual hierarchy of characterized assets representative of the physical equipment element associated with the industrial system.

This complete virtual hierarchy of characterized assets may be either validated 760 and/or simulated to confirm the virtual representation of the Hierarchical Asset Control Application operates in an expected manner. This complete Hierarchical Asset Control Application may then be provided to a system for operation of the corresponding physical industrial system.

Figure 8B:
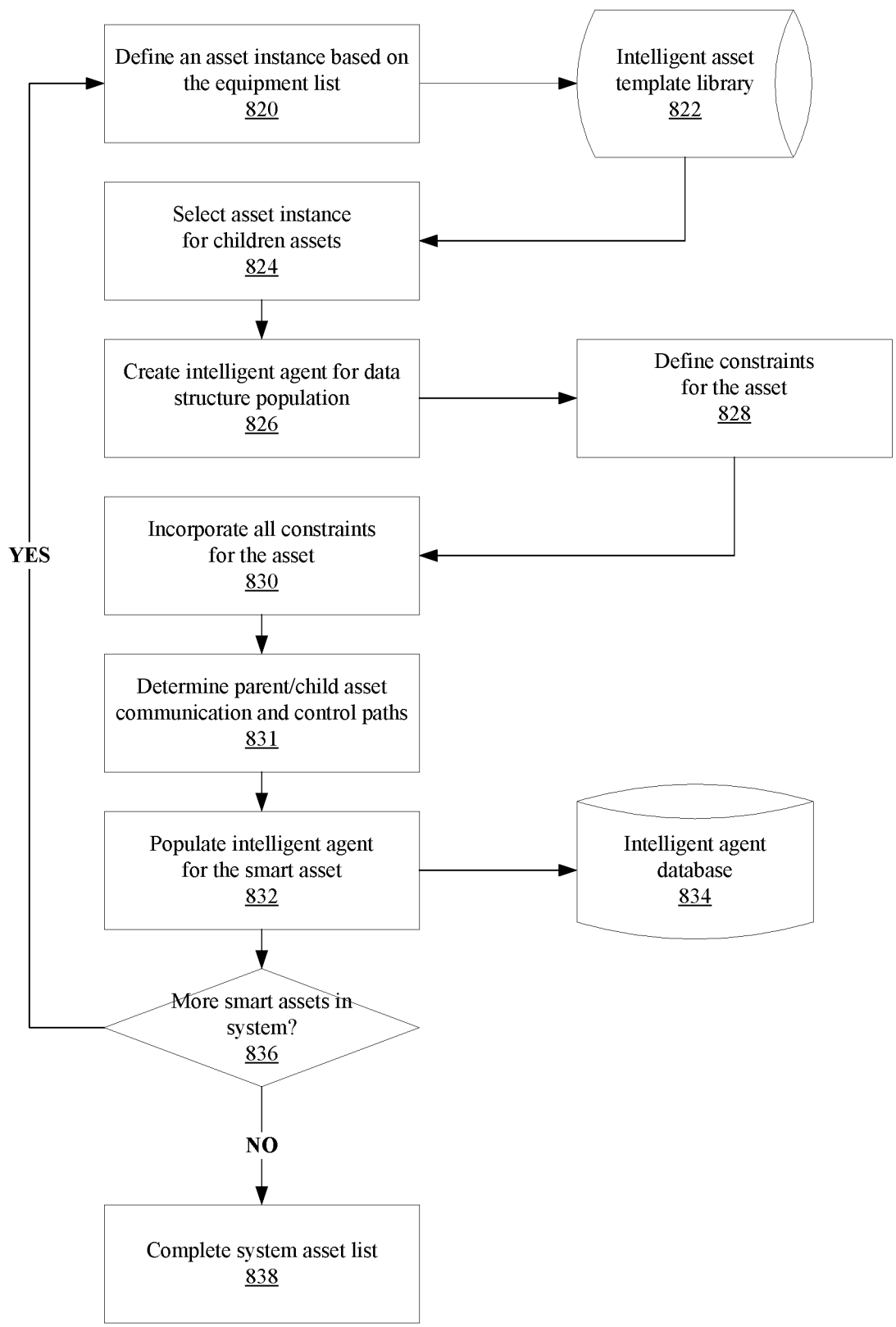
FIG. 8B is a flow diagram illustrating determining a smart asset list for developing a Hierarchical Asset Control Application in accordance with various embodiments of the present disclosure.

FIG. 8B is a flow diagram illustrating determining an intelligent asset template and identifying an intelligent data template in accordance with various embodiments of the present disclosure. This logic flow represents various processes which correspond to the selection of one or more intelligent asset templates 720, creation of intelligent agent instantiation 730, and development and population of an intelligent agent 740 illustrated in FIG. 7. For each verified equipment element which has been processed, a corresponding intelligent agent instance is defined 820 based on the equipment list and the available entries in the intelligent asset library 822. Once an intelligent agent instance is defined for a given smart asset 820, smart asset instances are defined for any known children smart assets 824 of the parent asset just defined 820.

It should be appreciated that there may be intelligent asset templates within the intelligent asset library 822 that are not complete in part or not represented at all. This disclosure contemplates these possibilities and allows for subsequent smart asset characterization to update the intelligent asset library 822. In this way, the intelligent asset library 822 will improve over time with each subsequent system use. This disclosure also contemplates the use of "generic" intelligent asset templates which may be available from organizations such as ASME or IEEE. Such intelligent asset templates may lack some information beneficial to the process described herein, however may be useful in describing some basic characteristics of the equipment elements (e.g. a chiller pump, etc.).

For each smart asset instance if it is determined that one or more characteristics of the physical equipment matches that of the intelligent asset template a mapping is formed. It should be appreciated this mapping of smart asset to intelligent asset template need not be a one to one relationship, a many to one relationship may exist determined in part by the relative complexity of the characteristics associated with the equipment element. As the mapping is completed for each smart asset, an intelligent agent data structure is created for each smart asset 826. There is a one to one relationship between an equipment element and a smart asset. Each smart asset may serve as the virtual representation of the equipment element within the construct of the developed Hierarchical Asset Control Application.

To develop an accurate virtual model of the equipment element, several characteristics may be developed and populated into the intelligent agent data structure for each physical asset. To assist in determining the operational capabilities of a particular smart asset, for a particular industrial application, characteristics such as constraints, are defined for each smart asset 828. These constraints may include, but are not limited to, environmental, reliability, and safety constraints defined on a per asset basis. It should be appreciated that while there may be common equipment elements, how that equipment element is used for a particular industrial application may substantially affect the nature of one or more operational constraint(s), as the operational characteristics a smart asset. As one of a variety of examples, a pump which is required to operate continuously to move drinking water from one location to another, may have a substantially shorter service life than the same pump only operating twice a day to move marshmallow fluff from one vessel to another due to the batch nature of the operation. In such a case, reliability, safety, and environment factors for the identical equipment elements (e.g. the pump) may vary substantially across any number of industrial applications. Each of these operational constraints are defined 828 for the smart asset and incorporated into the intelligent agent on a per smart asset basis (or in some instances for a smart asset grouping) 830. Each virtual asset representation may possess various characterizing data that will in part determine how a particular industrial application will interact with the supporting equipment. It should be appreciated that an array of constraint data may be incorporated into each asset. In various embodiments of smart/intelligent assets, sets, subsets and in some instances the constraint may have a null value or value to be determined after the Integrated Smart Asset Control System is operational. Although operational constraints such as safety, reliability, environmental and cybersecurity constraints are discussed herein, it should be appreciated a wide array of constraint types and underlying data may be implemented.

Parent/child relationships control relationships are created 831 to develop the hierarchy of smart assets and aspects of the corresponding controls that are possible for the Integrated Smart Asset Control System. Once all characteristics are defined for the asset, including any defined constrain data 828, the intelligent asset data structure is populated for the asset 832 and stored within an intelligent asset database 834 for reuse as needed. Examples of this reuse may be subsequent commissioning of an asset or series of assets for a similar industrial application. Further, it should be appreciated with repeated use the precision of the intelligent asset data structures to characterize assets in various industrial applications may increase, thereby furthering one of the stated goals of industrial design, to make a system well characterized and repeatable. This process is repeated for all smart assets within the industrial system 836. Once each smart asset is defined after instantiation/commissioning as an intelligent agent, the complete system smart asset list 838 will be available for further processing.

FIG. 8C is an illustration of an intelligent asset template and examples of the data structure 840 which may be contained in accordance with various embodiments of the present disclosure. To develop an accurate virtual model of the physical asset, several characteristics are developed and populated into the intelligent agent data structure for each equipment element 740. Data amounts and types contained in the intelligent agent data structure are various but may include asset identification data, asset industrial application data, physical modeling data including, but not limited to availability, platform, and security constraints, as well as hardware and system characteristics to describe the physical asset in detail. It should be appreciated the types and quantity of data is various based on the specific industrial application and corresponding supporting equipment.

Figure 8D:
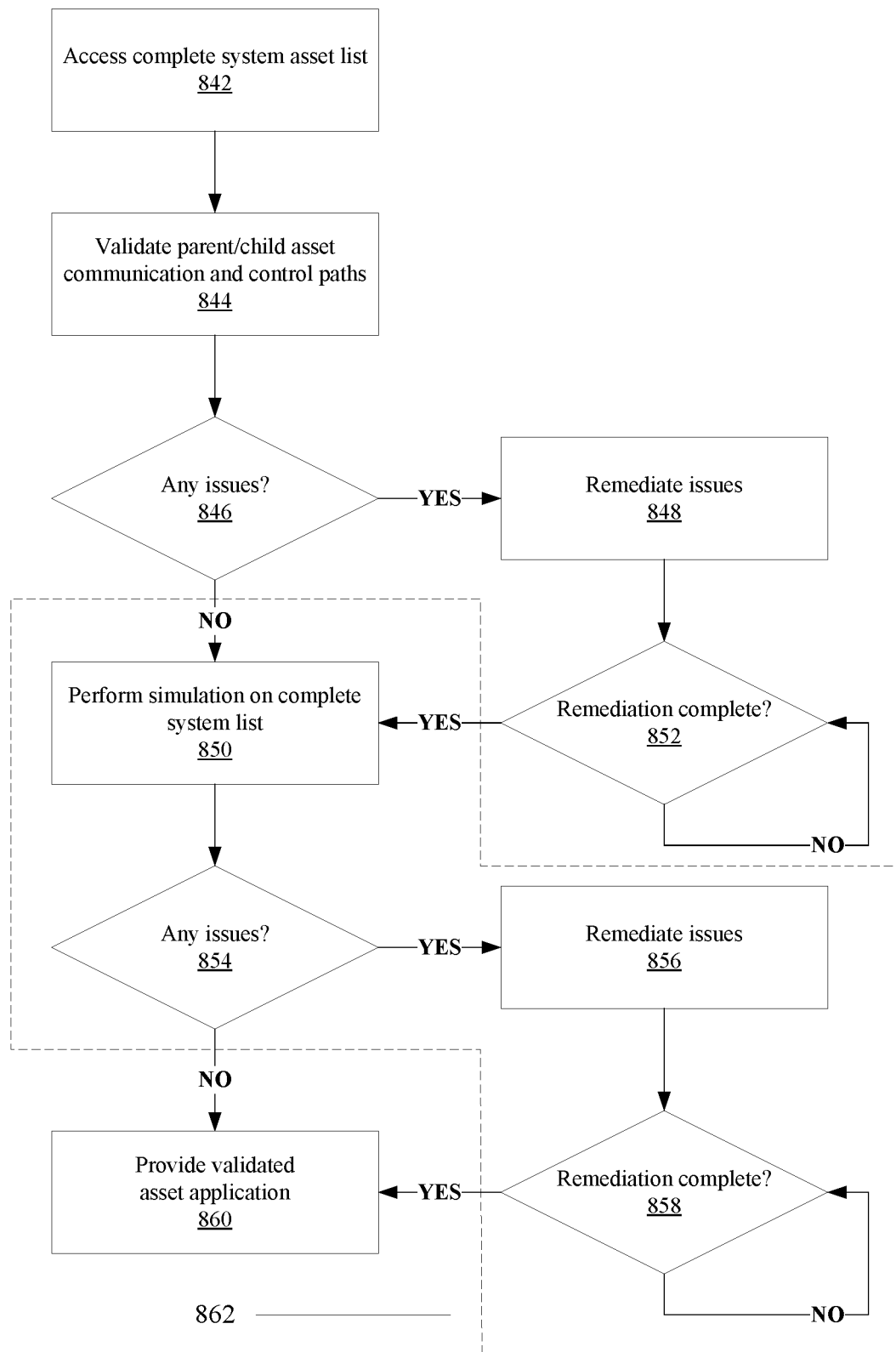
FIG. 8D is a flow diagram illustrating validation and simulation of a Hierarchical Asset Control Application and corresponding control hardware in accordance with various embodiments of the present disclosure.
Figure 8E:
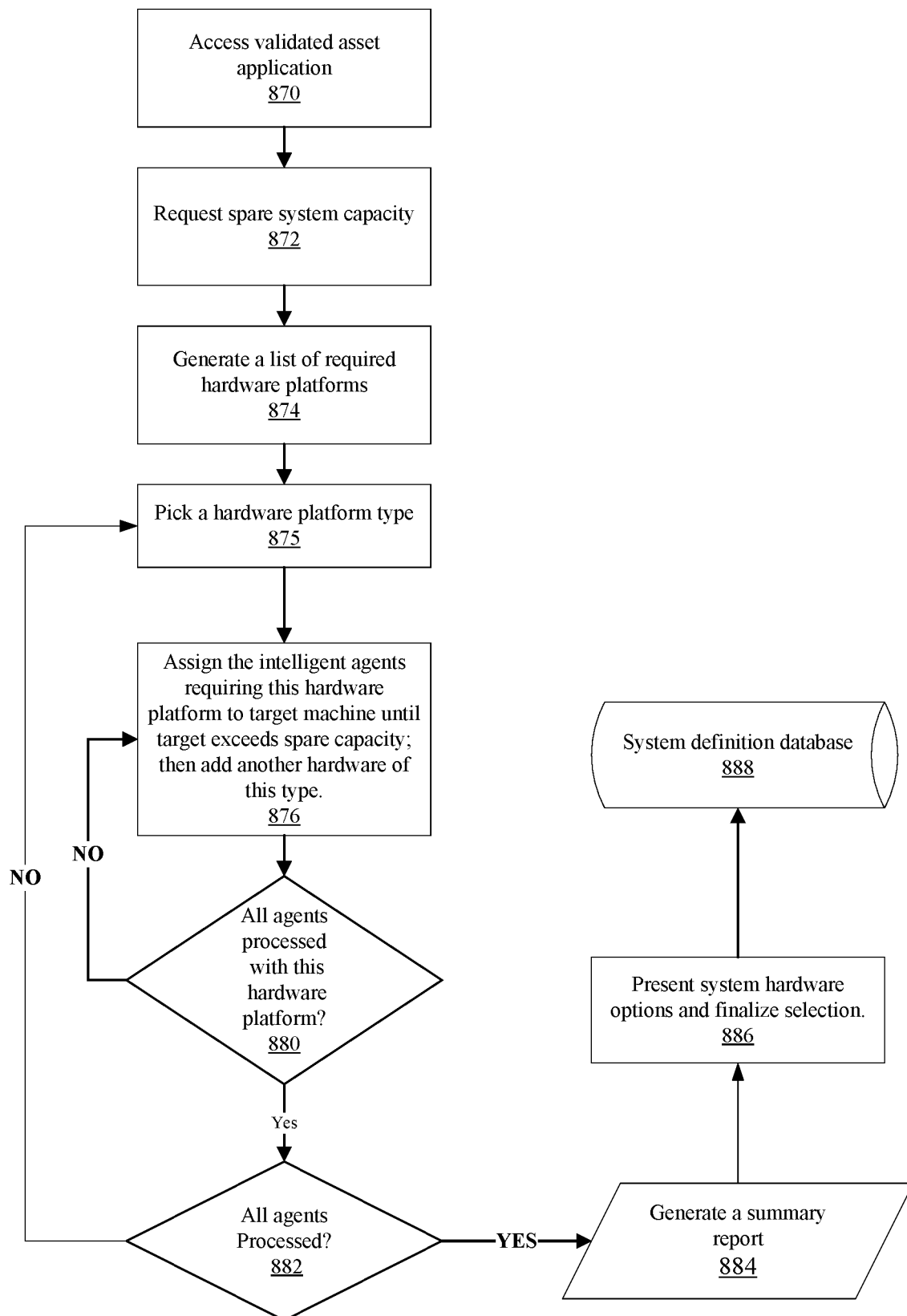
FIG. 8E is a flow diagram illustrating hardware instantiation of a Hierarchical Asset Control Application in accordance with various embodiments of the present disclosure.

FIG. 8D is a flow diagram illustrating validating and simulating a Hierarchical Asset Control Application in accordance with various embodiments of the present disclosure. Depending on the particular implementation of the system, either of these steps may be omitted or made optional. As the complete system smart asset list is available 842 and processed from equipment element to intelligent asset data structure, optional validation and/or optional simulation may be performed before a proposed solution is placed into service with a physical industrial system. With the parent/child control relationships mapped for each smart asset, validation occurs to verify that each communication and control pathway exists and is usable 844. If it is determined that issues related to these parent/child communication pathways exist 846, remediation is undertaken 848, and continues until resolved 852. Remediation may include, but is not limited to, altering the equipment list, smart asset list, and/or the intelligent agent data structure. It may be beneficial this validation occur before actual hardware control in an industrial application occurs to prevent the possibility of very serious results. Once the asset parent/child relationship is validated, a Hierarchical Asset Control Application exists.

However, before application or instantiation to a hardware based system, simulation of the complete, validated, Hierarchical Asset Control Application 850 while optional 862 may be beneficial, to determine if any condition exists or may arise that would exhibit unexpected or undesired results in a hardware based industrial system. As with validation 844, the entire Hierarchical Asset Control Application is simulated 850. If it is determined that any issues related to simulated operation of the Hierarchical Asset Control Application exist 854, remediation may be undertaken 856, and may continue until resolved 858.

When complete, a validated and simulated Hierarchical Asset Control Application exists and may be utilized 860 to develop corresponding control hardware requirements. The Hierarchical Asset Control Application corresponding control hardware can then be used to integrate the control hardware/software with the underlying equipment elements to ultimately create an Integrated Smart Asset Control System (e.g., as illustrated in FIG. 5B). In some implementations, the Integrated Smart Asset Control System or the Hierarchical Asset Control Application corresponding control hardware may be vetted using a simulation tool before actual hardware integration and/or runtime execution as an operational industrial application occurs.

FIG. 8E is a flow diagram illustrating hardware instantiation of a Hierarchical Asset Control Application in accordance with various embodiments of the present disclosure. Once a validated and simulated Hierarchical Asset Control Application exists and is retrieved by the system 870, a request may be made automatically from the system itself or input from a user to request spare capacity of the proscribed host resources 872. Once complete, a list of required hardware platforms may be generated 874 and platform requirements for all smart assets stored within the intelligent agent database. A hardware platform type of is selected 875 and assignment of the intelligent agents requiring a hardware platform to a target machine continues 876. Each intelligent agent may include starting a list with one target machine instance for every required hardware platform type, selecting one hardware platform type, selecting an intelligent agent for that hardware platform type, collecting availability and resource requirements for the intelligent agent industrial application, identifying the number of targets required for the application, adding other target hardware platform as needed, attempting to install the application to the required number of target machines, checking the characteristics of the application against remaining available capacity of the target hardware platform.

Embodiments of this disclosure contemplate the balancing of available resources which may involve considering if more than one hardware type is in use and if the application fills the spare capacity requirement to determine an appropriate alternate resource. If a resource is over capacity the system may remove resources from target, otherwise generate a new target machine(s) and subtract resources from previously designated target machine(s). This process may continue until all intelligent agents are processed within a particular platform 880 and for all agents 882. Once all intelligent assets are processed 882 and the various characteristics of deploying a hardware instantiation of the validated hierarchical industrial asset system/application have been determined, a summary report is generated 886 that compares the options to the system designer and defines a preferred configuration. At this point the system or a user of the system may select and adjust various parametric options 886 to adjust the existing configuration of the proscribed host resources defined 874. These adjustments may affect the operation of the industrial system and any may be adjusted to operate the system in an alternate manner.

One example of such a condition would be to adjust the system to a desired optimal state to maximize on a particular characteristic, such as profit, runtime, or safety. Many such adjustments are possible and contemplated in various embodiments within this disclosure. Once the various adjustments are made, if desired, the finalized hardware design is submitted to a repository such as the system definition database 888 for use at a later point in time.

It should be appreciated the system described in FIG. 8E is able to be instantiated using several configurations of computational resources. Examples may include resources described in FIG. 28. Principles of the disclosure contemplate the distribution of any computational resources to achieve the benefit of distributed failure points, reduced cost of infrastructure, modularity, portability, or other benefit specific to the particular industrial application.

3. Example Processing

Figure 9A:
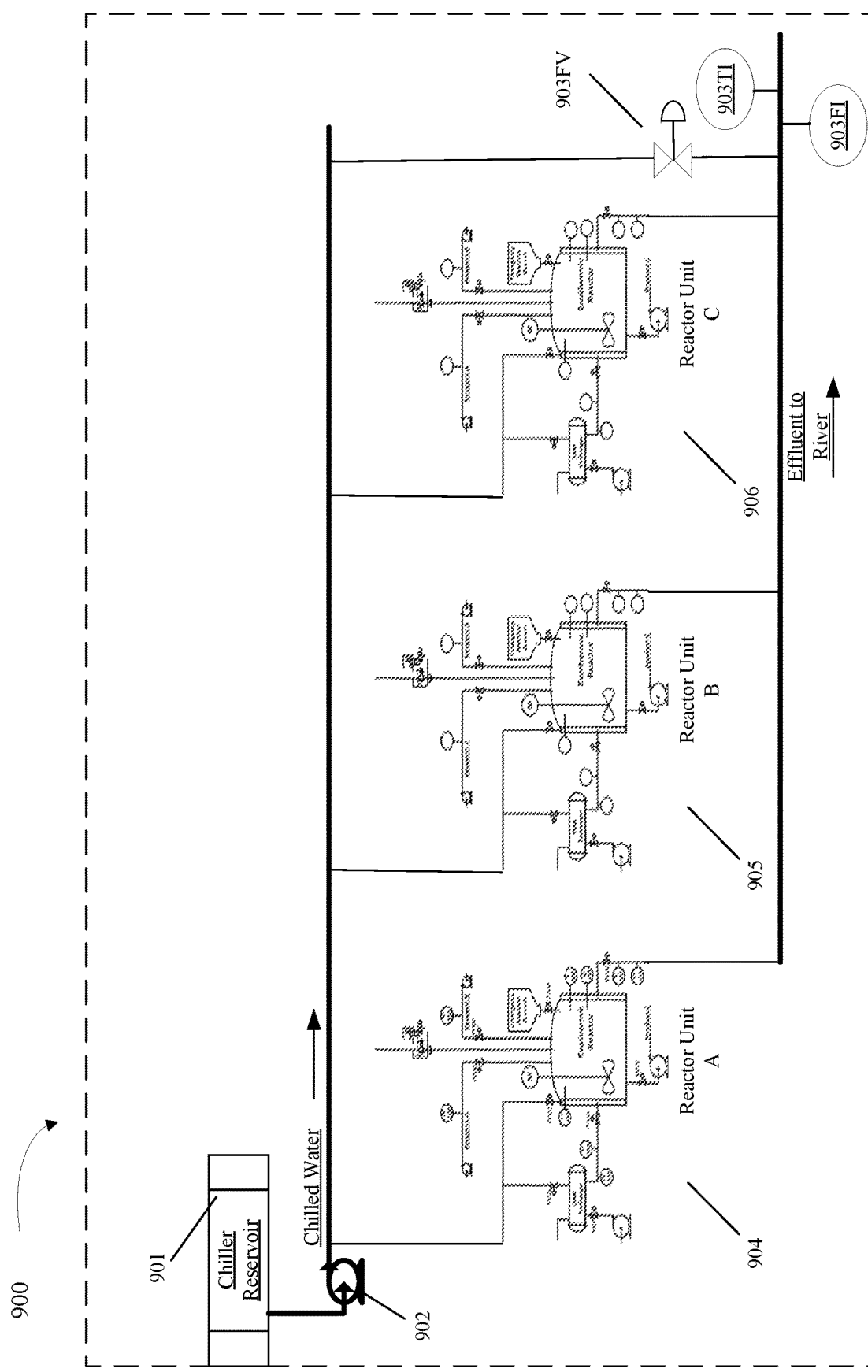
FIG. 9A is a diagram illustrating an example of an industrial process cell in accordance with various embodiments of the present disclosure.

FIG. 9A is a diagram illustrating industrial process cell equipment organization examples in accordance with various embodiments of the present disclosure. An example cell that contains three reactor units 900 is illustrated. Depending on the implementation of the system, the Hierarchical Asset Control Application can be developed for a single unit and replicated as appropriate for a particular cell and run independently and/or in coordination. Reactor Unit A 904, Reactor Unit B 905, and Reactor Unit C 906 are connected to a chilled water reservoir 901 that is shared for all reactor units supplied by a pump 902 within the process cell 900. A temperature indicator 903TI and flow indicator 903FI provide a measurement of the temperature and flow of effluent leaving the plant. Valve positioner 903FV controls the flow of cooling water that goes directly into the effluent to reduce the temperature of the effluent.

Figure 9B:
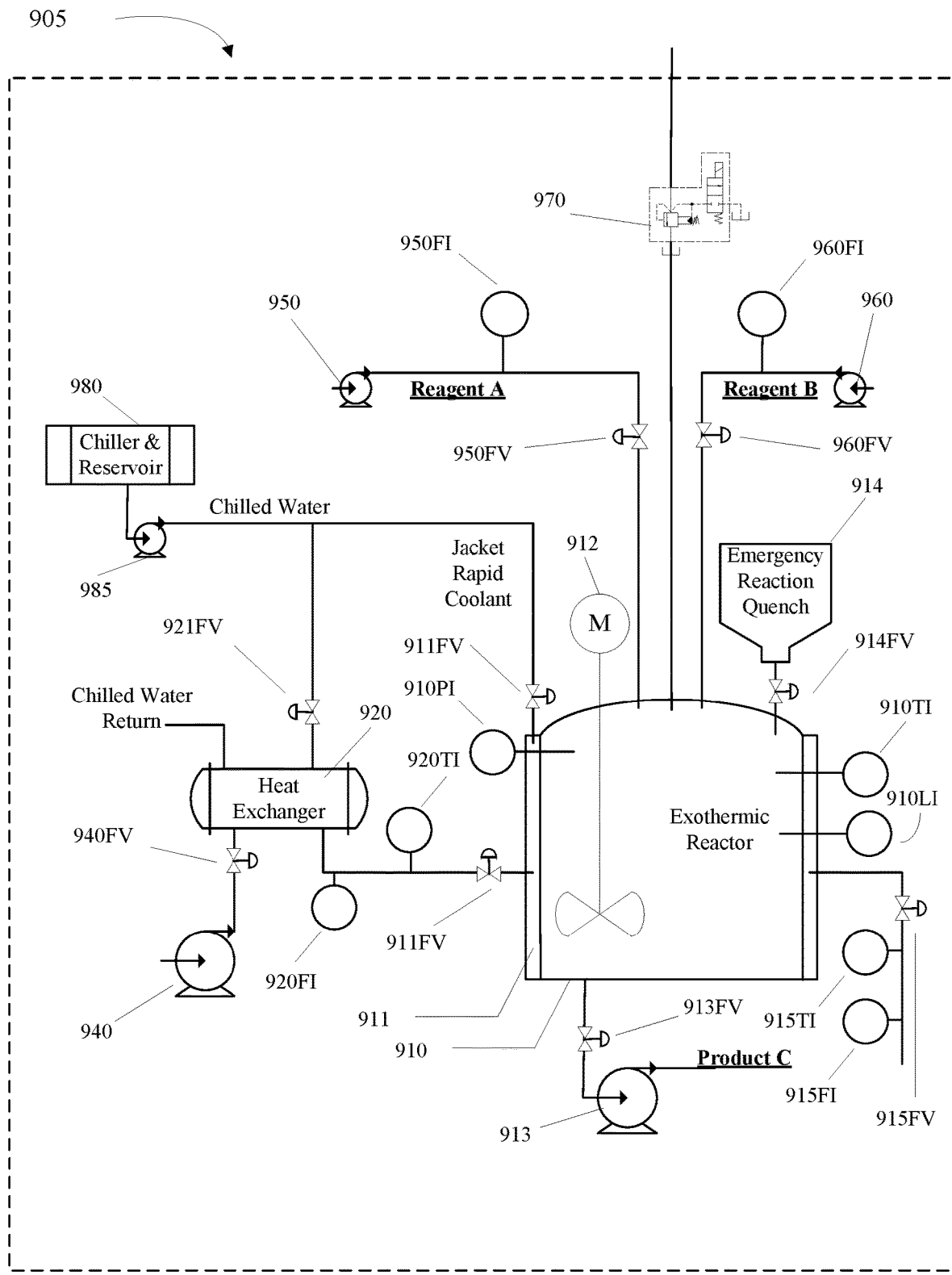
FIG. 9B is a diagram illustrating equipment elements controlled by a Hierarchical Asset Control System for a single industrial process cell in accordance with various embodiments of the present disclosure.

It should be appreciated that FIG. 9A is one representation of the equipment that many be controlled by an Integrated Smart Asset Control System, which may be at a Unit/Work Cell Asset level and FIG. 9B may be at a smart asset level as described in FIG. 5B. The complete rector unit 905 of FIG. 9B, may correspond to Reactor Unit A 904 in FIG. 9A. One or both may be Integrated Smart Asset Control System structures depending on the particular industrial application. Development of the Hierarchical Asset Control Application is contemplated for the various hierarchical levels of the entire structure.

FIG. 9B is a diagram illustrating an industrial process examples in accordance with various embodiments of the present disclosure.

A complete reactor unit 905 is illustrated which includes a reactor vessel 910 and a number of sensors and valve positioners. Pressure indicator 910PI, temperature indicator 910TI, and level indicator 910LI provide measurements inside the reactor vessel. A reactor cooling jacket 911 with associated flow valve 911FV controls the flow rate of cooling water into the reactor cooling jacket 911. A valve positioner 915FV controls the flow of warm water from the reactor cooling jacket 911 to the effluent of the plant and is monitored by a flow indicator sensor 915FI and temperature indicator 915TI to provide measurement of the temperature and flow of the effluent leaving the reactor unit 910.

The reactor agitator 912 stirs the reagents to ensure complete reaction. "Product C" has an associated pump 913 and flow valve 913FV. An emergency reaction quench tank 914 and associated flow valve 914FV is available to stop the reaction and will solidify reactants and render the reactor vessel 910 unusable.

A heat exchanger 920 that controls the temperature of the cooling water pumped to the reactor jacket 911 is associated with a series of sensors and valve positioners. Temperature indicator 920TI, flow indicator 920FI, and valve positioner 921FV measure and maintain the chilled water to the heat exchanger 920. The fresh water pump 940 pumps fresh water into the heat exchanger. This fresh water is what is pumped into the reactor jacket 911 to remove heat from the reactor vessel 910. A valve positioner associated with this fresh water pump 940FV controls the flow rate of the cooling water entering the heat exchanger 920.

"Reagent A" pump 950 pumps the reagent material into the reactor vessel 910. Related to the pump are a flow sensor 950FI and a valve positioner 950FV. A similar structure exists for "Reagent B" where a pump 960 pumps the reagent into the reactor vessel 910. Related to the pump are a flow sensor 960FI and a valve positioner 960FV.

A pressure relief valve 970 vents open when the pressure inside the reactor vessel 910 exceeds a limit. This vents to a smoke stack which is open to the outside environment.

In the present example a chiller and reservoir 980 supply is used to cool the public water to a desired temperature and pump 985 into the reactor cooling jacket 911. Further, in abnormally high temperature conditions, it may be pumped directly into the reactor cooling jacket 911 to quickly slow or stop a reaction while preserving the Reactor Vessel. This chill water may also be added directly to the effluent to reduce the BTUs being released to the environment.

Figure 10:
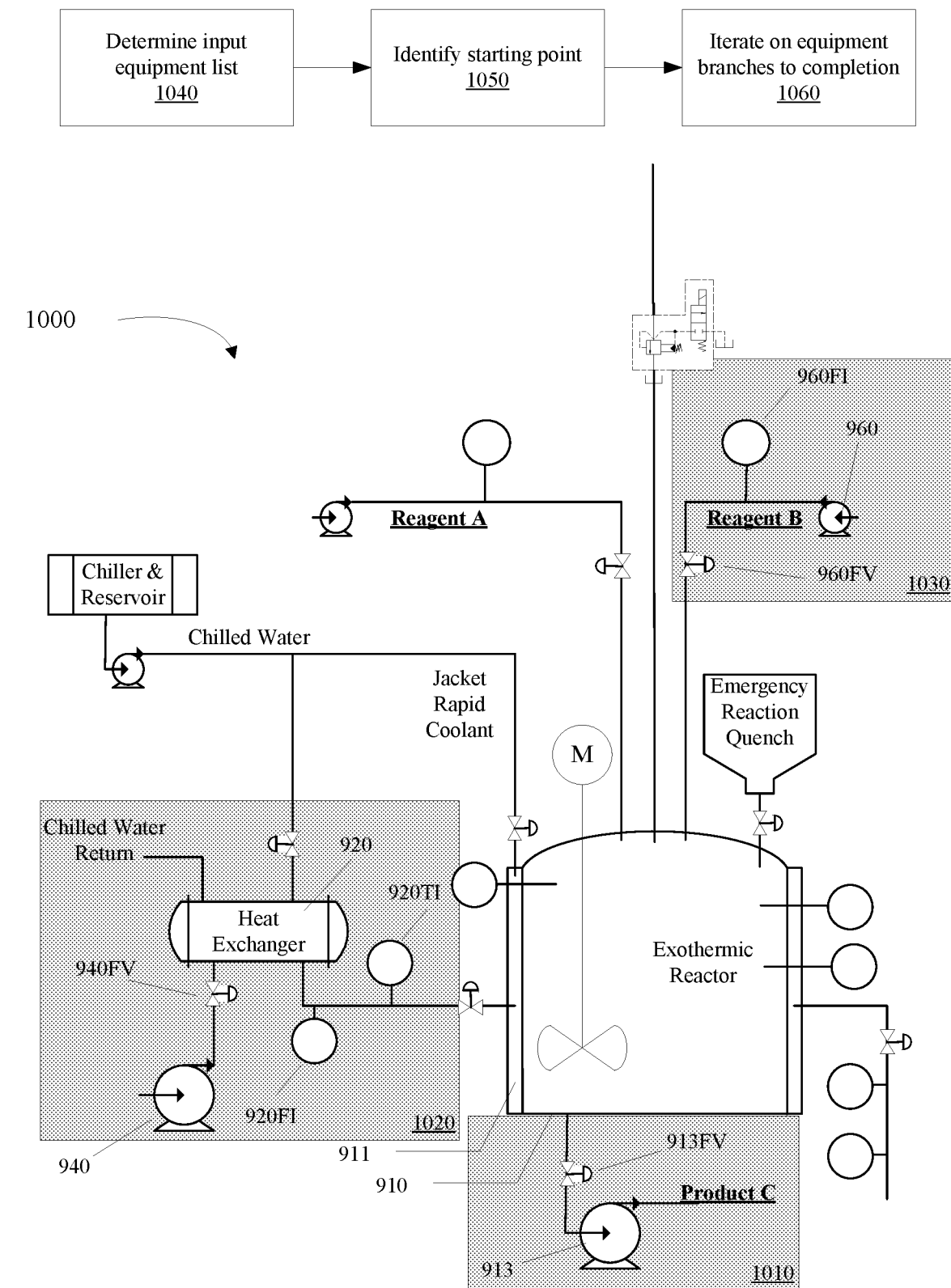
FIG. 10 is a diagram illustrating various aspects of an example of processing a system equipment list to develop a Hierarchical Asset Control Application in accordance with various embodiments of the present disclosure.

FIG. 10 is a diagram illustrating aspects of an example of initial processing of underlying equipment elements to start development of the Hierarchical Asset Control Application in accordance with various embodiments of the present disclosure. In the illustrated exothermic reactor industrial system 1000, an equipment list is determined and obtained 1040 to describe the equipment elements and their respective parameters that comprises the reactor industrial system 1000. This list will be composed of the various equipment elements illustrated and described in FIG. 9. A first equipment element is selected 1050 to begin the processing of the equipment list. In the present example, the exothermic reactor 910 is chosen. As noted previously, any equipment element may be chosen to begin the process. The exothermic reactor 910 was chosen in this case as it is a fundamental piece of equipment in the system and is known to have various parent/child relationships with asset groupings such as the flow valve 913FV and any associated equipment for "Product C" 1010, a heat exchanger asset grouping 1020, the flow valve 960FV associated with the "Reagent B" asset grouping 1030. Each child of the exothermic reactor 910 is queued for processing and noted as a potential parent/child control element for subsequent processing. For example, added to a list of potential child control equipment element connected to the parent asset-exothermic reactor 910. Each equipment element is processed in the list until all equipment elements have been processed 1060. In the present example, the heat exchanger 920 may be processed and all children to the heat exchanger 920 identified such as fresh water pump 940, and flow valves 940FV and 921FV. As with the initial parent asset, there is no particular order as to how each equipment asset be processed, so long as all equipment is processed.

Figure 11:
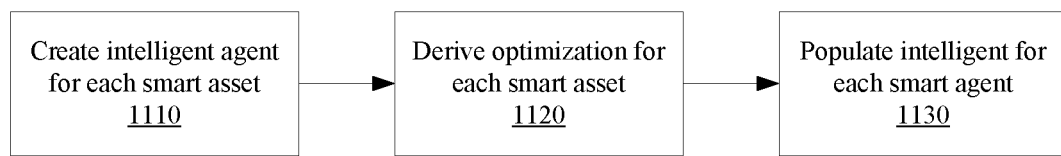
FIG. 11 is a diagram illustrating various aspects of an example of developing a hierarchy of intelligent agents for a Hierarchical Asset Control Application in accordance with various embodiments of the present disclosure.
Figure 11:
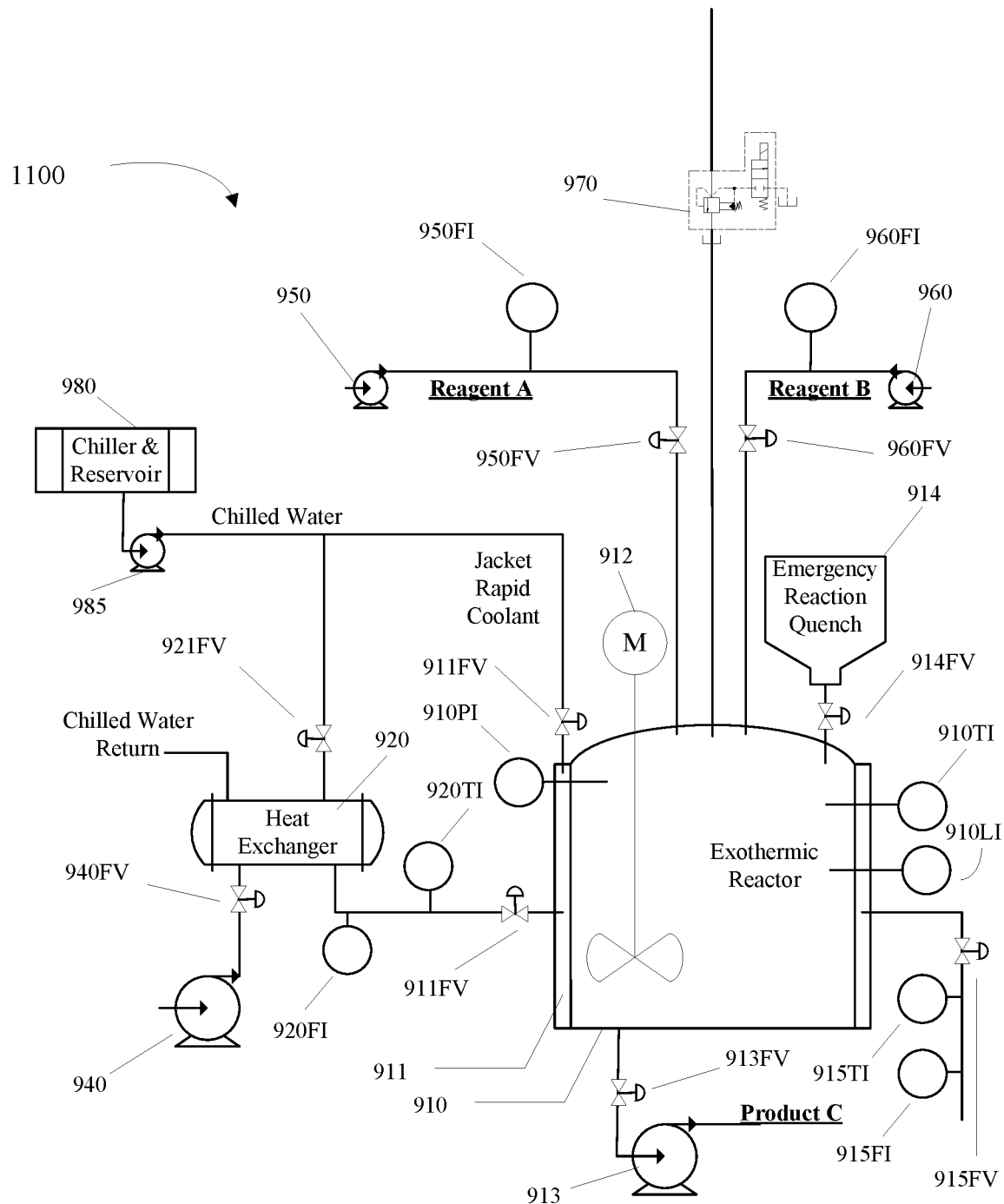

FIG. 11 is a diagram illustrating various aspects of an example of developing a hierarchy of intelligent agents for a Hierarchical Asset Control Application in accordance with various embodiments of the present disclosure.

With all equipment defined in the reactor industrial system 1100, the system now defines an asset instance based on the equipment list 820 and creates intelligent agents for each smart asset. As with processing the equipment list, the system may choose any point to being the process. In the present example the exothermic reactor 910 is chosen and as asset instance is defined 820 based on the characteristics defined in the equipment list. To aide in the definition of intelligent assets templates in an intelligent asset library 822 may be used which contains various intelligent asset templates to begin to characterize the smart asset. An example intelligent asset template is shown in FIG. 8C. It should be appreciated there is a high degree of flexibility as to the amount and type of data that can be populated into such intelligent asset templates. Smart asset/intelligent agent data for population may be derived from operational historical use data/operational characteristics, it can be provided by a component vendor, it can be derived as generic component models (e.g., a typical heat exchanger has a reliability curve . . . ).

Once the equipment element is mapped with an intelligent asset template and defined, intelligent asset templates components are selected 824 and an intelligent agent data structure is created for each smart asset 1110 in preparation to populate other characteristic data. In the present example, an intelligent asset template corresponding to an exothermic reactor is created and populated with available information which may include, but not limited to, the exothermic reactor name, category, model, serial number, and the type of application the exothermic reactor will be used in. This data is made available on the initial processing of the equipment list and populated into the intelligent asset data structure on selection and creation of the intelligent asset data structure specifically for the exothermic reactor 910.

As the smart asset and the industrial application has been identified, a characterization of the constraints of the asset 828, in this example the exothermic reactor 910, is defined. While various constraints may exist, in the specific example, safety, environmental, and reliability constraints are contemplated. An example a safety constraint may be the exothermic reactor may only be operated to an absolute maximum of 500 MPa as indicated by the pressure gauge 910PI. Violating this constraint may lead to catastrophic failure of the exothermic reactor 910 and present a substantial safety hazard. An environmental constraint example may involve the temperature of the water in the exothermic reactor jacket 911 due to an exothermic reaction in the reactor. For example, warm water from the jacket may only be expelled to the local water supply at a temperature of 100 Fahrenheit as indicated by temperature gauge 910TI. Failure to adhere to this operational risk constraint may lead to regulatory penalties and harm to a local environment. Finally, a reliability constraint example may be developed such that the exothermic reactor 910 has a maximum of 100,000-hour service life for supporting continuous material processing. Exceeding this constraint may lead to reduced efficiency of the exothermic reactor 910 and/or risk of reactor element operational failure, both of which would impact control, management and optimization of the Integrated Smart Asset Control System and the process associated with the Integrated Smart Asset Control System. Each of these, and any other constraints, are populated into the intelligent asset data structure 832 for the given equipment element, in this example, the exothermic reactor 910. This, now complete, exothermic reactor intelligent agent data structure may be stored into an intelligent asset database 834. This process of creating intelligent agent data structures is repeated for all equipment, such as the "Product C" pump 913 and valve 913FV equipment grouping, heat exchanger equipment grouping 1020, and "Reagent B" equipment grouping 1030.

Once all constraints have been calculated and a smart asset basis, any optimization for any variable defined by the system or a user of the system, such as real time operating profit is derived and the creation of an optimization for each asset 1120 is performed and stored in the intelligent agent for each smart asset. This process continues until intelligent asset data structures have been created for each element of physical equipment and a complete system/application asset list exists 838 for the reactor industrial system 1100 and each smart asset has a populated corresponding intelligent asset with relative constraints, objectives, and optimization solution 1130.

Figure 12:
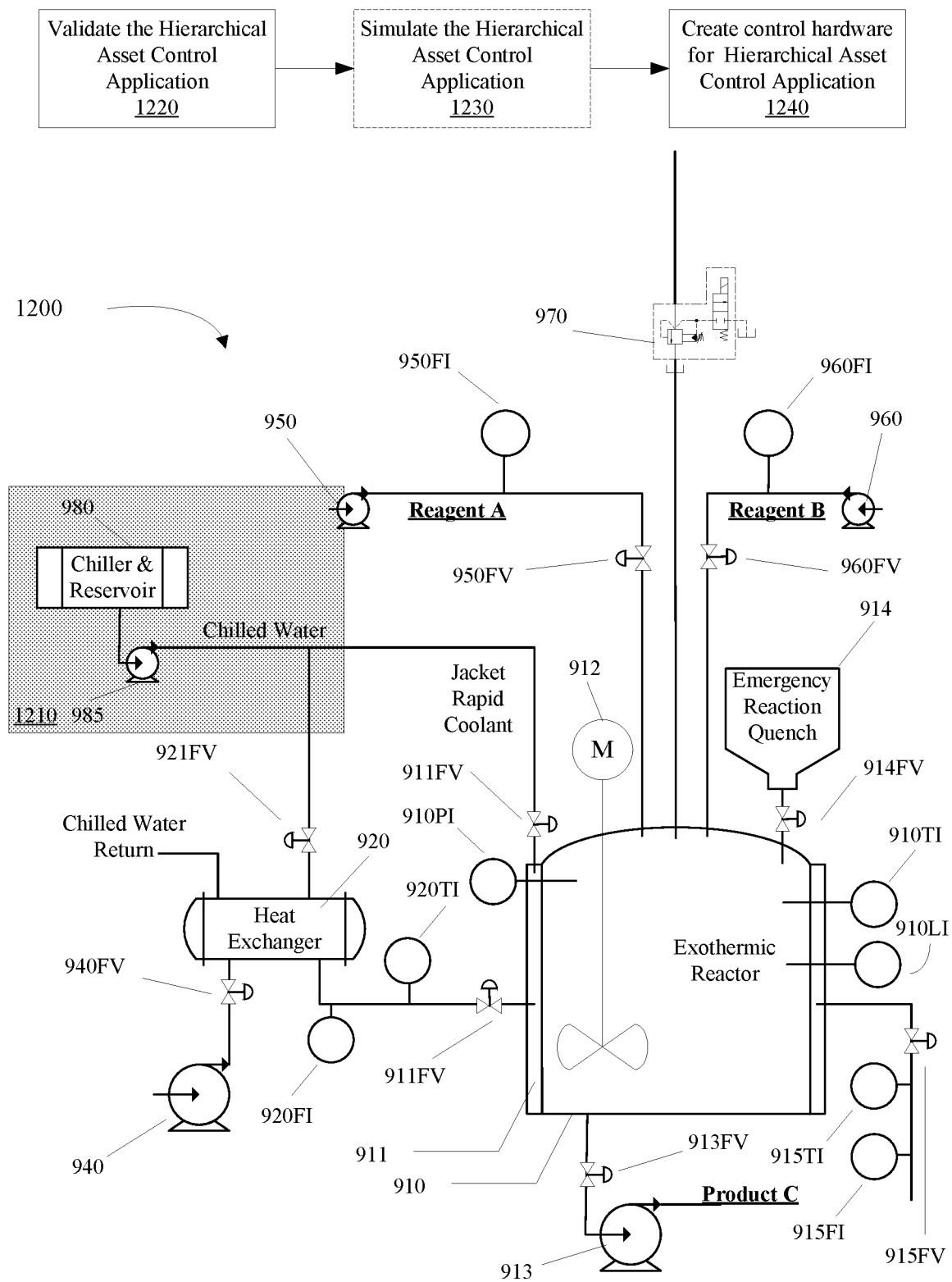
FIG. 12 is a diagram illustrating various aspects of an example of simulation and validation for a Hierarchical Asset Control Application and corresponding control hardware in accordance with various embodiments of the present disclosure.

FIG. 12 is a diagram illustrating various aspects of an example of simulation and validation for a Hierarchical Asset Control Application and corresponding control hardware in accordance with various embodiments of the present disclosure.

This validation may include both the validation of the smart assets themselves as well as the hierarchy formed by the composition of smart assets. As the complete system/application smart asset list exists 842 for the reactor industrial system 1200, each parent/child asset communication and control path is validated 844. Various methods exist to validate such paths including but not limited to intra-asset communication such as data packet "pings" or other more formal, protocol based handshakes such as, but not limited to, TCP/IP addressing. Validation of the example industrial system may include utilizing the asset list to begin the validation and determining each parent can communicate to each child. In the present example, the heat exchanger 920 which controls the temperature of the cooling water pumped to the reactor jacket 911 will validate its children assets including temperature indicator 920TI to provide a measurement of the temperature of the cooling water, flow indicator 920FI which provides a measurement of the flow rate of cooling water, valve positioner 920FV controls the flow of cooling water, and valve positioner 921FV controls the flow rate of the chilled water to the heat exchanger. This process continues until the entire smart asset list has been evaluated validated both as an individual smart asset and communication within the control hierarchy formed by the collection of assets as the Hierarchical Asset Control Application. A query is made by the system to determine if any issues or anomalies exist in the parent/child validation 846. If any issues exist, they are remediated 848 and once the remediation is completed 852, or if no issues existed, the process continues to a step of simulating the complete validated hierarchical industrial system/application.

Given the example of a complete validated industrial asset hierarchical structure for the reactor industrial system 1200, prior to control system commissioning, simulation of the Hierarchical Asset Control Application 1220 may be performed to further confirm the proposed industrial solution will behave as expected when instantiated in hardware. If a simulation of the Hierarchical Application Control Application is being performed 1230 and an issue is determined to exist, the issue may be presented for remediation. For example, the pump 985 responsible for providing chill water from the chiller and reservoir 980 forming a chiller asset 1210 is not of an appropriate type for characteristics such as flow rate, physical size, or any other parametric as determined by the system or a user of the system, the issue may be remediated 856, prior to deployment of a hardware system.

Such remediation may include, but is not limited to, adjusting the asset template for the particular asset, adjusting the intelligent asset data structure to accommodate for other considerations, or replacing the particular equipment, in this case the pump 985 with a piece of equipment more suitable for the industrial application. Once this replacement has been completed, the entire process of determining the equipment list 710, selecting one or more asset templates 720, creating an intelligent agent data structure 730, developing the intelligent agent 740, and validating and simulating the complete system should be repeated to thoroughly validate the entire Integrated Smart Asset Control System.

Once the completely validated Hierarchical Asset Control Application is available, hardware instantiation of the supporting control system may be created 1240, deployed, and integrated with the underlying equipment elements in conjunction with any control hardware required to transform the Hierarchical Application Control Application as described in FIG. 8E to an Integrated Smart Asset Control System an example as illustrated in FIG. 5B.

The extended control aspects of the Hierarchical Asset Control Application actually partition into two general categories of real-time control. First is providing real-time control for the basis objectives of the business which may include, but are not limited to, profitability, operational profitability, operational efficiency and asset reliability. The second is providing real-time control on the dynamic constraints on the objectives such as, but not limited to, safety-risk, environmental risk and security rules. The diagram depicted in FIG. 13 displays an example of a basic system model optimization functionality for the objectives and dynamic constraints of a Hierarchical Asset Control Application. Each box in the diagram represents one aspect of the overall control system. The "Process Control for Operational Efficiency Improvement" involves process control as associated with the target asset. Each of the other functions will be described individually in reference to FIGS. 13 and 3B in the description below.

Control System Components

Figure 13:
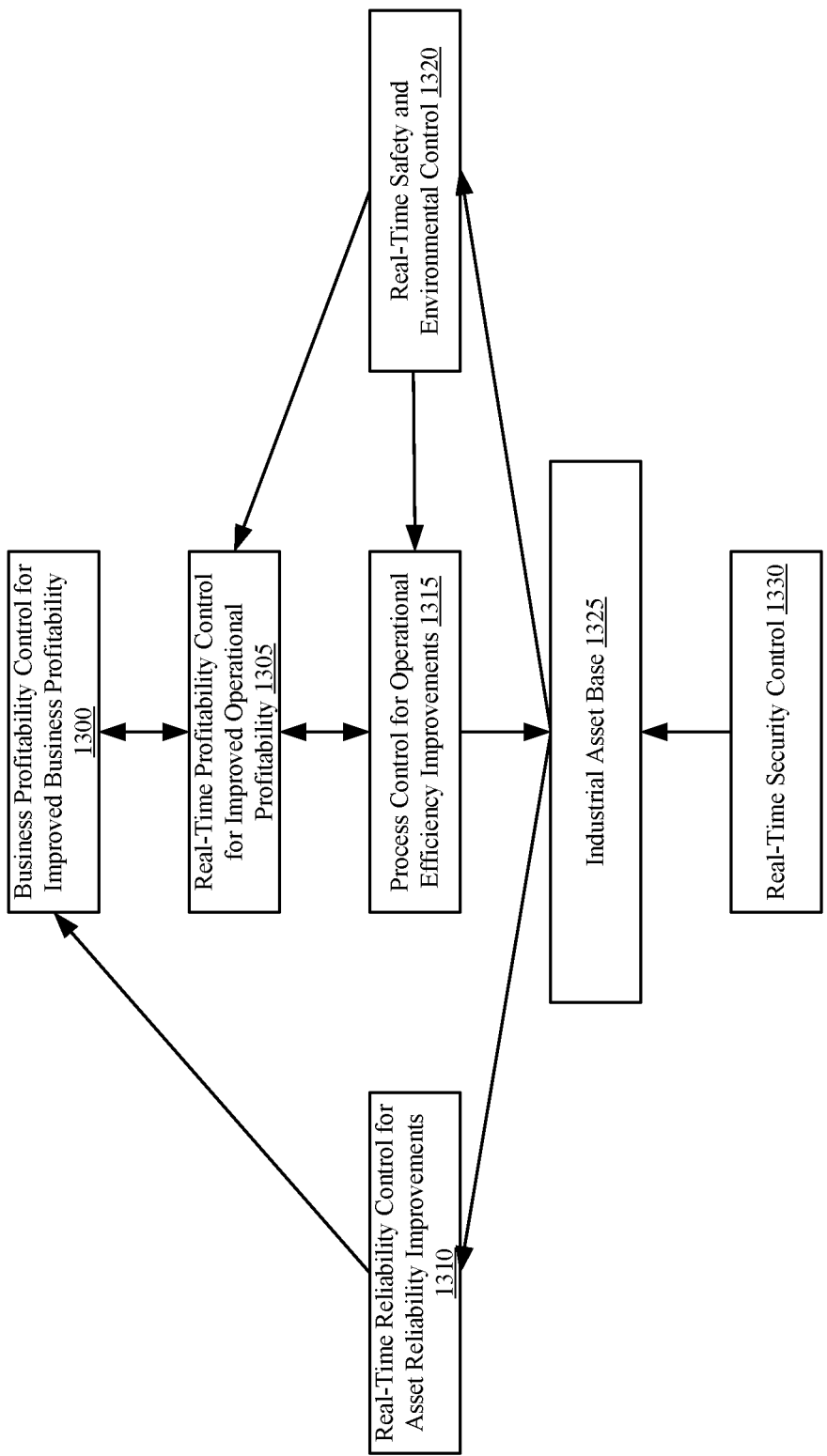
FIG. 13 is a diagram illustrating an example of a control system model for optimizing the objectives and dynamic constraints of a Hierarchical Asset Control Application in accordance with various embodiments of the present disclosure.

The extended control aspects of the Hierarchical Asset Control Application can be partitioned into two general categories of real-time control. For example, providing real-time control for the basic objectives of a business objectives such as profitability, operational profitability, operational efficiency and asset reliability can be one category. The second category can be providing real-time control on the dynamic constraints on the objectives such as safety risk, environmental risk and security rules. The diagram depicted in FIG. 13 illustrates an example of a control system model for the objectives and dynamic constraints of the system. Each block in the diagram represents one aspect or component of the overall control system. FIG. 3B illustrates example components of an intelligent agent 325 in a CPS associated with a smart asset or smart asset set or other smart asset grouping for providing real-time control of the basic objectives of a business and dynamic constraints of objectives (i.e., real-time control over profitability, reliability, process efficiency, safety risk, environment risk and security rules). In some embodiments, the intelligent agent 325 can include a Real Time (RT) profitability controller 330, an RT process efficiency controller 335, an RT reliability controller 355, an RT environmental risk controller 345 and an RT safety risk controller 350. It should be noted that in some embodiments, the intelligent agent 325 may include more or less controllers, thereby providing control over more or less domains. In some embodiments, a coordinator module 340 may be included in the intelligent agent for coordinating the execution of the controllers according to a control hierarchy. In yet other embodiments, the intelligent agent 325 can include other modules besides the RT controllers. Examples of such modules can include but are not limited to: a historization module 365 and a small data analytics engine 370.

Referring to FIG. 3B, the intelligent agent 325 can include other modules such the historization module 365 and the small data analytics engine 370 in some embodiments. The historization module 365 can generate historical data associated with an asset or asset set. Such historical data can include sensor measurements, set points, deviations from set points, corrective actions taken, and/or the like, and can provide a snapshot of the state or health of the asset or asset set at a point in time. The historical data can be reported to higher level asset sets (e.g., for calculations) and/or exported to other systems such as the big data analytics engine 2205 described in reference to FIG. 22. The small data analytics engine 370 can locally collect and analyze data associated with the asset or asset set and report results to the big data analytics engine 2205 of FIG. 22 directly or through a higher level intelligent agent.

Referring to FIG. 13, block 1315 represents the process control function as provided by automation systems for process control as associated with the target asset. The process control function can be implemented by the RT process efficiency controller 335 depicted in FIG. 3B. Each of the other functions will now be described individually in the descriptions below.

Real-Time Profitability Control for Improved Operational Profitability

In some embodiments, real-time profitability control function can be partitioned into two components corresponding to blocks 1305 and 1300 as shown in the model depicted in FIG. 13. These control functions at the smart asset or smart asset set level, which may be represented by an industrial asset base 1325, or other structure defined herein including Hierarchical Asset Control Applications or Integrated Smart Asset Control Systems, may be implemented by the RT profitability controller 330, specifically the business profitability controller 330a and operational profitability controller 330b depicted in FIG. 3B. As used herein, operational profitability is defined as the profitability created for a business based on decisions made within the industrial operation, while business profitability is defined to be the profitability created for the business based on decisions made above the industrial operation. The operational profitability functions are guided by the business profitability functions.

The business profitability control function 1300 represents control decisions that involve business decisions at a level above the operations. These decisions may include things such as production to schedule based on contractual commitments. For example, a contract commitment may involve the production of a defined amount of product by a defined delivery date. The contract may have been accepted at a point of time in which meeting the commitment within normal production operations did not present a significant risk. If something were to happen in the operation that increases the risk that the contract may not be fulfilled, decisions may need to be made at this level to control the response. For example, if the system determines that the reliability of an asset required to fulfill production schedules is declining at an unexpected rate and that the smart asset may need maintenance, a decision at this level may need to be made to determine whether the best business decision would be to risk continuing operating until the commitment is reached, or to shut down for maintenance. This control decision would typically be made manually (manual control) today by highly experienced production managers, but may be able to be made automatically (automatic control) once enough knowledge has been gained through experience with the new performance measures of the operation. A suitable automatic control system can be an expert system that emulates the decision processes of the best production managers. The output of the business profitability control function 1300 can cascade to the real-time profitability control function of the operation 1305 and together these controls can provide guidance (set points, automatic/manual etc.) to the real-time profitability control strategies.

In some embodiments, it is useful to consider real-time profitability control as the primary loop of a cascade control strategy with the secondary loops being the process control loops traditionally associated with improved operational efficiency. From that perspective, the outputs of the real-time profitability controllers will be the set points of the controllers designed for operational efficiency improvements. Each set point in a process control system needs to be set at a particular value or within a range of values for the operation to be maximizing operational profitability. The real-time profitability controllers can set those set points accordingly.

From a manual control perspective, the way in which real-time profitability control is accomplished is that the operator responsible for setting the set points of the controllers of the operation views the real-time profitability measures for that operation and modifies the set points within the allowable values for each. The operator then looks at the real-time profitability measures to determine whether they increased, decreased or stayed the same. If they increased, the operator will continue to change the set points in the direction that caused the increase. If they decreased the operator will back off the set points to reverse the decrease, and if they did not change the operator may try some other set points. Over time the operators will learn which set points provide the best benefit during each phase of operation and will prioritize the set point manipulations accordingly. Since the real-time profitability of the process is dynamic, the operators should continually modify set points to determine if there are continual opportunities for improvements.

An automatic real-time profit controller can be developed by automating the operator approach via expert systems technologies. Over time and experience with manual profitability control the appropriate set point priorities, values and directions of change can be determined for different phases of the operation. The expert system controller can be developed to directly and automatically perform the most profitable set point modifications continuously and may be implemented using components illustrated in FIG. 28.

Alternatively, an integral only controller may be implemented for the real-time profitability measures associated with each part of the operations. The set point to the real-time profitability controller can be set to a high range based on prior real-time profitability experience. The output of the integral controller can be set up to drive an incremental signal based on the deviation from set point that signal can be attached to each of the process controller set points in a directionally compensated manner that will either add or subtract incremental values from each process control set point to drive the profitability in the appropriate direction. Integral control is a suitable choice in this case because it does not require a physically determined natural period of the control loop to work correctly. Some real-time profit control loops may not be constrained to a constant period since they may be human transaction determined.

It is to be understood for the purposes the following examples as illustrated by the figures, the features and functionality are achieved and executed by an operational Integrated Smart Asset Control System developed from a Hierarchical Assets Control Applications and corresponding control hardware developed for the underlying equipment elements.

Real-time profitability measurement is designed to determine the real-time component profit impact from a smart asset or smart asset set or other smart asset groupings in an industrial operation over a finite time period. In some embodiments, this measurement can be defined by the following example equation:

$$\text{RT Profitability} = \text{Production Value} - (\text{Consumed Energy Cost} * \text{Energy Consumption} + \text{Material Cost} * \text{Material Consumption}) \Delta t$$

Wherein, Production Value is the current value of the products produced times the amount of product produced over the time frame in consideration ($\Delta t$). The value of the products produced can be established in a number of ways depending on the client. For example, the value of the products produced can be the transfer price if the client utilizes a transfer pricing mechanism. By way of another example, the value may be the current market value of the products when they are produced even though they may not actually be sold at that value. It is up to the client as to how this variable should be implemented since this is a human-based, not science-based decision. Consumed Energy Cost is equivalent to the energy cost at time of consumption times the amount of energy consumption. Material Cost is equivalent to material cost at time of consumption times the amount of material consumed.

II. Real-Time Asset Safety Risk Constraint Determination

Figure 14A:
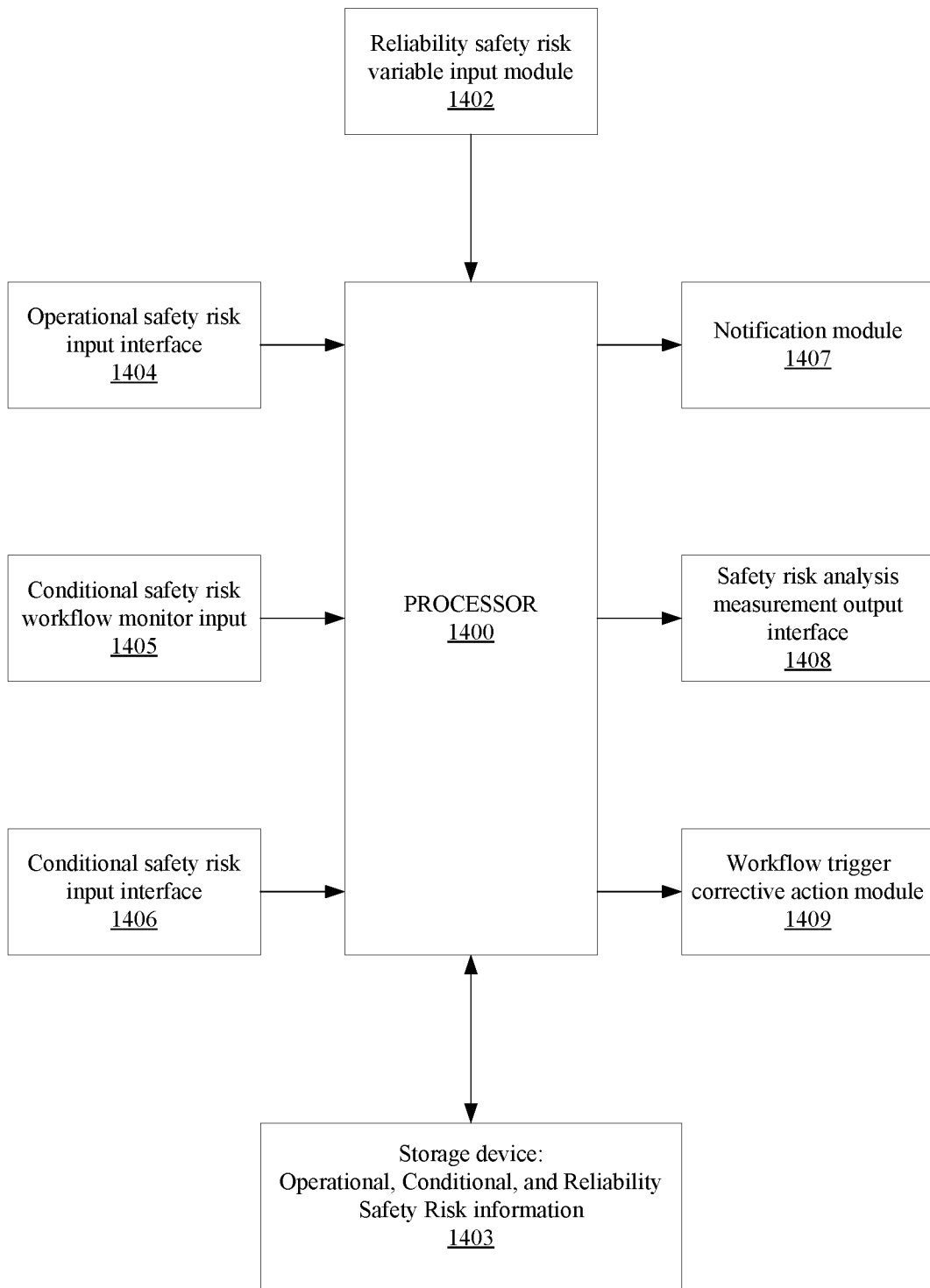
FIG. 14A is a block diagram illustrating determining a safety risk constraint related to assets in a Hierarchical Asset Control Application in accordance with various embodiments of the present disclosure.
Figure 14B:
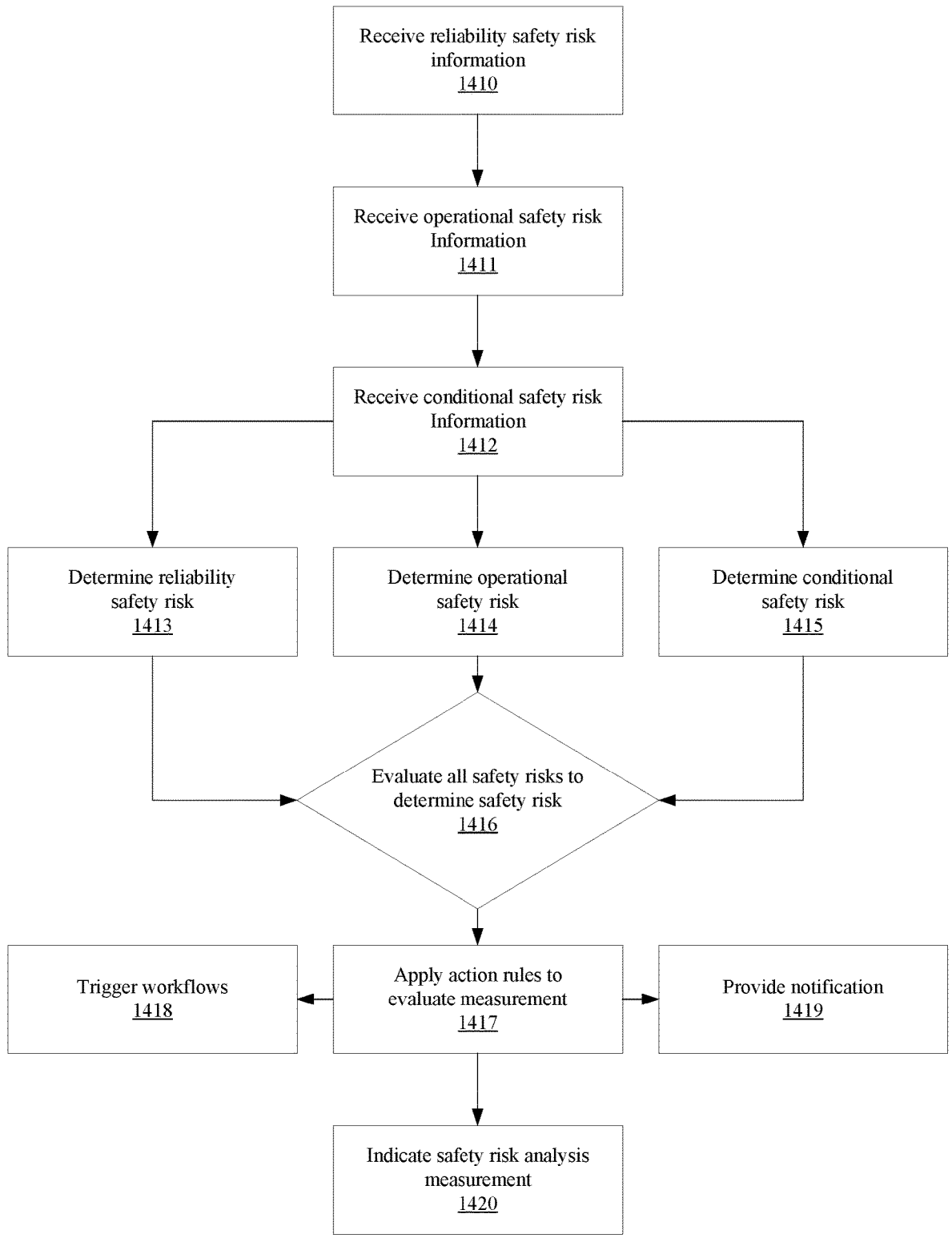
FIG. 14B is a logic flow diagram illustrating determining a safety risk constraint related to assets in a Hierarchical Asset Control Application in accordance with various embodiments of the present disclosure.

FIG. 14A is a block diagram and FIG. 14B is a logic flow diagram illustrating determining a safety risk constraint related to assets in a Hierarchical Asset Control Application in accordance with various embodiments of the present disclosure.

Safety risk is the measurement of the probability that an asset may be involved in an immanent safety incident multiplied by the expected severity of the safety incident which is based on either past experience, extrapolation, or a combination of both. Safety risk measurement as defined may be very similar to other constraint measurement, such as reliability measurement.

A primary distinguishing aspect of safety risk is the severity of associated consequences. Reliability failures may shutdown and damage equipment, but the expectation of the severity of the damage is below a safety threshold. Safety risk implies that the degree of equipment damage may be higher and that there may be risk to people and the plant facility. Each industrial operation may assess the consequence level necessary to consider a risk to be a safety risk as compared with merely a reliability risk.

An overall RT safety risk for a Hierarchical Asset Control Application may be defined by the maximum of a derived Reliability Safety Risk, Operational Safety Risk, and Conditional Safety Risk. A maximum value of Reliability Safety Risk, Operational Safety Risk, and Conditional Safety Risk is selected as it provides a method to qualify the most significant risk of the three associated with the operational process at a given time.

A reliability safety risk input module 1402 determines the Reliability Safety Risk and is a value determined by the relationship:

$$\text{Safety Risk} = \text{MAX}(p_1 S(t)^* E_1, p_2 S(t)^* E_2, \ldots, p_n S(t)^* E_n).$$

Wherein: $pS_1(t)$ is the probability of safety incident I occurring in time t, and E is the expected consequence if the incident I occurs.

There are two basic aspects to the type of safety incidents that may happen in a Hierarchical Asset Control Application. First, is a failure of an asset that leads to a safety incident. Second is the failure of a process corresponding to an asset or set of assets that might lead to a safety failure.

In the first instance the $p_1 S(t)$ term is essentially equivalent to the probability of equipment failure from a reliability measurement perspective. The $E_t$ term is the expected consequence level that will result from such a failure. As safety risk is generally a critical concern in industrial operations, it may be appropriate and advisable to set $E_t$ to the maximum expected consequence associated with the defined safety failure. It should be appreciated that other values are able to be set and are contemplated as part of this disclosure. A decision to set $E_t$ to either the expected consequence level of the maximum consequence level is the responsibility of plant management, or other party. A safety risk measurement approach and calculation will work the same way in either case. Once an asset reliability measurement assessment has been completed for the smart asset, the smart asset safety risk measurement assessment will be fairly straight forward to develop. The only information that will need to be added is the value of the expected consequence for each potential safety risk incident.

The second type of safety failure results from a process safety failure which may involve multiple simultaneous variables changing which together result in a safety incident. The probability of a process safety incident occurring within a smart asset or smart asset set, or other smart asset grouping can be determined by analyzing past incidents that have occurred through use of historic data within the present or similar assets to identify the combination of lead indicators of past safety incidents. Post-analysis, utilize any lead indications to determine if current operational conditions in the asset signal the immanent probability of a repeated process safety incident of a similar type.

This determination may be accomplished through the utilization of real-time workflows designed to recognize the lead indicators. This should be done for all past process safety incidents associated with the asset. The $pS_i(t)$ for process safety risks can be established by determining the average time between past lead indications and the occurrences of the safety incidence and extrapolating that time to the t in the probability analysis. It may be appropriate when dealing with safety risk analysis, to set the probability to a high value immediately upon occurrence the lead indicators. This is typically the responsibility of plant management or other responsible party. It should be noted that there may not be enough safety incidences in a Hierarchical Asset Control Application to get a base for comprehensive process safety risk analyses. In these cases, the analysis of safety incidences that have occurred in other similar or analogous operations may help to provide the base of historical information necessary for reliable analysis. A library of such similar or analogous Hierarchical Asset Control Application control application safety data may be available from a variety of sources.

Effectiveness of the safety risk measurement will correlate to the value of the expected consequence of a safety incident, $E_i$. An expected value of the consequence of a safety incident, $E_i$, is a numeric indicator of the extent of damage, injury or death which may be expected from an incident of the type predicted. Since severity is a combined qualitative and quantitative metric, $E_t$ could be expressed as a normalized value in order to establish a stronger relative assessment of the safety risk across potential incidents. It may be appropriate for the $E_i$ to be the greatest potential severity of the worst of the past events of the same type, rather than the expected severity. This may better represent the caution that should be applied to safety risk in industrial operations. Again, whether expected severity of greatest potential severity is employed is the responsibility of plant management or other responsible party.

An operational safety risk input module 1404 determines the Operational Safety Risk and is a value determined by characteristics such as the thoroughness and timeliness of safety inspections. These inspections may be defined by the industrial application operator, as defined by local standards, or equivalent regulatory agency, such as OSHA. A safety team on site or other responsible party makes the determination as to the Operational Safety Risk.

A conditional safety risk input module 1406 determines the Conditional Safety Risk and is a value determined by the recognition of lead indicators of potential safety incidences as determined from analysis of past safety incidences. If the lead indicators of a potential safety incident are recognized, the conditional safety risk value is set according to the expected time and severity of the occurrence of the incident based on past experience. A safety team on site or other responsible party makes the determination as to the Conditional Safety Risk.

To evaluate the overall safety risk, the process will receive reliability safety risk information 1410, operational safety risk information 1411, and conditional safety risk information 1412. This information may be input from a user to the system, or from the system itself in real time, from a storage device to the system 1403, or from a repository outside of the system such as the cloud.

With these inputs and that of the conditional safety risk workflow monitor 1405, the system will determine the Reliability Safety Risk 1413, Operational Safety Risk 1414, and Conditional Safety Risk 1415 as defined above. An overall RT safety risk for a Hierarchical Asset Control Application is evaluated 1416 by the maximum of a derived Reliability Safety Risk, Operational Safety Risk, and Conditional Safety Risk.

As a result of the evaluation of the overall RT safety risk 1416 will analyze the output of the overall safety risk 1408 and apply any action rules to be evaluated 1417 based on the overall RT safety risk. A notification module 1407 will provide notification 1419 to a user of the system or the system itself and a workflow trigger and corrective action module 1409 will trigger workflows 1418 proscribed for the system to maintain or remediate conditions observed and determined.

This overall RT safety risk 1416 may be used by the real-time safety control function 1320 and provides a constraint to both real-time efficiency control 1315 and real-time profitability control 1305 functions. The control function for real-time safety risk involves two approaches. First is the safe control of the production process through effective process control strategies designed to control the process within safe limits. Second is evaluating the current real-time safety risk and the change in safety risk over a defined time period associated with each asset and asset set to determine whether the safety risk profile reaches an unacceptable level. The unacceptable level of safety risk can be defined by the client (e.g., management and professional team of the operation). If the safety risk controller determines that the safety risk is approaching an unacceptable level, the controller can determine the appropriate action and send a message to the appropriate controllers of the process control system and/or the real-time profitability control system for action. For example, if the safety risk is approaching an unacceptable level, the initial safety risk control action may be to send a message to the real-time profitability control function, which may take actions to slow down production in order to reduce the real-time safety risk. If the real-time safety risk is more critical, the safety risk control action may be to send a control message to the process control system to either directly reduce production by altering set points in order to reduce the safety risk, or shutdown parts or all of the process to avoid a safety incident, or some combination of the two.

In some embodiments, real-time safety risk control can be implemented by the RT safety risk controller 350 depicted in FIG. 3B. In some embodiments, the controller for real-time safety risk control can be based on an expert system or automatic workflow that emulates the response of a safety expert and sends the appropriate outputs to either the real-time profitability control function, or the process control function, or both as appropriate. In other embodiments, the real-time safety risk control can be implemented manually, for example, by a safety professional.

III. Real-Time Asset Environmental Risk Constraint Determination

Figure 15A:
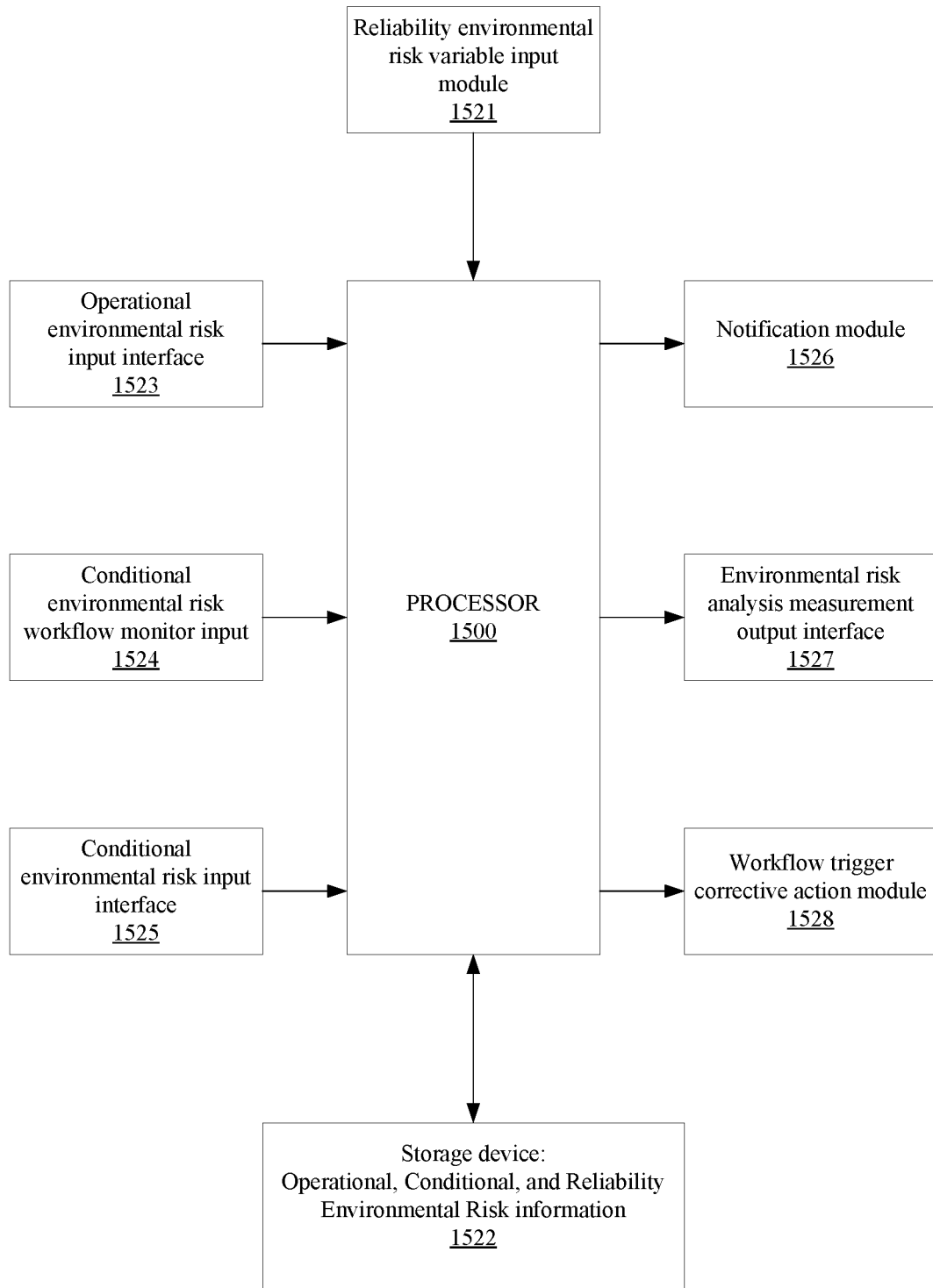
FIG. 15A is a block diagram illustrating determining an environmental risk constraint related to assets in a Hierarchical Asset Control Application in accordance with various embodiments of the present disclosure.
Figure 15B:
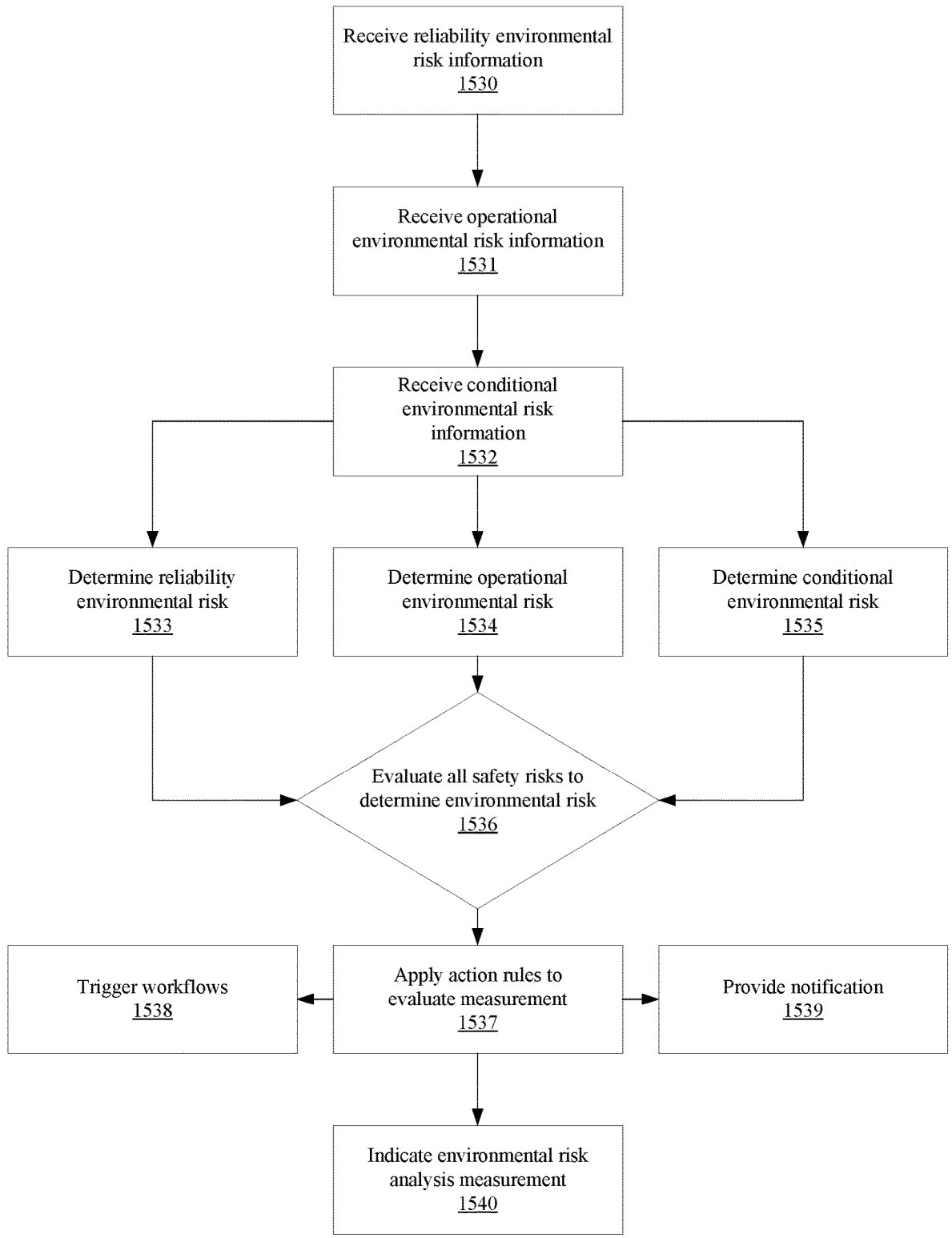
FIG. 15B is a logic flow diagram illustrating determining an environmental risk constraint related to assets in a Hierarchical Asset Control Application in accordance with various embodiments of the present disclosure.

FIG. 15A is a block diagram and FIG. 15B is a logic flow diagram illustrating determining an environmental risk constraint related to assets in a Hierarchical Asset Control Application in accordance with various embodiments of the present disclosure.

Environmental risk is a special case of safety risk in which the expected damage might occur outside of the plant borders. Environmental risk is the measurement of the probability that an asset will be involved in an immanent environmental incident multiplied by the expected severity of the environmental incident based on either past experience, extrapolation, or a combination of both.

An overall RT environmental risk for a Hierarchical Asset Control Application may be defined by the maximum of a derived Reliability Environmental Risk, Operational Environmental Risk, and Conditional Environmental Risk. A maximum value of Environmental Safety Risk, Operational Safety Risk, and Conditional Safety Risk is selected as it provides a method to qualify the most significant risk of the three associated with the operational process at a given time.

A reliability environmental risk input module 1521 determines the Reliability Environmental Risk and is a value determined by the relationship:

$$\text{Environmental Risk} = \text{MAX}(p_1E(t)*E_1, p_2E(t)*E_2, \ldots, p_nE(t)*E_n)$$

Wherein: $pE_1(t)$ is the probability of environmental incident I occurring in time t and $E_i$ is the expected consequence if the incident I occurs.

There are two basic aspects to the type of environmental incidents that may happen in an industrial operation. First is a failure of an asset that leads to an environmental incident. Second is the failure of a process across an asset or set of assets that might lead to an environmental failure.

In the first instance the piS(t) term is essentially equivalent to the probability of equipment failure from a reliability measurement perspective. The Ei term is the expected consequence level that will result from such a failure. As environmental risk is generally a critical concern in industrial operations, it may be appropriate and advisable to set Ei to the maximum expected consequence associated with the defined environmental failure. It should be appreciated that other values are able to be set and are contemplated as part of this disclosure. A decision to set Ei to either the expected consequence level of the maximum consequence level is the responsibility of plant management, or other party. An environmental risk measurement approach and calculation will work the same way in either case. Once an asset reliability measurement assessment has been completed for the asset, the asset environmental risk measurement assessment will be fairly straight forward to develop. The only information that will need to be added is the value of the expected consequence for each potential environmental risk incident.

The second type of environmental failure results from a process environmental failure which may involve multiple simultaneous variables changing which together result in an environmental incident. The probability of a process environmental incident occurring within an asset or asset set can be determined by analyzing past incidents that have occurred through use of historic data within the present or similar assets to identify the combination of lead indicators of past environmental incidents. Post-analysis, utilize any lead indications to determine if current operational conditions in the asset signal the immanent probability of a repeated process environmental incident of a similar type.

This determination may be accomplished through the utilization of real-time workflows designed to recognize the lead indicators. This should be done for all past process environmental incidents associated with the asset. The $pS_i(t)$ for process environmental risks can be established by determining the average time between past lead indications and the occurrences of the environmental incidence and extrapolating that time to the tin the probability analysis. It may be appropriate when dealing with environmental risk analysis, to set the probability to a high value immediately upon occurrence the lead indicators. This is typically the responsibility of plant management or other responsible party. It should be noted that there may not be enough environmental incidences in a Hierarchical Asset Control Application to get a base for comprehensive process environmental risk analyses. In these cases, the analysis of environmental incidences that have occurred in other similar or analogous operations may help to provide the base of historical information necessary for reliable analysis. A library of such similar or analogous Hierarchical Asset Control Application environmental data may be available from a variety of sources.

Effectiveness of the environmental risk measurement will correlate to the value of the expected consequence of an environmental incident, $E_i$. An expected value of the consequence of an environmental incident, $E_i$, is a numeric indicator of the extent of damage, injury or death which may be expected from an incident of the type predicted. Since severity is a combined qualitative and quantitative metric, $E_i$ could be expressed as a normalized value in order to establish a stronger relative assessment of the environmental risk across potential incidents. It may be appropriate for the $E_i$ to be the greatest potential severity of the worst of the past events of the same type, rather than the expected severity. This may better represent the caution that should be applied to environmental risk in industrial operations. Again, whether expected severity of greatest potential severity is employed is the responsibility of plant management or other responsible party.

An operational environmental risk input module 1523 determines the Operational Environmental Risk and is a value determined by characteristics such as the thoroughness and timeliness of environmental inspections. These inspections may be defined by the industrial application operator, as defined by local standards, or equivalent regulatory agency, such as OSHA or the EPA. An environmental team on site or other responsible party makes the determination as to the Operational Environmental Risk.

A conditional environmental risk input module 1525 determines the Conditional Environmental Risk and is a value determined by the recognition of lead indicators of potential environmental incidences as determined from analysis of past environmental incidences. If the lead indicators of a potential environmental incident are recognized, the conditional environmental risk value is set according to the expected time and severity of the occurrence of the incident based on past experience. An environmental team on site or other responsible party makes the determination as to the Conditional Environmental Risk.

To evaluate the overall environmental risk, the process will receive reliability environmental risk information 1530, operational environmental risk information 1531, and conditional environmental risk information 1532. This information may be input from a user to the system, or from the system itself in real time, from a storage device to the system 1522, or from a repository outside of the system such as the cloud.

With these inputs and that of the conditional environmental risk workflow monitor 1524, the system will determine the Reliability Environmental Risk 1533, Operational Environmental Risk 1534, and Conditional Environmental Risk 1535 as defined above. An overall RT Environmental risk for a Hierarchical Asset Control Application is evaluated 1536 by the maximum of a derived Reliability Environmental Risk, Operational Environmental Risk, and Conditional Environmental Risk.

As a result of the evaluation of the overall RT Environmental Risk 1536 will analyze the output of the overall environmental risk 1527 and apply any action rules to be evaluated 1537 based on the overall RT environmental risk. A notification module 1526 will provide notification 1539 to a user of the system or the system itself and a workflow trigger and corrective action module 1528 will trigger workflows 1538 proscribed for the system to maintain or remediate conditions observed and determined. An environmental risk analysis measurement will be indicated 1540.

Real-time environmental risk can be considered a special case of real-time safety risk. Real-time environmental risk control function 1320 provides a constraint to both real-time efficiency control 1315 and real-time profitability control 1305 functions. The control function for real-time environmental risk can involve two approaches. First is the continuous control of environmental emissions (gas, liquid and solid) from the process by the application of effective process control strategies designed to control emissions within safe limits. This involves direct measurements of emissions in gas and liquid streams, and to a lesser degree to solid waste. Second is evaluating the current real-time environmental risk and the change in environmental risk over a defined time period associated with each asset and asset set to determine whether the environmental risk profile is approaching an unacceptable level. The unacceptable level of environmental risk can be defined by the enterprise (e.g., management and professional team of the operation) and/or external agencies. In some embodiments, the real-time environmental risk control function 1320 can be implemented by the RT environmental risk controller 345 depicted in FIG. 3B. If the environmental risk controller determines that an unacceptable level is being encountered, it ascertains the appropriate action and sends a message to the appropriate controllers of the process control system and/or the real-time profitability control system for action. For example, if the environmental risk is approaching an unacceptable level, the initial environmental risk control action may be to send a message to the real-time profitability control function, which may take actions to slow down production in order to reduce the real-time environmental risk. If the real-time environmental risk is more critical, the controller may send a control message to the process control system to either directly reduce production by altering set points in order to reduce the environmental risk, or shutdown parts or all of the process to avoid a safety incident, or some combination of the two.

In some embodiments, the RT environmental risk controller can be based on an expert system or automatic workflow to emulate the response of an environmental expert and send the appropriate outputs to either the real-time profitability control function, or the process control function, or both as appropriate. In other embodiments, the real-time environmental risk control function can be implemented manually, for example, by an environmental professional.

In both conditional and operational environmental incident analyses, the probabilities are a function of the specific asset with respect to the environmental incident potential.

Potential severity of the incident can be determined by the severity (in terms of cost, damage, injury and death) of the worst of the past events of the same type. Since the specific measures of injury and death costs are subjective, the potential severity may be normalized to include these qualitative factors.

IV. Real-Time Asset Reliability Risk Constraint Determination

Figure 16A:
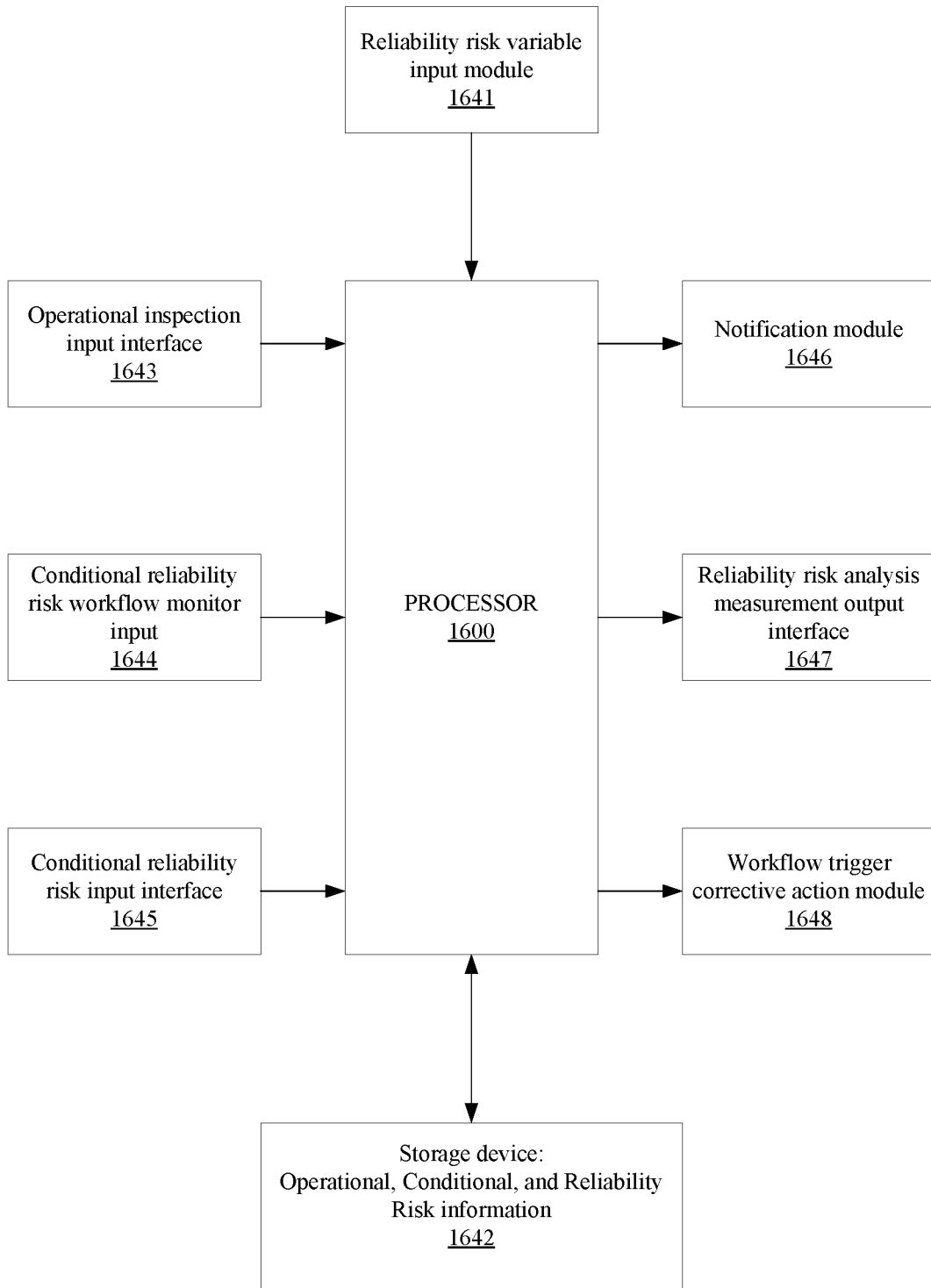
FIG. 16A is a block diagram illustrating determining a reliability risk constraint related to assets in a Hierarchical Asset Control Application in accordance with various embodiments of the present disclosure.
Figure 16B:
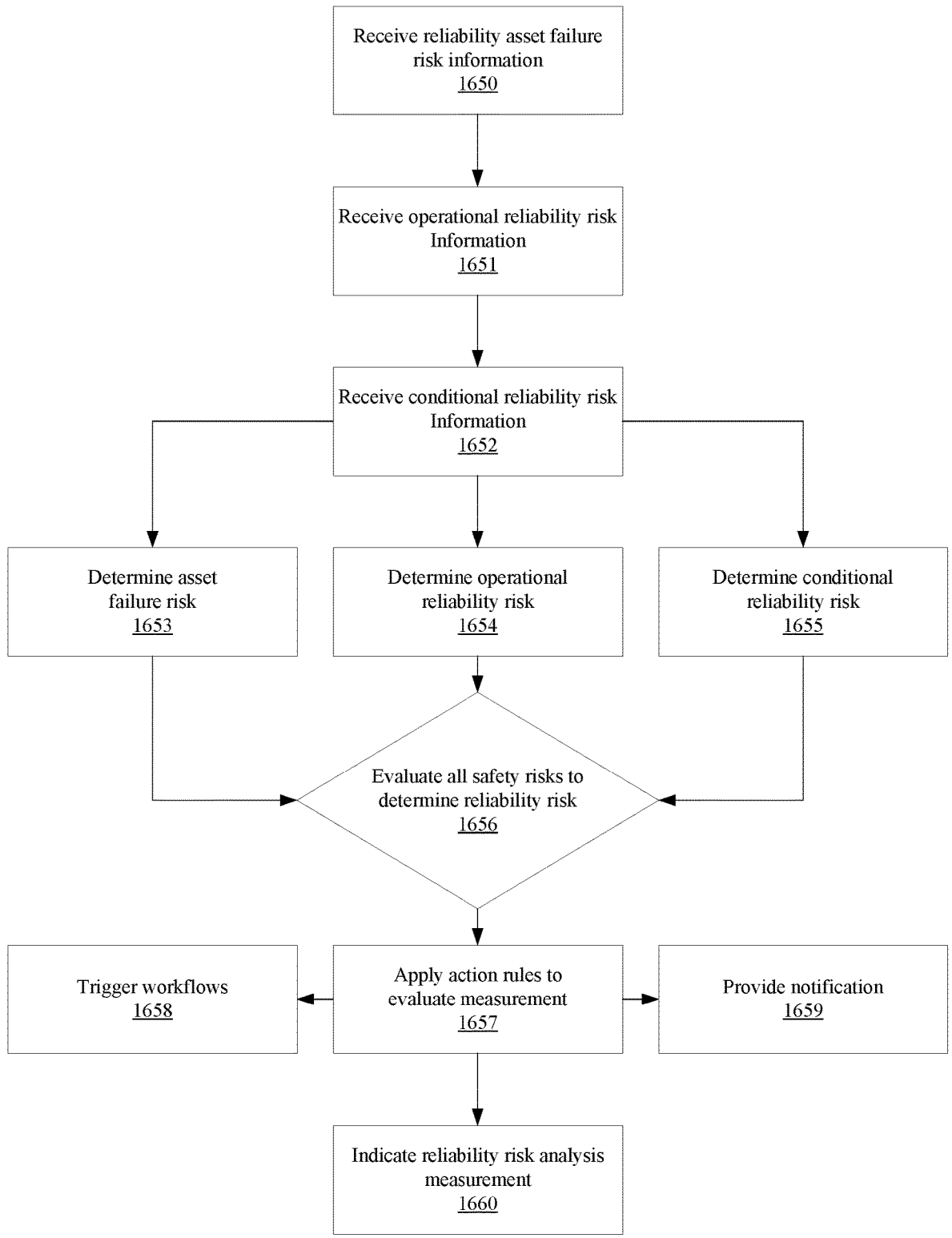
FIG. 16B is a logic flow diagram illustrating determining a reliability risk constraint related to assets in a Hierarchical Asset Control Application in accordance with various embodiments of the present disclosure.

FIG. 16A is a block diagram and FIG. 16B is a logic flow diagram illustrating determining a reliability risk constraint related to assets in a Hierarchical Asset Control Application in accordance with various embodiments of the present disclosure.

An overall RT reliability risk for a Hierarchical Asset Control Application may be defined by the maximum of a derived Reliability Risk, Operational Reliability Risk, and Conditional Reliability Risk. A maximum value of Reliability Safety Risk, Operational Safety Risk, and Conditional Safety Risk is selected as it provides a method to qualify the most significant risk of the three associated with the operational process at a given time.

There are two real-time measures that provide different aspects of the current reliability of the asset under consideration. First is the "Probability of Asset Failure" (pF), defined as the probability that the asset will fail over the time period t. The second is "Maintained State of the Asset" (MS), defined as the measure of the maximum asset performance in current state versus the ideal maximum performance. These two measures provide different, but related measures of the reliability of an asset and both can be controlled to improve the overall asset reliability. Each asset or asset set must be modelled based on its specific characteristics, yet there are common factors across assets and asset sets that serve as the basis for the Real-Time Reliability calculation as defined by the relationship:

MS=Current performance of the asset/Expected performance of the asset

The current performance of the asset can be measured as a function of the work output of the asset as compared to what would be expected if the asset were operating appropriately. The expected performance of the asset can be determined by analyzing the energy and/or material inputs to the asset and determining what the output of the asset should be if the asset was operating to design. For base equipment assets, such as pumps, motors, compressors and pipes, the expected performance of the asset should be determined by the equipment manufacturer through performance curves developed at the design or testing stages of the equipment development. These performance curves can be embedded in software models for the equipment and the models can be used to determine the actual expected performance of the asset during operation.

Since the performance of any asset may not be linear over its operating range, the Maintained State of the asset may be different at different points along its operating range. Additionally, the performance of the asset may vary according to the type of materials being processed through the asset, such as highly corrosive materials, or highly viscous materials, or the like. In these cases, there may be different performance curves associated with different material characteristics.

For more complex asset sets comprised of multiple base equipment assets, such as a process unit or a work cell, the maintained state may be able to be determined much in the same manner as for the base equipment assets. In this case it may be necessary to utilize the design models used at the design phase of the plant to determine the expected value of the performance of the asset set.

A reliability risk input module 1641 determines the Reliability Risk and is a value determined by the relationship:

Reliability Asset Failure=MAX($p_{ms}f(t)$, $p_{c1}f(t), \ldots, p_{cn}f(t)$)

Wherein: pmsf(t) is the probability of a failure due to the maintained state of the asset and pcif(t) is the probability of a failure due to the measured condition i. The measured conditions include variables such as temperature, operating time, number of starts, and/or others associated with an asset.

A probability of failure is determined by the relationship:

$pf(t)=1-e^{ut}$

Wherein u is the failure rate over time t.

For base equipment assets, the probability of failure based on each of the measured asset conditions, including the maintained state as a special condition, would be determined from the equipment manufactures specifications and testing information. Most equipment manufacturers determine such information during design and testing. Unfortunately, this information is not commonly used to determine the probability of failure in real time. This information can be loaded into the probability of asset failure analysis module in the form of models. These equipment models will be analyzed and compared with the current operating conditions to determine the probability of failure resulting from each condition. The overall probability of failure for the asset will be determined as the maximum of the condition-based failure probabilities.

In some equipment there may be additional probability of failures based on the process being performed in the equipment that may not be able to be determined by individual condition-based probability of failure, rather may need to be determined by analyzing combinations of conditions. In these instances, the equipment manufacturer may have combinational models that might be used to determine the probability of failure from multivariable equipment process conditions. Alternatively, combinational process failures may be able to be predicted by analyzing past incidents that have occurred within this or similar operating assets to identify lead indicators of past failures then utilizing those lead indications to determine if current operational conditions in the asset signal the immanent probability of a failure.

For higher level assets (unit, work cell, area, plant, enterprise) a very similar probability of failure analysis can be developed by analyzing the maintained probabilities of failure of each of the equipment asset (or next lower level assets) that are part of the higher-level asset and determining the probability of failure of the higher-level asset to be the maximum of the probabilities of failure of the next lower level assets.

There may be process conditional probabilities of failures in higher level assets much in the same manner as there are in equipment assets. These may be determined in a very similar manner to the probability of process-based failures for base equipment assets. Data from process historians should help to identify the probabilities of process-based failures through utilization of the leading indicators of past failures of the same type.

Since direct real-time measurements of reliability of the type described herein have not traditionally been made for industrial assets, there is no history of measurement response and interactions for any specific industrial assets at this point in time. It is fully expected that with time and history the more specific equation will be developed for individual assets and asset classes that will be able to be generically applied. Wherein:

An operational inspection risk input module 1643 determines the Operational Reliability Risk and is a value determined by characteristics such as the thoroughness and timeliness of reliability inspections. These inspections may be defined by the industrial application operator, as defined by local standards, or equivalent regulatory agency, such as OSHA. A reliability team on site or other responsible party makes the determination as to the Operational Reliability Risk.

A conditional reliability risk input module 1645 determines the Conditional Reliability Risk and is a value determined by the recognition of lead indicators of potential reliability incidences as determined from analysis of past reliability incidences. If the lead indicators of a potential reliability incident are recognized, the conditional reliability risk value is set according to the expected time and severity of the occurrence of the incident based on past experience. A maintenance team on site or other responsible party makes the determination as to the Conditional Reliability Risk.

To evaluate the overall reliability risk, the process will receive reliability risk information 1650, operational reliability risk information 1651, and conditional reliability risk information 1652. This information may be input from a user to the system, or from the system itself in real time, from a storage device to the system 1642, or from a repository outside of the system such as the cloud.

With these inputs and that of the conditional reliability risk workflow monitor 1644, the system will determine the Reliability Risk (i.e. asset failure risk) 1653, Operational Reliability Risk 1654, and Conditional Reliability Risk 1655 as defined above. An overall RT Reliability Risk for a Hierarchical Asset Control Application is evaluated 1656 by the maximum of a derived Reliability Risk, Operational Reliability Risk, and Conditional Reliability Risk.

As a result of the evaluation of the overall RT reliability Risk 1656 will analyze the output of the overall reliability risk 1647 and apply any action rules to be evaluated 1657 based on the overall RT environmental risk. A notification module 1646 will provide notification 1659 to a user of the system or the system itself and a workflow trigger and corrective action module 1648 will trigger workflows 1658 proscribed for the system to maintain or remediate conditions observed and determined. A resulting overall RT Reliability Risk analysis measurement will be provided 1660 to the application or users.

It should be appreciated, there are multiple ways to impact the reliability of industrial assets in real time. For example, a first way can be to change the operating levels of the assets (e.g., slow down a compressor) in order to reduce operational degradation over time. A second way can be to perform specific maintenance actions that will improve the maintained state and reduce the probability of failure (real-time reliability). Controlling real-time reliability may not be as straight forward as controlling real-time profitability because both operational efficiency and operational profitability are directly impacted by real-time reliability and the maintained state of the asset. Therefore, controlling real-time reliability can involve a business decision for the operations. For example, the best action for the business of the operation may be to slow down production by some percentage in order to reduce the probability of a failure during a production run, even though the instantaneous real-time profitability may decrease momentarily to assure a complete run.

In some embodiments, the real-time reliability control function 1310 depicted in FIG. 13 considers both the real-time reliability measure and the maintained state measure for each asset. Both can be used in combination to drive the best reliability results. In some embodiments, the real-time reliability control function 1310 can be implemented by the RT reliability controller 355 depicted in FIG. 3B.

From a manual control perspective, the way in which real-time reliability control is accomplished is that the operator responsible for setting the set points of the controllers of the operation views the real-time reliability and maintained state measures for the assets of that operation and either modifies the set points associated with the operational control of the asset within the allowable values for each, or requests a maintenance action, or both. If the operator determines that either the maintained state or real-time reliability is declining beyond what may be expected and desired, he or she can evaluate the criticality of the production to production schedule and from that take an action. One action may be to slow down the process to decrease the level of degradation. Another action may be to schedule maintenance action.

In some embodiments, an automatic real-time reliability controller can be utilized for real-time reliability control. The controller can automate the operator approach via expert systems technologies although this may be more complex than that of the automatic real-time profitability controller because the appropriate action is often tied to a business profitability control decision. Over time and experience with manual reliability control the appropriate set point and maintenance actions can be determined for the asset and can be implemented in an expert system that automatically emulates the operator actions in a similar manner to real-time profitability control. But optimizing the performance of the operation may require the implementation of an even higher level expert's system (either automatic or manual) that accepts real-time reliability inputs from the real-time reliability controller and executes a rules set to determine what the best action should be for the business based on current production, production schedules, maintained state degradation curves and probability of failures. This is represented by the business profitability control function in the diagram depicted in FIG. 13. This high-level expert in the business profitability control function can determine that the most profitable action for example: continue with the current production to finish the current run then perform maintenance; slow down production to reduce the real-time reliability decline in order to be able to finish the current run then perform maintenance; and shut down to perform maintenance then continue production. It should be appreciated this disclosure contemplates other methods.

Since the performance of any asset may not be linear over its operating range, the Maintained State of the asset may be different at different points along its operating range. As such, alternatively, the ratio of Maximum Current Performance to Maximum Ideal Performance can be used to ascertain the maintained state of the asset.

In some embodiments, at least some of the calculations relating to measurement of the reliability of an asset can be based on the IEC 61508 standard for functional safety of electrical/electronic/programmable electronic safety-related systems, the entirety of which is incorporated herein by reference.

V. Real Time Asset Security Risk Constraint Determination

Figure 17A:
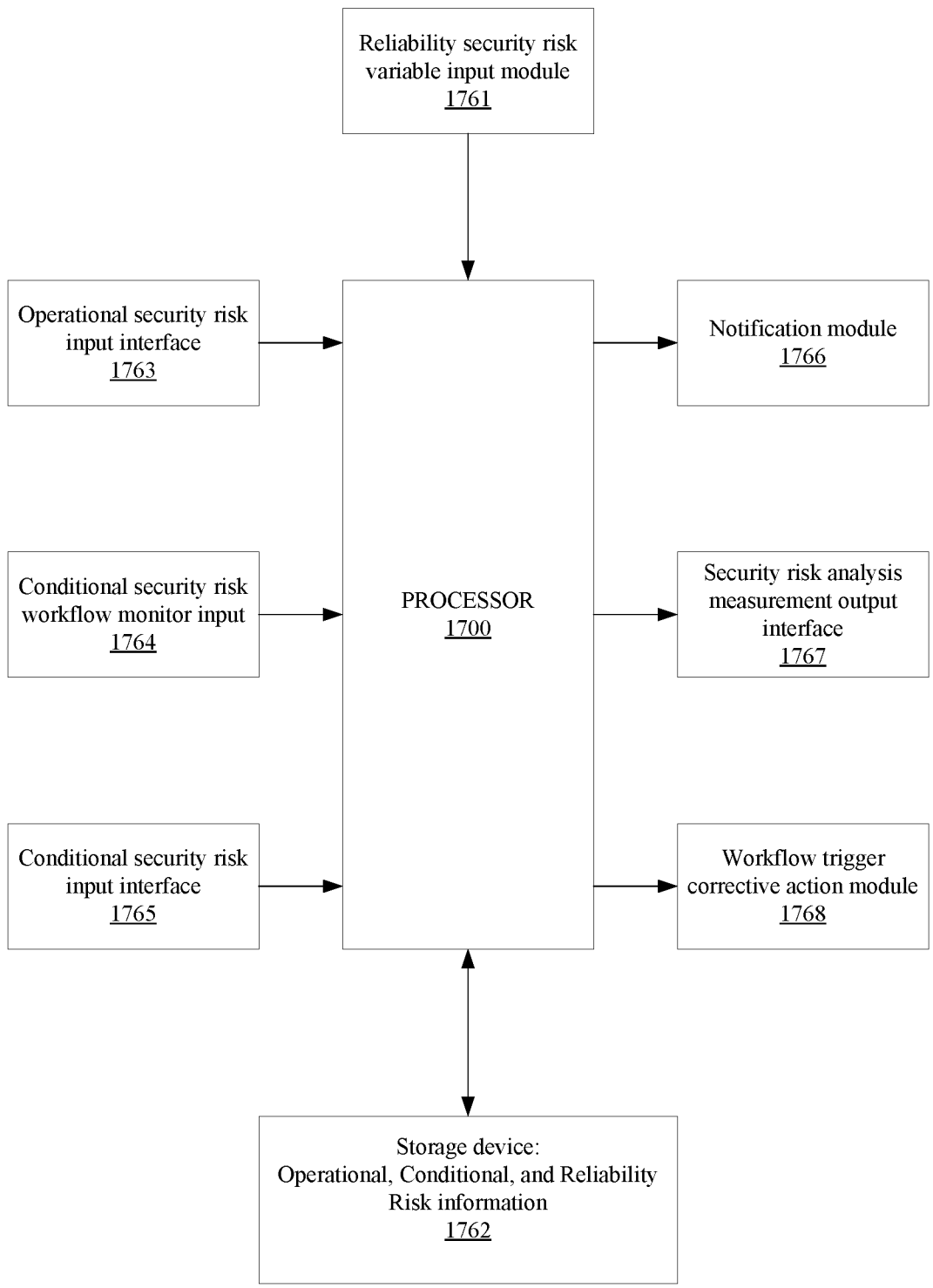
FIG. 17A is a block diagram illustrating determining a security risk constraint related to assets in a Hierarchical Asset Control Application in accordance with various embodiments of the present disclosure.
Figure 17B:
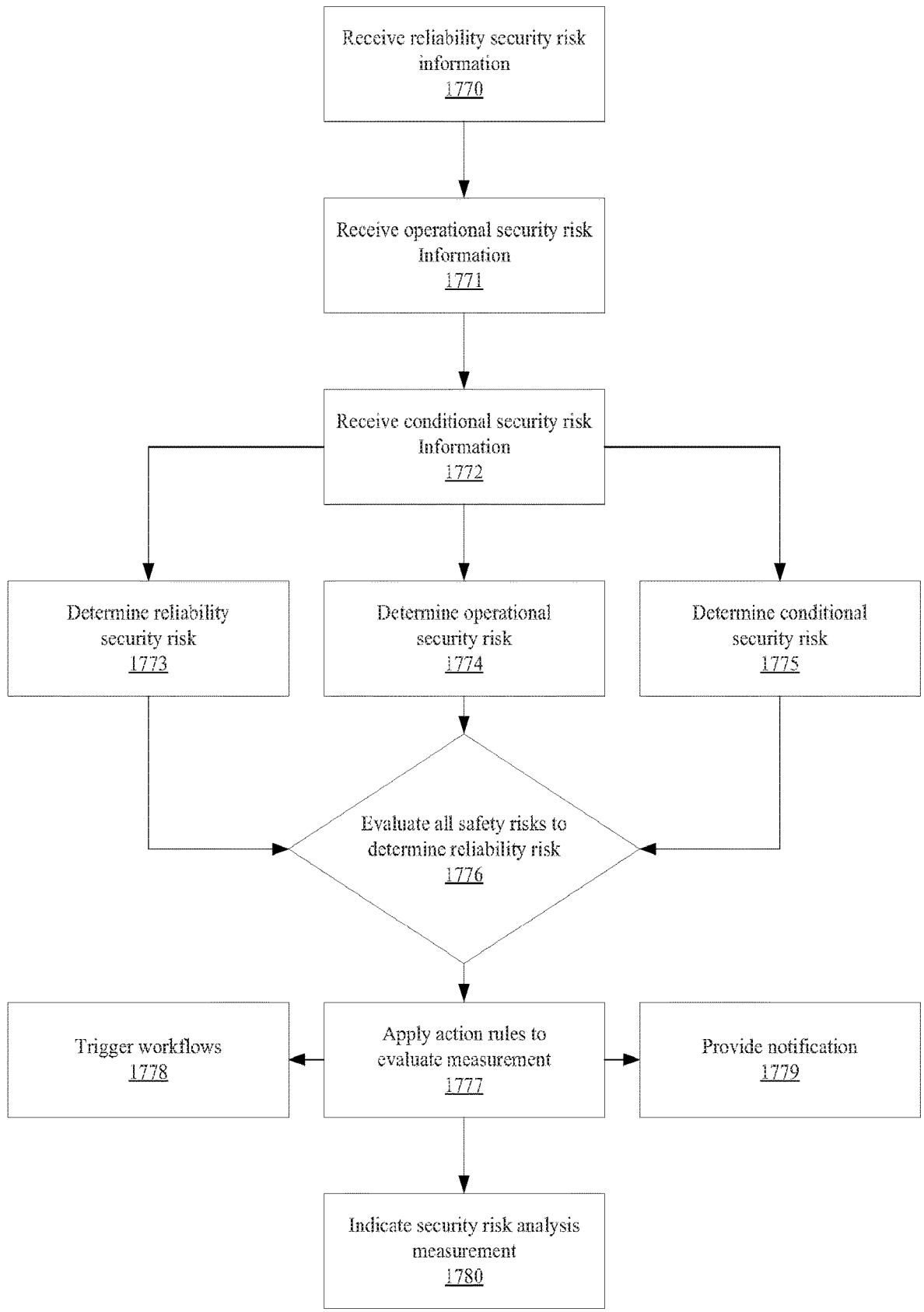
FIG. 17B is a logic flow diagram illustrating determining a security risk constraint related to assets in a Hierarchical Asset Control Application in accordance with various embodiments of the present disclosure.

FIG. 17A is a block diagram and FIG. 17B is a logic flow diagram illustrating determining a security risk constraint related to assets in a Hierarchical Asset Control Application in accordance with various embodiments of the present disclosure.

The real-time security risk control function 630 depicted in FIG. 6A controls cyber-security risks. Real-time security risk is a measure of the probability that a cyber-security incident is imminent in the control environment associated with the control of an asset or asset set. In some embodiments, the real-time security risk control function can include determining when the probability of a cyber-security event occurring is high or severe and taking one or more actions (e.g., bringing the impacted asset or asset set offline, notifying a personnel). The real-time security risk control function can be implemented by the RT security risk controller 675 depicted in FIG. 6B in some embodiments.

A security risk input module 1761 determines the Security Risk and is a value determined by the relationship:

$$\text{RT Cyber-Security Risk} = f(\text{number of unexpected/unidentified cyber-inputs})\Delta t$$

Since the expected number of unexpected/unidentified cyber-inputs is 0, the p(cyber-security incident) can be set high (>50%) on the occurrence of any unexpected/unidentified incidents and severe (>90%) on multiple unexpected/unidentified cyber-inputs over a given time period. The tuning parameter can be the time period.

In some embodiments, the security risk may be determined using an internal Intrusion Detection System (IDS), external information from sources such as the Department of Homeland Security, private security companies, or a combination thereof. An internal IDS may provide metrics about frequency of external attack attempts and any penetration inside a protection layer. External data may provide information about attacks occurring elsewhere that raise a threat level.

Some non-limiting examples of control actions that can be taken dynamically in response to an increased threat are: change the authentication from a password to a combination of password and biometric sign-in parameters; reduce, replace, and/or remove the authorizations of individuals or roles; disable and/or enable encryption for data in motion and/or data at rest; change the key length for encryption; increase and/or decrease the frequency of certificate changes on the system; change the network access permissions and/or open and/or close communication ports; disconnect part of the plant from the internet or from other plant areas; and other measures to improve the robustness of the security layers.

Since there is little or no industrial experience utilizing real-time metrics of the type prescribed herein, the measures can become more standard across assets and asset classes with time and experience using these measures.

It should be noted that controlling these measures, similar to process control for operational efficiency improvements, may involve the actual direct control of specific measures that contribute to the high level metrics. For example, applying process control for operational efficiency improvement typically involves direct control of physical measures like flow, level, temperature and pressure as compared to direct control of any operational efficiency measure. In the case of real-time reliability control, for instance, the actual control may be on the speed of the asset under consideration (pump, compressor for example) which will have a direct impact on the real-time reliability of the asset.

An operational inspection risk input module 1763 determines the Operational Security Risk and is a value determined by characteristics such as the thoroughness and timeliness of security inspections. These inspections may be defined by the industrial application operator, as defined by local standards, or equivalent regulatory agency, such as OSHA. A security team on site or other responsible party makes the determination as to the Operational Security Risk.

A conditional security risk input module 1765 determines the Conditional Security Risk and is a value determined by the recognition of lead indicators of potential security incidences as determined from analysis of past security incidences. If the lead indicators of a potential security incident are recognized, the conditional security risk value is set according to the expected time and severity of the occurrence of the incident based on past experience. A maintenance team on site or other responsible party makes the determination as to the Conditional Security Risk.

To evaluate the overall security risk, the process will receive security risk information 1770, operational security risk information 1771, and conditional security risk information 1772. This information may be input from a user to the system, or from the system itself in real time, from a storage device to the system 1762, or from a repository outside of the system such as the cloud.

With these inputs and that of the conditional security risk workflow monitor 1764, the system will determine the Security Risk (i.e. asset failure risk) 1773, Operational Security Risk 1774, and Conditional Security Risk 1775 as defined above. An overall RT Security Risk for a Hierarchical Asset Control Application is evaluated 1776 by the maximum of a derived Security Risk, Operational Security Risk, and Conditional Security Risk.

As a result of the evaluation of the overall RT security Risk 1776 will analyze the output of the overall security risk 1767 and apply any action rules to be evaluated 1777 based on the overall RT environmental risk. A notification module 1766 will provide notification 1779 to a user of the system or the system itself and a workflow trigger and corrective action module 1768 will trigger workflows 1778 proscribed for the system to maintain or remediate conditions observed and determined. A resulting overall RT Security Risk analysis measurement will be provided 1780 to the application or users.

It should be appreciated, there are multiple ways to impact the security of industrial assets in real time. For example, a first way can be to change the operating levels of the assets (e.g., slow down a compressor) in order to reduce operational degradation over time. A second way can be to perform specific maintenance actions that will improve the maintained state and reduce the probability of failure (real-time security). Controlling real-time security may not be as straight forward as controlling real-time profitability because both operational efficiency and operational profitability are directly impacted by real-time security and the maintained state of the asset. Therefore, controlling real-time security can involve a business decision for the operations. For example, the best action for the business of the operation may be to slow down production by some percentage in order to reduce the probability of a failure during a production run, even though the instantaneous real-time profitability may decrease momentarily to assure a complete run.

In some embodiments, the real-time security control function 1330 depicted in FIG. 13 considers both the real-time security measure and the maintained state measure for each asset. Both can be used in combination to drive the best security results. In some embodiments, the real-time security control function 1310 can be implemented by the RT security controller 360 depicted in FIG. 3B.

Normalizing Constraint Factors for Extended Control Variables

Figure 18A:
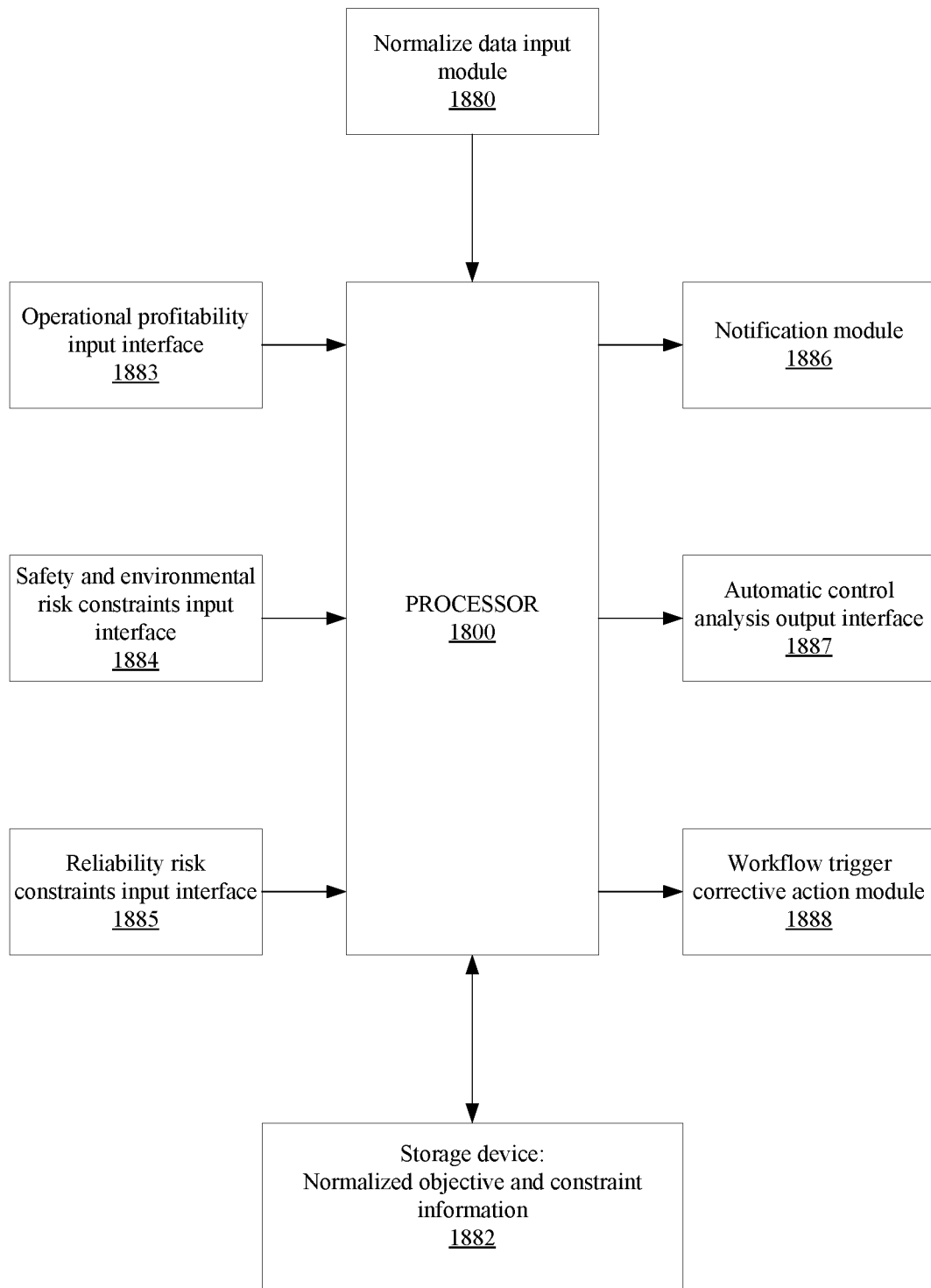
FIG. 18A is a block diagram illustrating normalizing constraints related to assets in a Hierarchical Asset Control Application in accordance with various embodiments of the present disclosure.
Figure 18B:
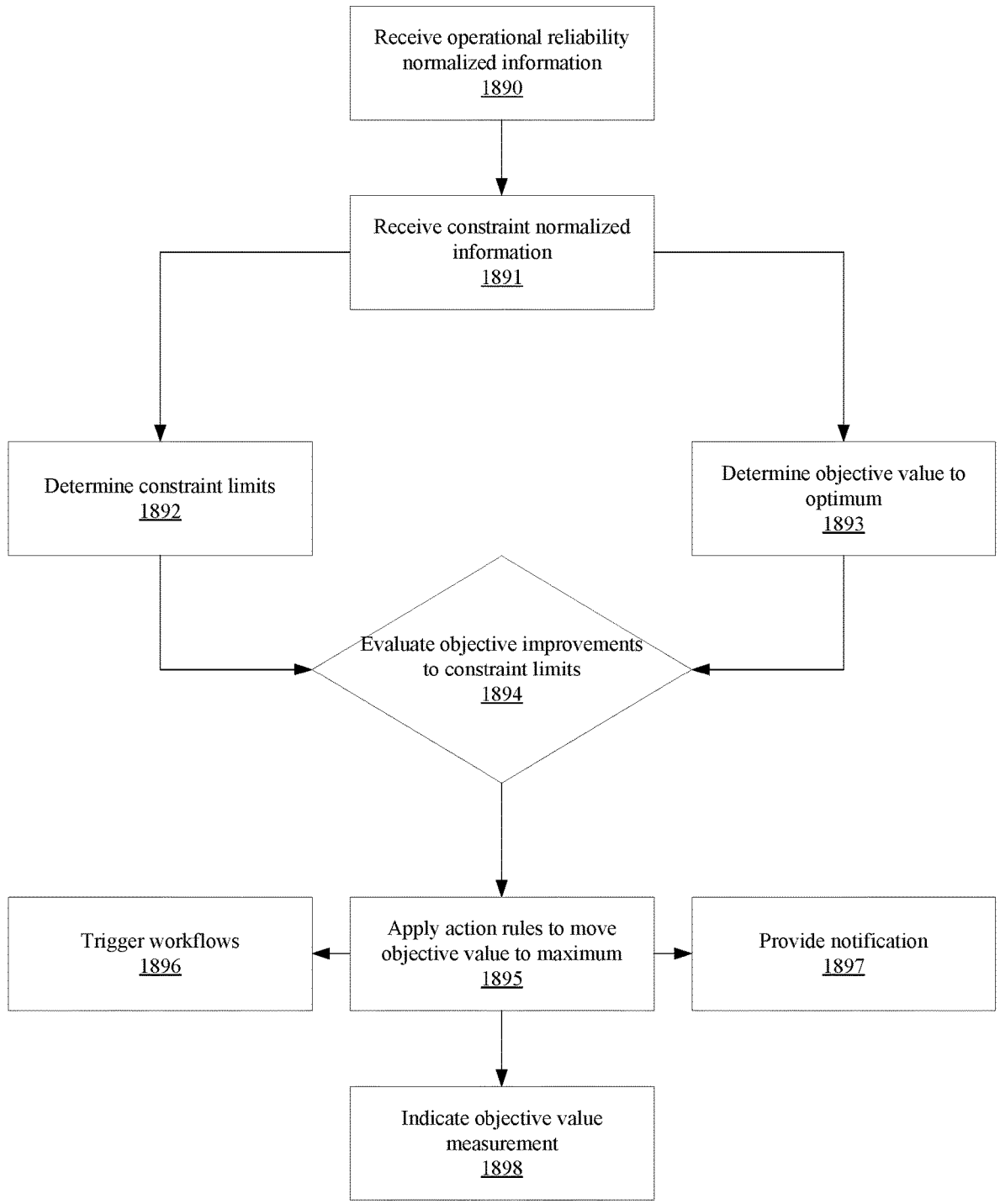
FIG. 18B is a logic flow diagram illustrating normalizing constraints related to assets in a Hierarchical Asset Control Application in accordance with various embodiments of the present disclosure.

FIG. 18A is a block diagram and FIG. 18B a logic flow diagram illustrating normalizing constraints and determining objectives related to assets in a Hierarchical Asset Control Application in accordance with various embodiments of the present disclosure.

Traditionally, optimization, whether linear or nonlinear, and whether static or dynamic, has been applied to industrial operations. These optimization approaches have typically been based on selecting a single objective function and converting all other objective functions to constraint functions to be added to the real constraints on the objective. The compute resources to execute these optimizers have been extremely significant, often limiting the execution of the optimizers to hours or even days. Although very good results can be achieved from the use of optimizers, as the speed of business has continued to increase the optimizers have become less effective. The reason for this is by the time the optimizer has executed and produced a result, the result no longer matches the business situation being optimized. Therefore, the optimizer does not optimize the objective. Secondly, as the complexity of industrial business has continually increased with multiple simultaneous objectives, the effectiveness of single-objective optimization has diminished.

As the speed and complexity of industrial business continues to increase in the future, the lack of effectiveness of traditional single-objective optimizers can be a problem for industry. In accordance with the present disclosure, a dynamic solution to this situation can include controlling the higher level variables in a balanced manner that will enable multiple objectives and constraints to be simultaneously controlled to continuously drive optimal results. The visualization of these objectives can be achieved via a radar visualization of the kinds depicted in FIG. 19A and FIG. 19B. The radar visualization enables each person in the operation to see the balance between the different dynamic objectives and constraints in order to drive each of the control strategy in a manner that will allow them to manually manage in a continually optimal manner.

Figure 19A:
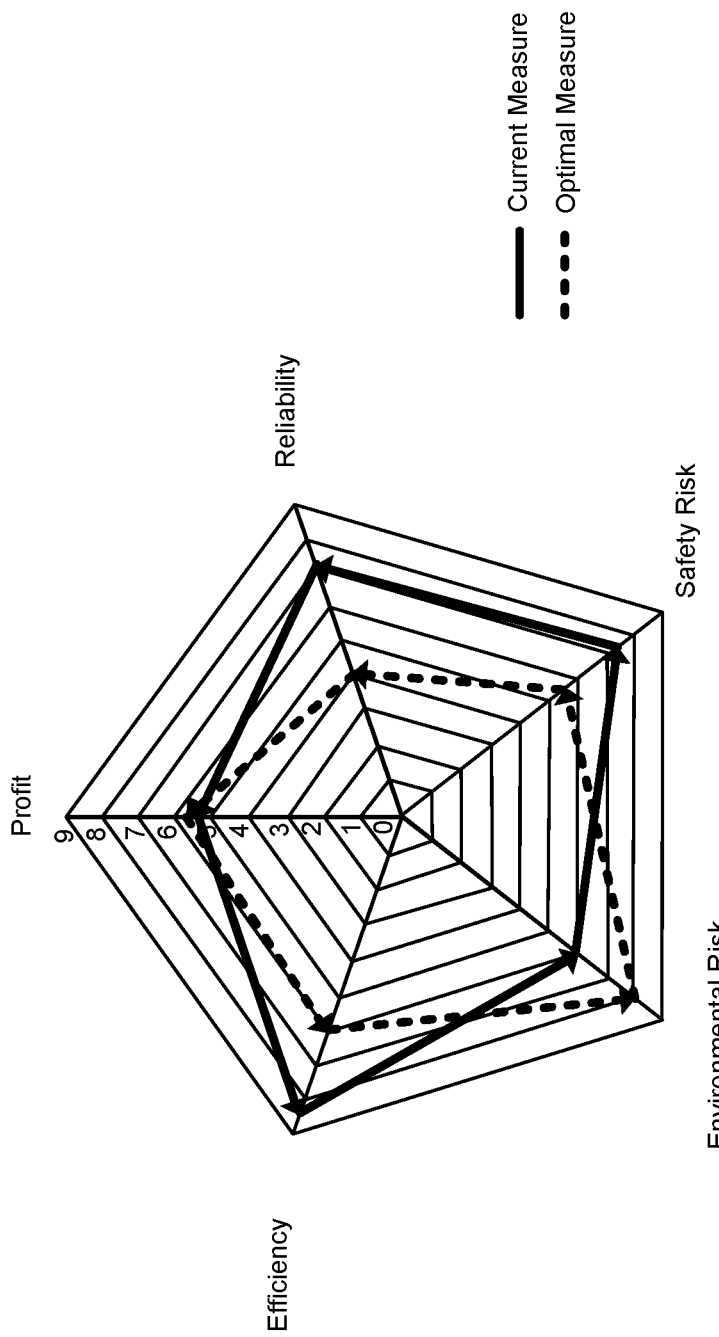
FIG. 19A is a diagram illustrating a radar visualization technique for simultaneously controlling multiple objectives and outcomes of a Hierarchical Asset Control Application in accordance with various embodiments of the present disclosure.

FIG. 19A illustrates a visualization of both a current and optimal measure for a Hierarchical Asset Control Application with multiple constraints and multiple objectives. In other embodiments this may be a visualization as part of a Human Machine Interface which may also facilitate validation, simulation, and/or other operator actions. In this example, while the profit objective is at or near optimal, efficiency objective, and reliability and safety constraints are sub-optimal. Further the environmental constraint is super-optimal and may demonstrate a loss of efficiency, or even possibly a breach of operational boundaries.

Figure 19B:
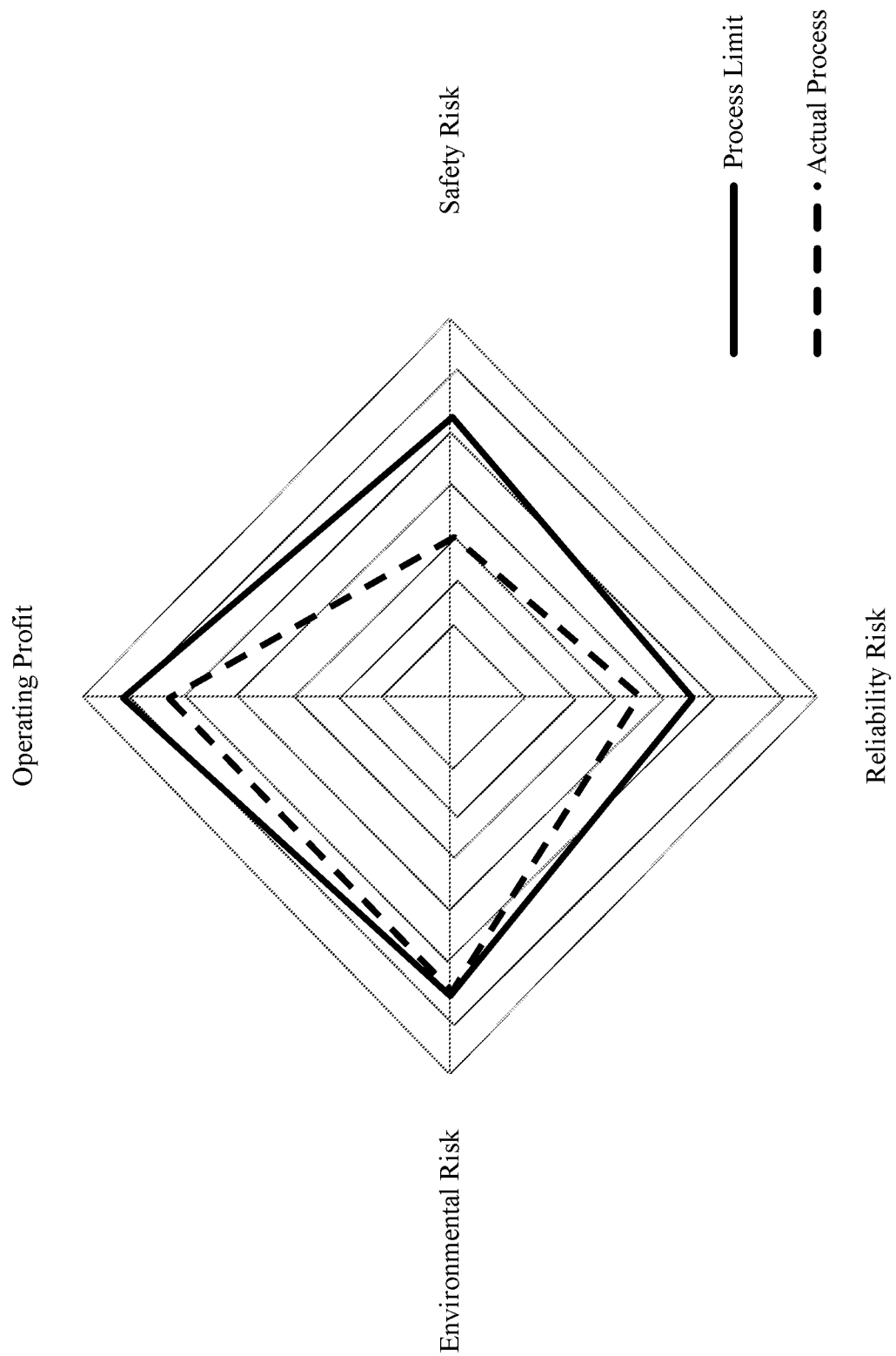
FIG. 19B is a diagram illustrating a radar visualization technique for simultaneously controlling multiple constrains and operating profit outcome of a Hierarchical Asset Control Application in accordance with various embodiments of the present disclosure.

FIG. 19B illustrates a visualization of both a current and optimal measure for a Hierarchical Asset Control Application with multiple constraints and multiple objectives. In other embodiments this may be a visualization as part of a Human Machine Interface which may also facilitate validation, simulation, and/or other operator actions. In this example, profit objective is nearing the process limit as is the environmental risk constraint, yet both safety and reliability risk constraints are within the process limit. Such visualizations may give an operator of a Hierarchical Asset Control Application instant feedback on how a total system is performing relative to stated objectives and constraints.

In some embodiments, automatic balanced control of the extended control variables can be implemented as experience with manual balanced control is attained over time. The automatic balanced control can be achieved via an expert system that emulates the actions of an expert operator in balancing the different control variables. Such an expert system can weigh each of the control variables appropriately based on the objectives of the operation and evaluate the error between the actual value and desired value for each of the control domains to determine the trade-off actions to be performed by the automatic balanced control system.

The real-time measures as defined previously can provide the data points for the current situation. The ideal situation can either be statically calculated for the asset and used as a target for the display or dynamically calculated in the higher level Business Profitability Control function 1300 described in reference to FIG. 13. In either case, the business of the operations can be in a level of real-time control leading to real-time optimized results.

Normalization of constraints such as safety, reliability, and environmental, may be expressed by the following relationship:

Normalized Constraints=1−[(Constraint Limit−Actual Value)/Constraint Limit]

Normalization of real time operational profit may be expressed by the following relationship:

Normalized Operational Profit=1−[(Optimal Operating Profit−Current Operating Profit)/Optimal Operating Profit]

It should be appreciated while the foregoing examples detail Real Time Operating Profit as the objective variable which is optimized, any other objective variable may be utilized for a real time operational optimization unit or parameter.

Figure 19C:
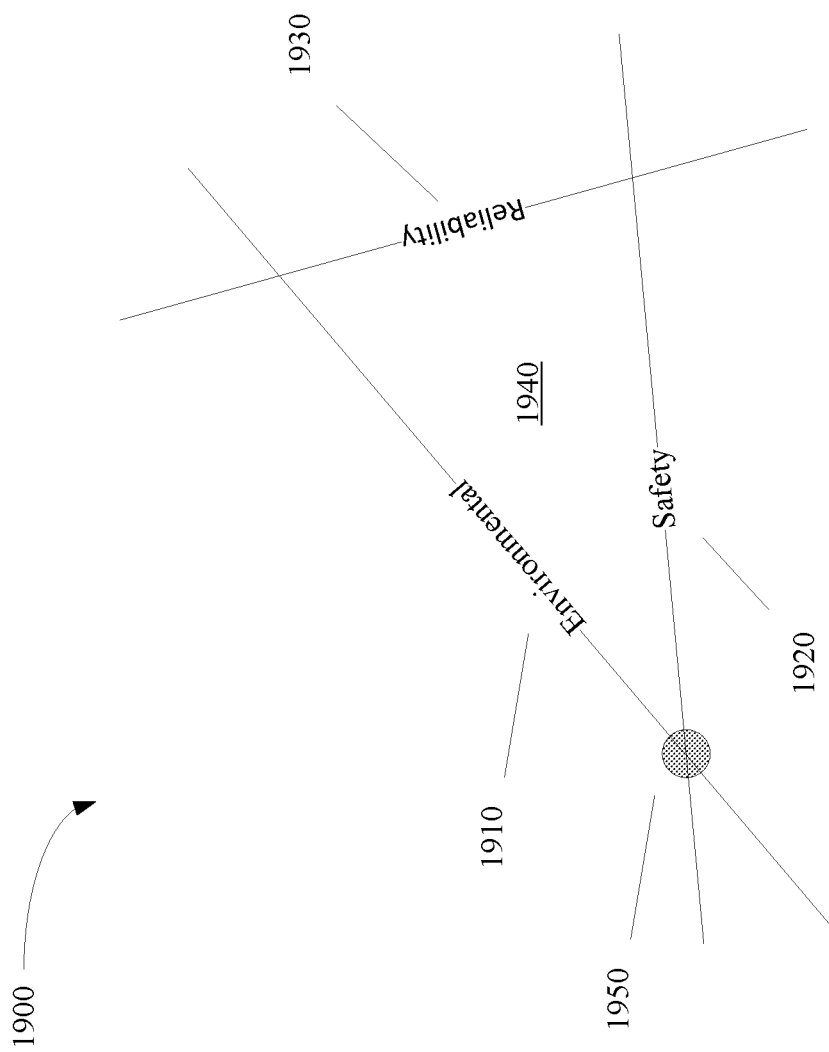
FIG. 19C is a diagram illustrating intersection of dynamic constraints to form an operational boundary and optimization point of a Hierarchical Asset Control Application in accordance with various embodiments of the present disclosure.

FIG. 19C is a diagram illustrating intersection of dynamic constraints to form an operational boundary and optimization point of a Hierarchical Asset Control Application in accordance with various embodiments of the present disclosure.

In order to determine the constrained process boundaries as illustrated in FIGS. 19A and 19B, Hierarchical Asset Control Application area 1940, and an optimization point for real time operating profit 1950, the normalized constraints such as environmental 1910, safety 1920, and reliability 1930 are utilized. It should be appreciated that these constraints are dynamic in nature, thereby causing both the Hierarchical Asset Control Application 1940 and optimization point for real time operating profit 1950, to be dynamic in nature.

FIG. 18A describes the various function block responsible for the normalization of the various constraints and objectives. Normalization of input data 1880, operational profitability input 1883, safety and environmental risk constraint data 1884, reliability risk constraint data 1885, are evaluated. Any objective and/or constraint data to be stored or retrieved 1882 may be accessed. A notification module 1886 will provide any notice to users or the system and control analysis 1887 and workflow triggers 1888 will be performed as part of the analysis.

A normalization process may begin with receiving operational reliability normalized information 1890 as well as normalized constraint information 1891. Constraint limits 1892 on the Hierarchical Asset Control Application will be determined as well as the difference from the current operational value to the optimum 1893. Both current and future state operational set points/thresholds and/or states are evaluated to determine the necessary improvements 1894.

Once determined, the action rules are applied to more from current state to optimal state 1895. Any necessary workflows are triggered 1896 and notification given 1897 to the respective users or systems. Finally, the new objective value measurement is given 1898.

From this normalization analysis of the constraints and objectives real time knowledge of the Hierarchical Asset Control Application will be known such as; the current operation of the application on (indicated by the dashed line on FIG. 19B); the process limits associated with the application (indicated by the solid line on FIG. 19B); the operational area application 1940 and the optimization point for real time operating profit 1950.

Given the desired real time nature of determining constraints and objectives as well as effecting changes to potentially large Hierarchical Asset Control Applications, a tiered approach is illustrated to allow robust monitoring and processing of assets deployed in the application to derive real time objectives and constraints. Further to effect control to migrate the application from the current state to the optimal state, control of the assets is also deployed in a tiered fashion.

Figure 20A:
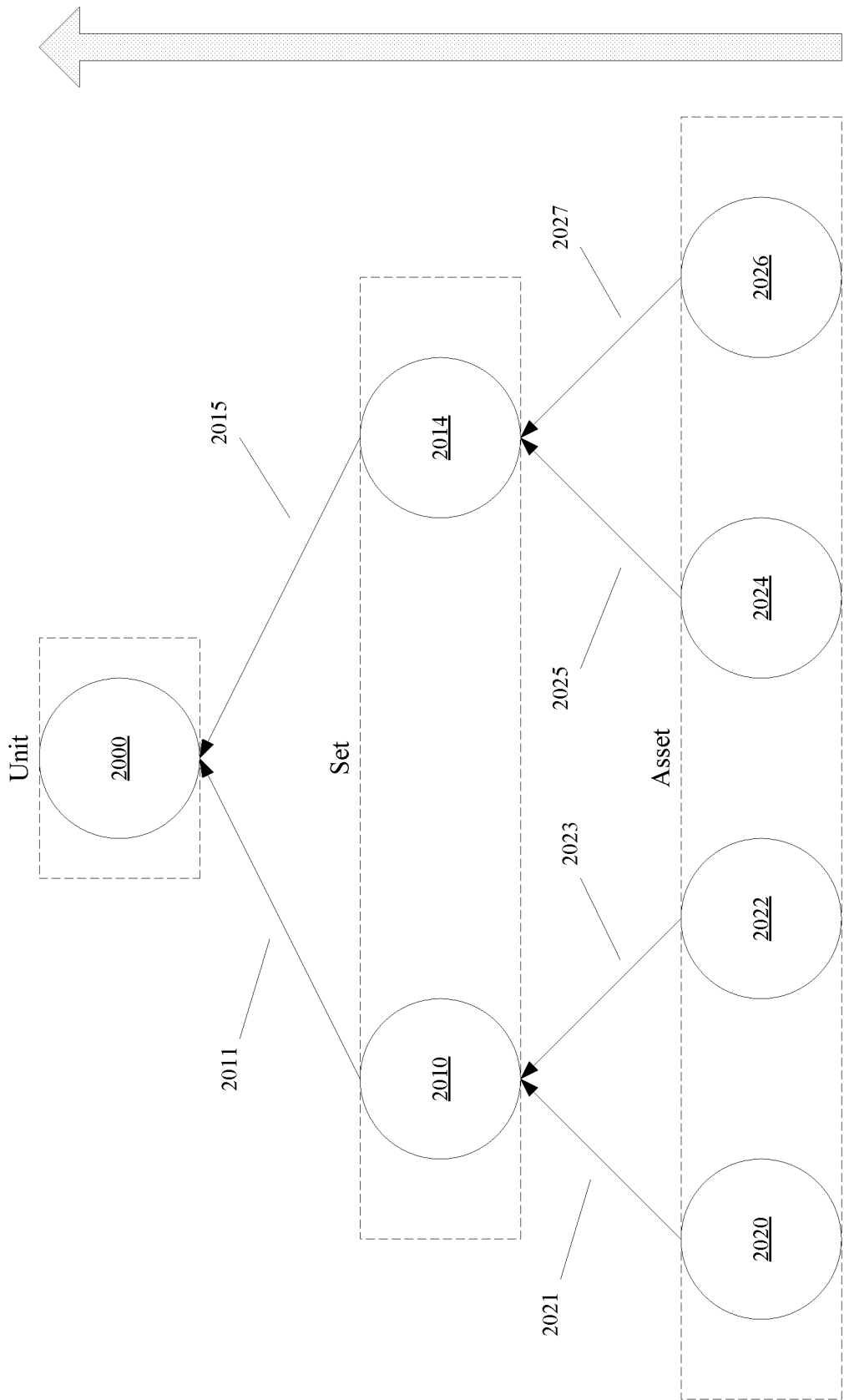
FIG. 20A is a block diagram illustrating risk constraint communication structure from asset to set, and set to unit, of a Hierarchical Asset Control Application in accordance with various embodiments of the present disclosure.
Figure 20B:
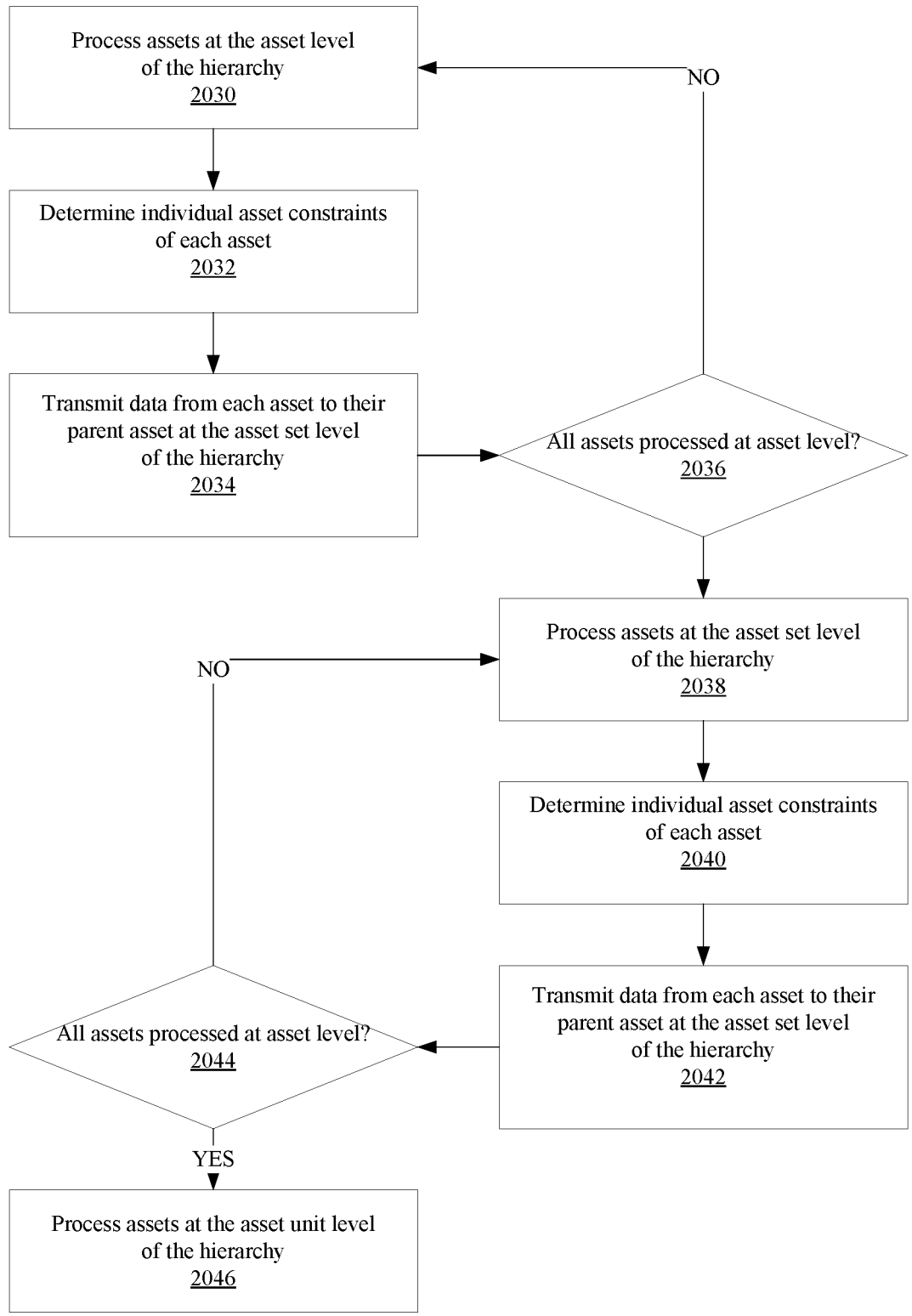
FIG. 20B is a logic flow diagram illustrating risk constraint communication structure from asset to set, and set to unit, of a Hierarchical Asset Control Application in accordance with various embodiments of the present disclosure.

FIG. 20A is a block diagram and FIG. 20B a logic flow illustrating risk constraint communication structure from asset to set, and set to unit, (or other cross smart asset grouping communication), for a Hierarchical Asset Control Application associated with an Integrated Smart Asset Control System in accordance with various embodiments of the present disclosure. Depending on the nature of the implementation smart assets may be grouped in control in any number of constructs based what is appropriate for a particular application. For example, assets groups may be formed across multiple levels of the smart asset hierarchy.

Risk constraints are determined (as discussed above in this application) at the smart asset level of the hierarchy. Smart assets include equipment, or groups of equipment which perform a function according to the Hierarchical Asset Control Application and control hardware that form an Integrate Smart Asset Control System. An example of which may be a reactor vessel and associated sensors, such as a temperature sensor. FIG. 20A illustrates a number of smart assets 2020, 2022, 2024, 2026. These smart assets will themselves, utilizing an intelligent agent determine any constraints relative to them. It should be appreciated that what constraint is relevant to what smart asset is based on the asset characteristics as well as the application, among other things. Each of these smart assets 2020, 2022, 2024, 2026 are processed at the asset level of the hierarchy 2030. It is determined at that time what constraints apply to each individual asset 2032.

Once constraints are determined, each asset transmits data to their parent asset at the set level of the hierarchy 2034. Communication paths at the asset level 2021, 2023, 2025, 2027 and parent/child relationships have been previously developed during the creation of an Integrate Smart Asset Control System. A validation is conducted to assure all smart assets have been processed at the asset level 2036.

Once complete, smart assets at the set level 2010, 2014 are processed 2038 to determine their individual constraints 2040. In turn these set smart assets transmit their data 2042 from each set asset 2010, 2014, via their respective communication paths 2011, 2015, to their respect parent asset at the unit level 2000. As with the asset level, a validation is conducted to assure all smart assets have been processed at the set level 2044 according to one implementation. It is to be understood that other implementation is possible and this type of functionally may be implement for a sub-set of Integrated Smart Asset Control Systems.

Finally, all smart assets at the unit level 2000 are processed 2046. In preparation to develop the control to articulate the application to the derived real time operational profit point.

Figure 21A:
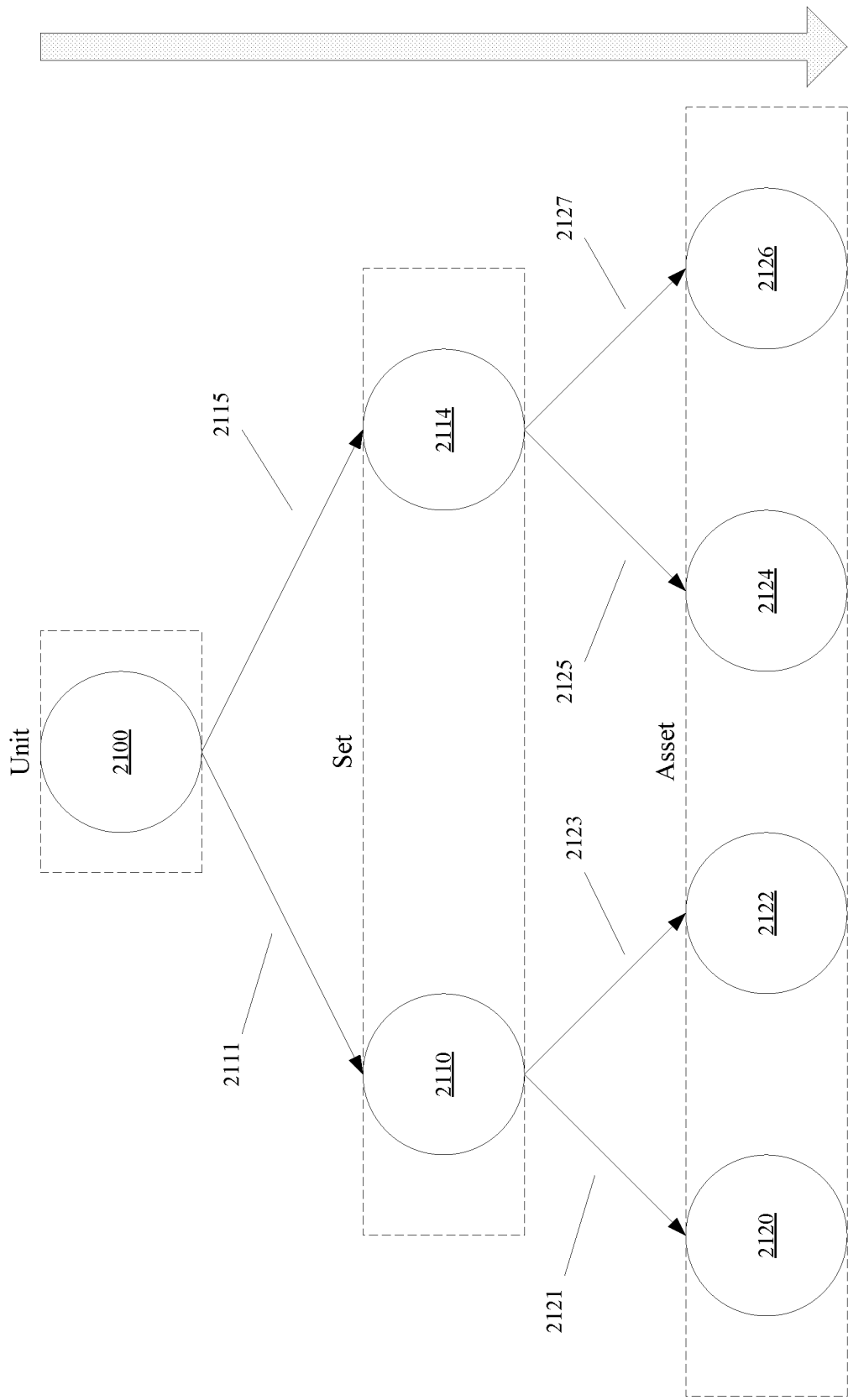
FIG. 21A is a block diagram illustrating asset control communication structure from unit to set, and set to asset, of a Hierarchical Asset Control Application in accordance with various embodiments of the present disclosure.
Figure 21B:
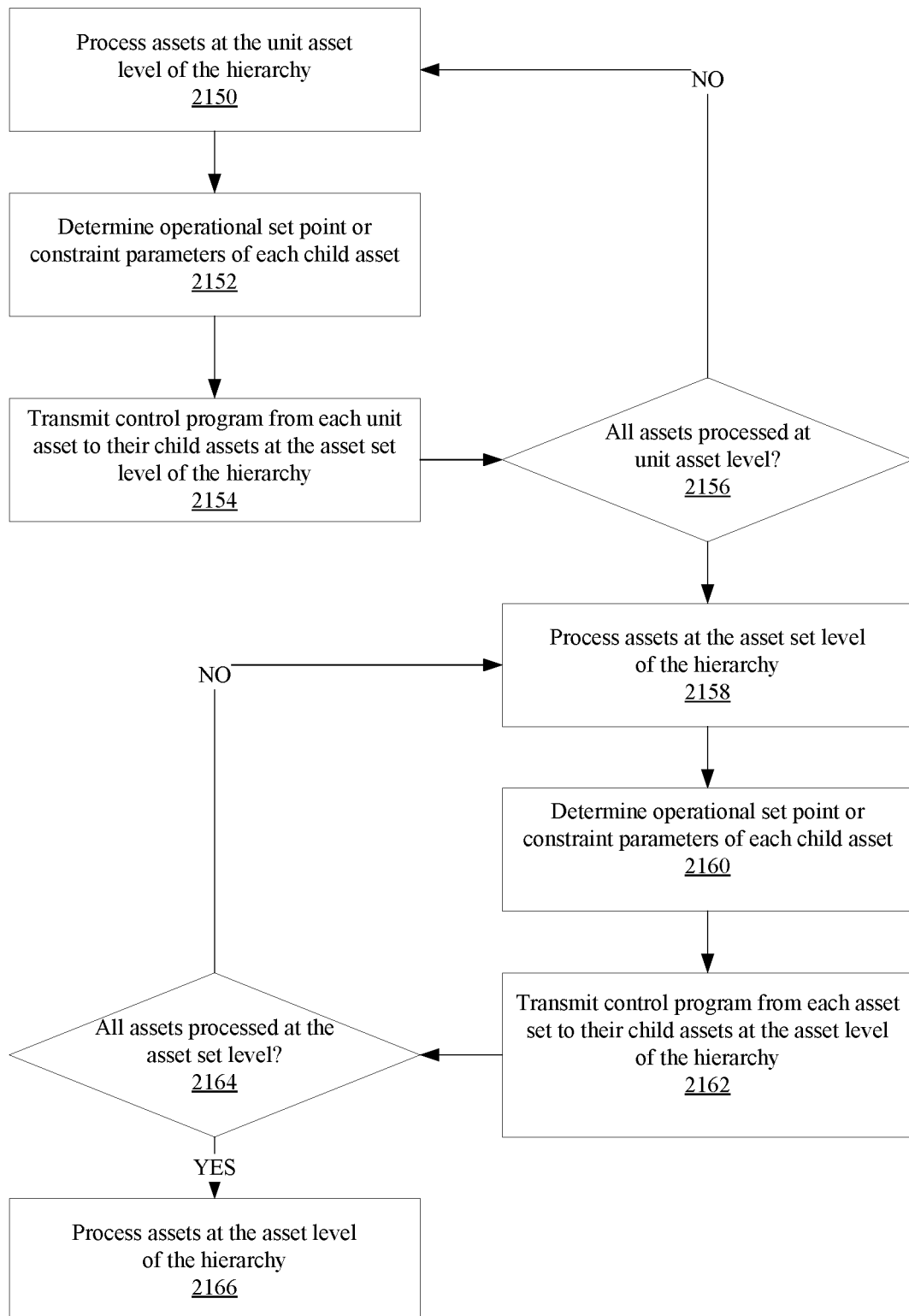
FIG. 21B is a logic flow diagram illustrating asset control communication structure from unit to set, and set to asset, of a Hierarchical Asset Control Application in accordance with various embodiments of the present disclosure.

FIG. 21A is a block diagram and FIG. 21B is a logic flow diagram illustrating asset control communication structure from unit to set, and set to asset, of a Hierarchical Asset Control Application in accordance with various embodiments of the present disclosure.

To determine operational or set point constraint parameters, all unit level smart assets 2100 are processed 2150 to determine operational set points or constraint parameters of each child asset at the set level of the hierarchy 2152. When complete, these unit smart assets 2100 transmit their data 2154 via their respective communication paths 2111, 2115, to their respective child asset at the set level 2110, 2114. A validation is conducted to assure all smart assets have been processed at the unit level 2156. It is to be understood that other implementation is possible and this type of functionally may be implement for a sub-set of Integrated Smart Asset Control Systems.

Once complete, smart assets at the set level 2110, 2114 are processed 2158 to determine their operational or set point constraint parameters for their respective children smart assets 2160. In turn these set smart assets transmit their data 2162 from each set asset 2110, 2114, via their respective communication paths 2121, 2113, 2125, 2127 to their respect parent asset at the asset level 2120, 2122, 2124, 2126. As with the set level, a validation is conducted to assure all smart assets have been processed at the set level 2164. Finally, when complete as all smart assets at the asset level 2120, 2122, 2124, 2126 are processed 2166 each level of the Hierarchical Asset Control Application will have operational or set point constraint parameters to operate at a real time operational profitability set point.

Small and Big Data Analytics

Figure 22:
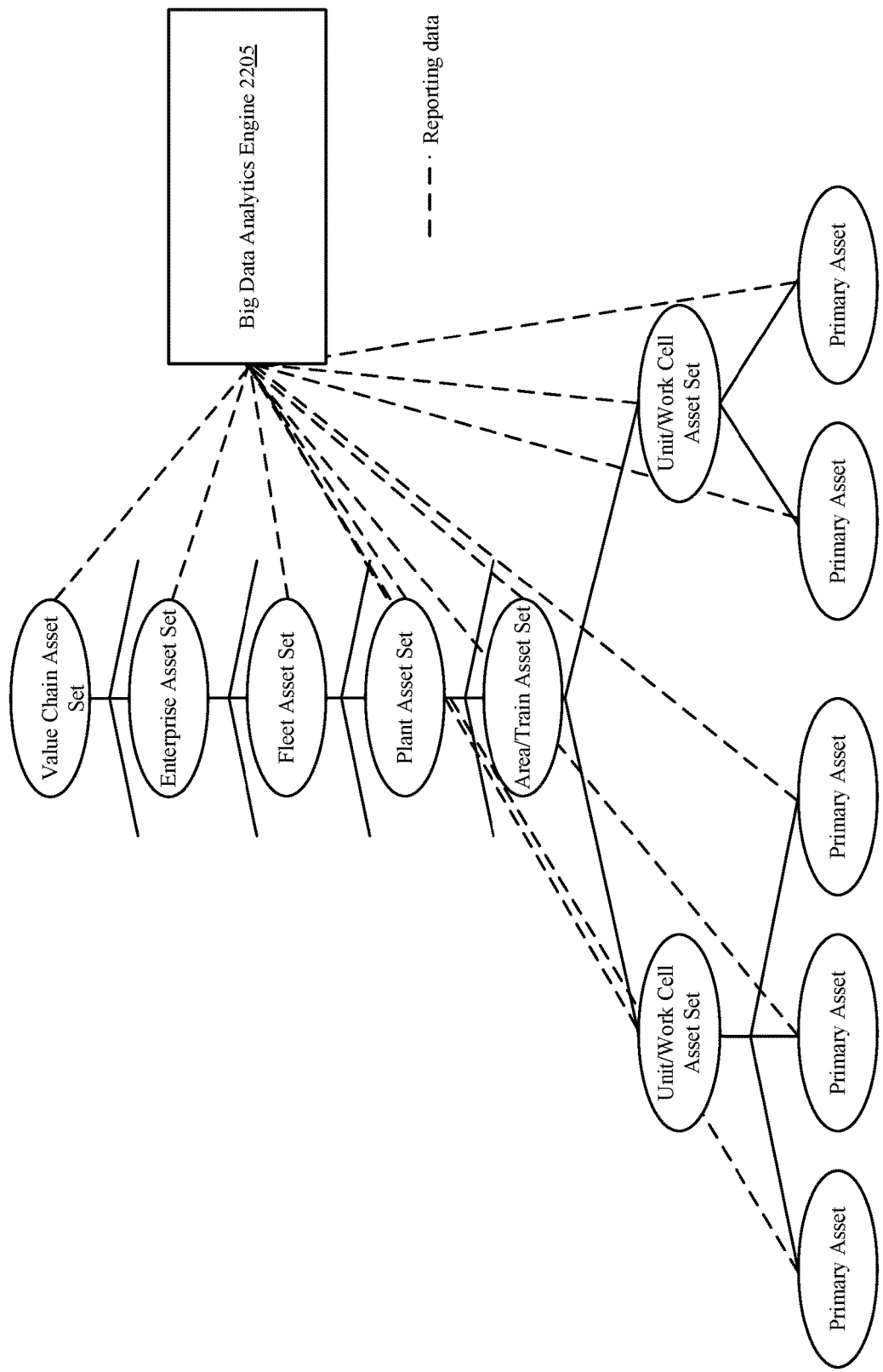
FIG. 22 is a diagram illustrating an analytics view of a system for Hierarchical Asset Control Application in accordance with some embodiments of the present disclosure.

In some embodiments, an asset control system can include an analytics component or engine for information management and analysis to continually optimize the performance of an industrial operation over time. The analytics engine can work in parallel with the real time control system but without the real-time constraints. FIG. 22 is a diagram depicting an analytics view of the asset control system in accordance with some embodiments of the present disclosure. As shown, each CPS associated with an asset can utilize network connectivity to directly or indirectly report data generated and/or received by the intelligent agent in the CPS (e.g., process histories, measured data, actions taken) to the big data analytics engine 2205. For example, in some instances the primary asset CPSs can report data directly to the big data analytics engine 2205. In other instances, a unit/work cell asset set intelligent agent can collect data from the primary smart assets it is responsible for and report the data to the higher level asset set or the big data analytics engine 2205. The big data analytics engine 2205 can collect and process the reported data to extract insights that can be used to optimize the operational efficiency and/or other control functions discussed above. In some embodiments, each intelligent agent associated with a smart asset or smart asset set or other smart asset groupings can include a small data analytics engine (e.g., small data analytics engine 370 of FIG. 3B) that can locally collect and analyze the data associated with the asset or asset set and report results to the big data analytics engine 2205 directly or through a higher level intelligent agent.

4. Example Processing

Figure 23:
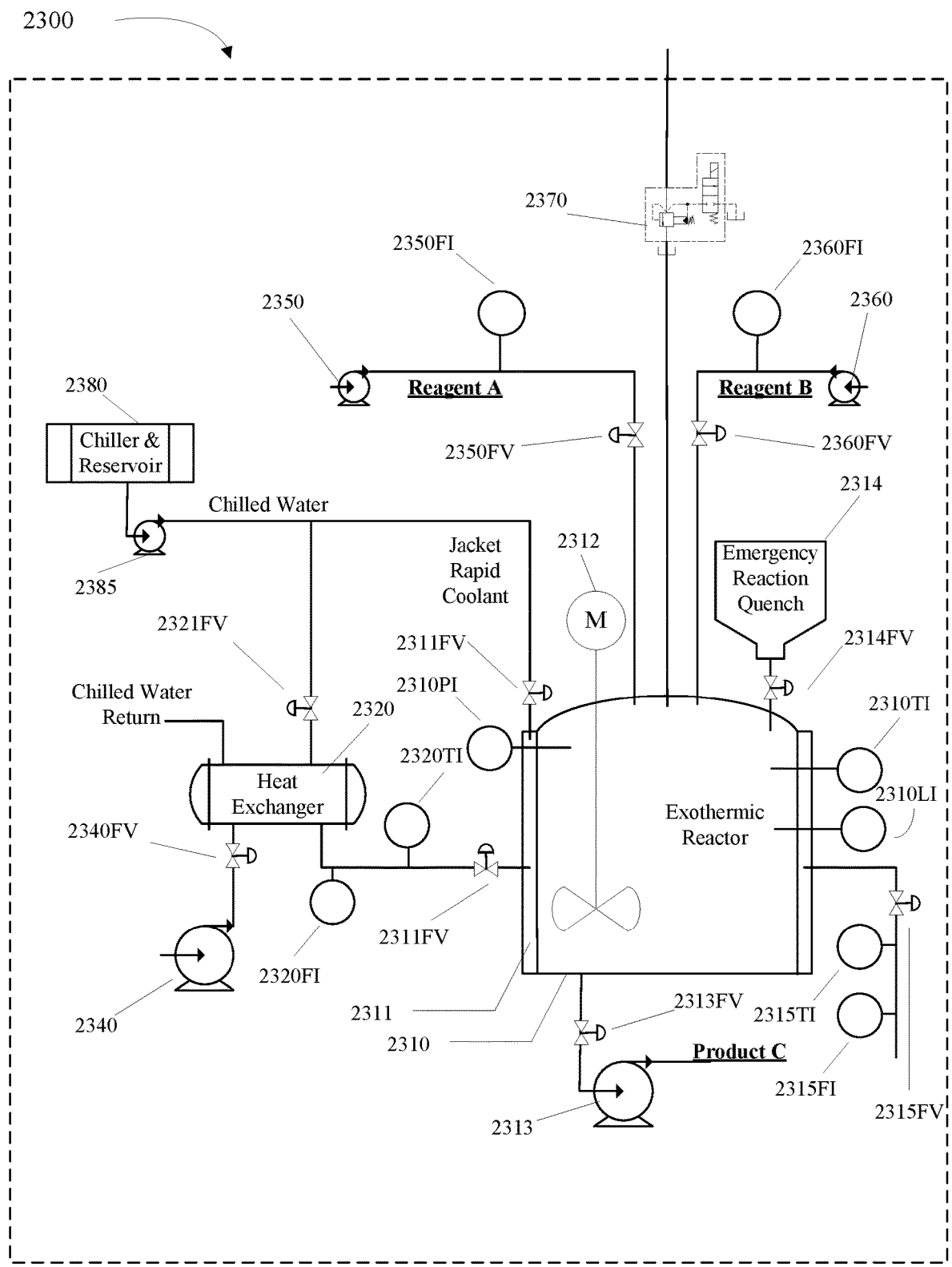
FIG. 23 is a diagram illustrating various aspects of an example of developing a hierarchy of intelligent agents for a Hierarchical Asset Control Application in accordance with various embodiments of the present disclosure.

FIG. 23 is a diagram illustrating an industrial process examples in accordance with various embodiments of the present disclosure. An example exothermic reactor unit that is used for patent applications and other design documents.

A complete reactor unit 2300 is illustrated which includes a reactor vessel 2310 and a number of sensors and valve positioners. Pressure indicator 2310PI, temperature indicator 2310TI, and level indicator 2310LI provide measurements inside the reactor vessel. A reactor cooling jacket 2311 with associated flow valve 2311FV controls the flow rate of cooling water into the reactor cooling jacket 2311. A valve positioner 2315FV controls the flow of warm water from the reactor cooling jacket 2311 to the effluent of the plant and is monitored by a flow indicator sensor 2315FI and temperature indicator 2315TI to provide measurement of the temperature and flow of the effluent leaving the reactor unit 2310.

The reactor agitator 2312 stirs the reagents to ensure complete reaction. "Product C" has an associated pump 2313 and flow valve 2313FV. An emergency reaction quench tank 2314 and associated flow valve 2314FV is available to stop the reaction and will solidify reactants and render the reactor vessel 2310 unusable.

A heat exchanger 2320 that controls the temperature of the cooling water pumped to the reactor jacket 2311 is associated with a series of sensors and valve positioners. Temperature indicator 2320TI, flow indicator 2320FI, and valve positioner 2320FV measure and maintain the chilled water to the heat exchanger 2320. The fresh water pump 2340 pumps fresh water into the heat exchanger. This fresh water is what is pumped into the reactor jacket 2311 to remove heat from the reactor vessel 2310. A valve positioner associated with this fresh water pump 2340 controls the flow rate of the cooling water entering the heat exchanger 2320.

"Reagent A" pump 2350 pumps the reagent material into the reactor vessel 2310. Related to the pump are a flow sensor 2350FI and a valve positioner 2350FV. A similar structure exists for "Reagent B" where a pump 2360 pumps the reagent into the reactor vessel 2310. Related to the pump are a flow sensor 2360FI and a valve positioner 2350FV.

A pressure relief valve 2370 vents open when the pressure inside the reactor vessel 2310 exceeds a limit. This vents to a smoke stack which is open to the outside environment.

In the present example a chiller and reservoir 2380 supply is used to cool the public water to a desired temperature and pump 2385 into the reactor cooling jacket 2311. Further, in abnormally high temperature conditions, it may be pumped directly into the reactor cooling jacket 2311 to quickly slow or stop a reaction while preserving the Reactor Vessel. This chill water may also be added directly to the effluent to reduce the BTUs being released to the environment.

Figure 24:
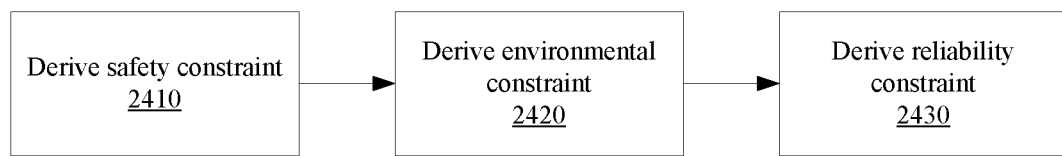
FIG. 24 is a diagram illustrating various aspects of an example of developing a hierarchy of intelligent agents for a Hierarchical Asset Control Application in accordance with various embodiments of the present disclosure.
Figure 24:
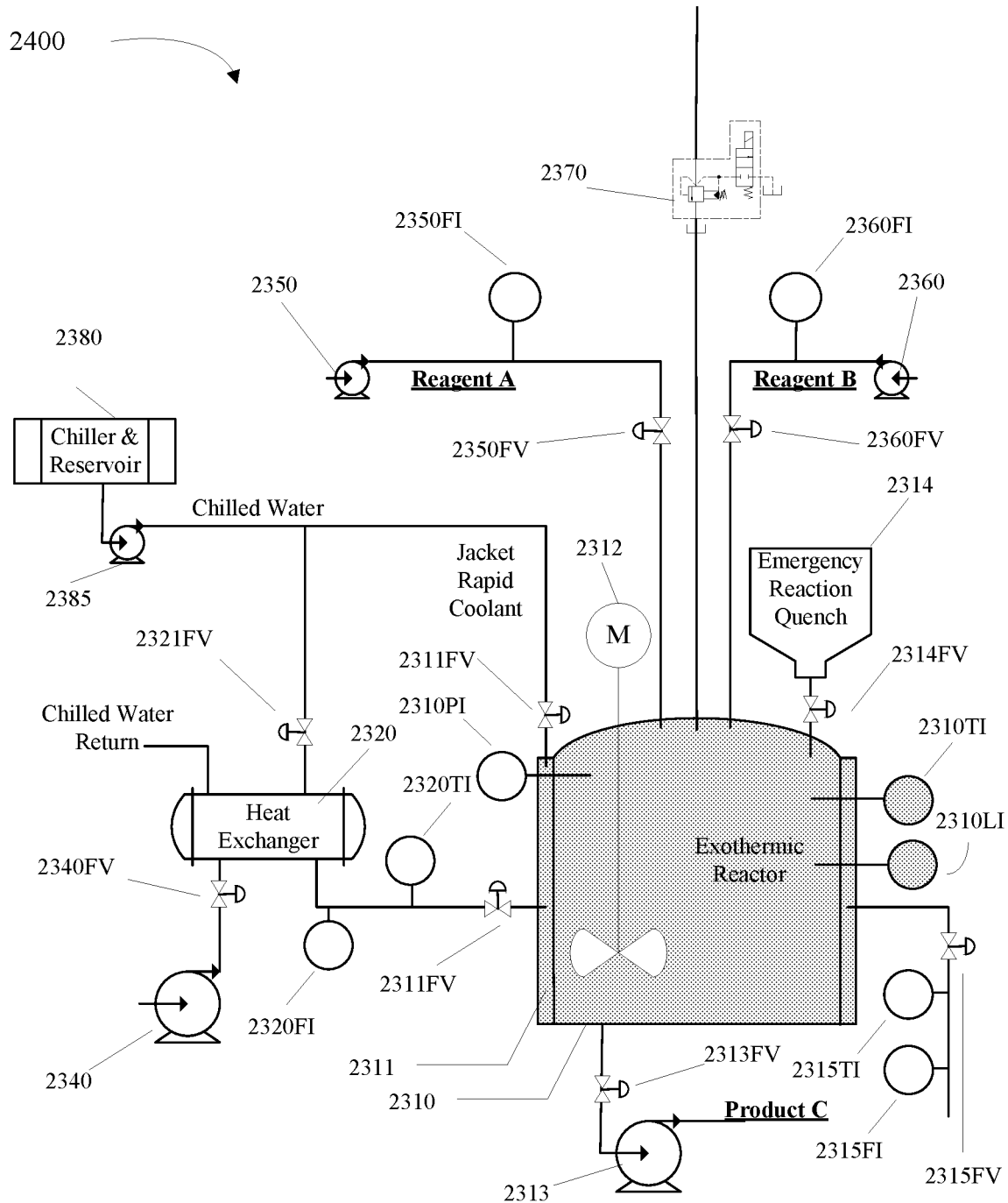

FIG. 24 is a diagram illustrating an industrial process examples in accordance with various embodiments of the present disclosure. An example exothermic reactor unit that is used for patent applications and other design documents. As one of many examples, the exothermic reactor 2310, reactor jacket 2311, temperature indicator 2310TI, and 2310LI are equipment that comprise a single asset, named the reactor asset. Other smart assets exist as illustrated in FIG. 23 and have been identified and characterized as part of an Integrated Smart Asset Control System, which for example purposes include a chiller asset 2380, heat exchanger asset 2320, reagent A 2350 and B 2360, product C 2313, emergency quench 2314, agitator 2312, and effluent 2315 asset. It is to be understood for the purposes the following examples as illustrated by the figures, the features and functionality are achieved and executed by an operational Integrated Smart Asset Control System developed from a Hierarchical Assets Control Applications and corresponding control hardware developed for the underlying equipment elements discussed with regards to FIG. 23.

As part of the ongoing real time optimization of the entire Hierarchical Asset Control Application, constraints for safety 2410, reliability 2420, and environment 2430 are determined on each individual asset. Parameters for each asset constraint are derived by a user or the system as described above and are specific to the equipment which composes the asset, application, and real time and historic data. As one of many possible examples, environmental constraints for the water output to the effluent may require per EPA guidelines a temperature range of 35 to 65 degrees Celsius and a maximum of 5 gallons per minute. All constraints are derived at the asset level for the reactor asset, and all other smart assets in the application. As detailed in FIGS. 20A and 20B, each individual asset constraint set is derived and transmitted to their parent asset, until the unit level asset.

An optimal objective point is input to the system. An example may be to produce 10,000 pounds of Product C per day utilizing a continuous operation. For the present example the objective to be optimized is profit which can be calculated knowing various parameters such as the various parameters regarding operational overhead and the profit per pound of Product C.

In addition to the objective to be optimized, constraint limits for optimal values are input into the system. The current operation point and the current constraints have now been derived. Each constraint and objective known to the system, a normalization of all constraints and objectives is necessary to perform an optimization. Once this normalization is complete, a zone of application operation will be known, as will the optimization point for the application at the particular point in time the measurements were taken from the application.

Figure 25:
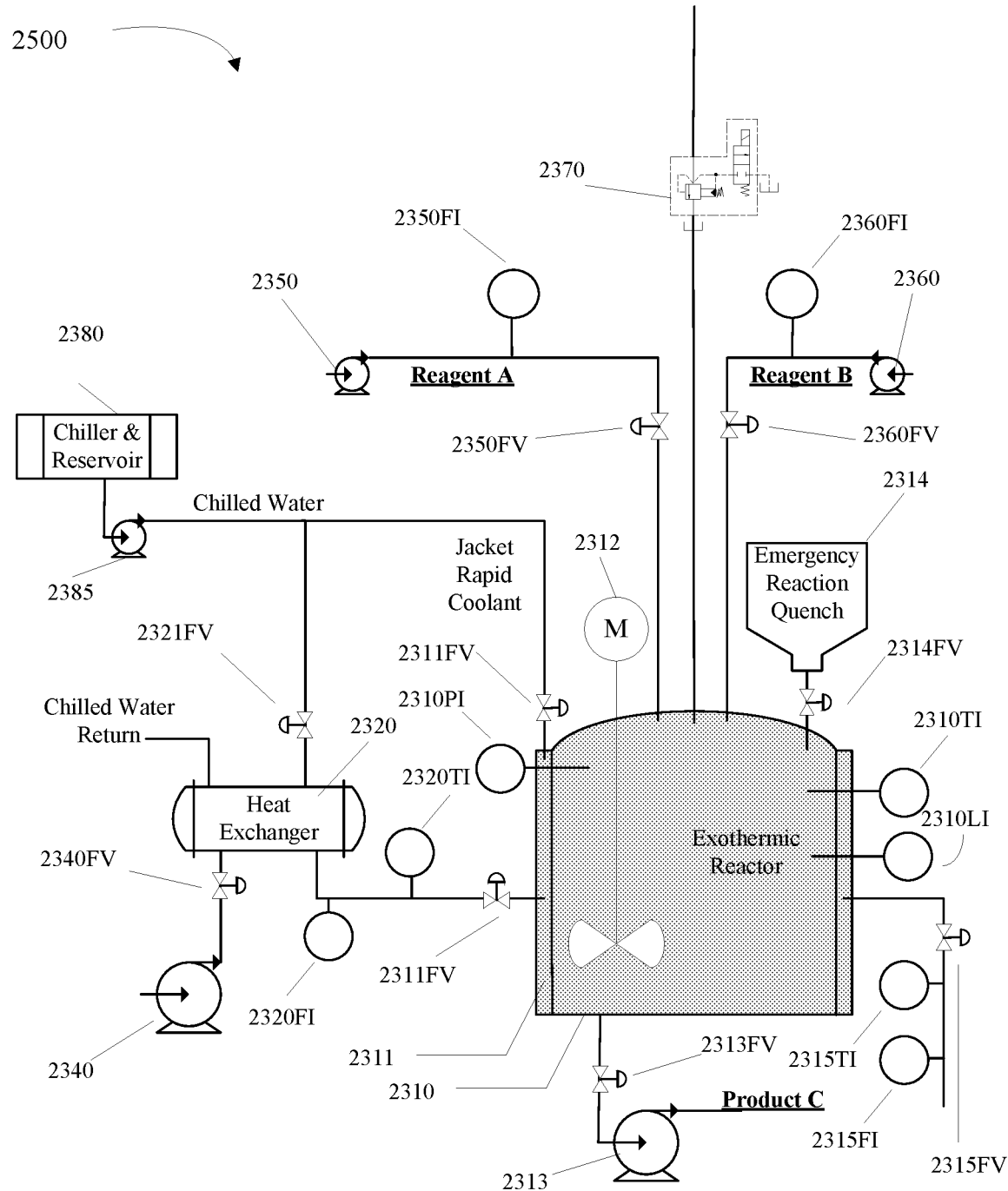
FIG. 25 is a diagram illustrating various aspects of an example of developing a hierarchy of intelligent agents for a Hierarchical Asset Control Application in accordance with various embodiments of the present disclosure.

With the present state and the optimal state now known an optimization can be derived. FIG. 25 is a diagram illustrating various examples of determining an optimization of a hierarchical industrial asset set in accordance with various embodiments of the present disclosure.

Once all the constraints have been derived and input into the Hierarchical Asset Control Application 2510 based on real time monitoring of the complete application, and normalized 2520 as described in FIGS. 18A and 18B, the current state, process operation area, and optimal state are known and an optimization for the given constraints and objectives can be derived 2530.

Figure 26:
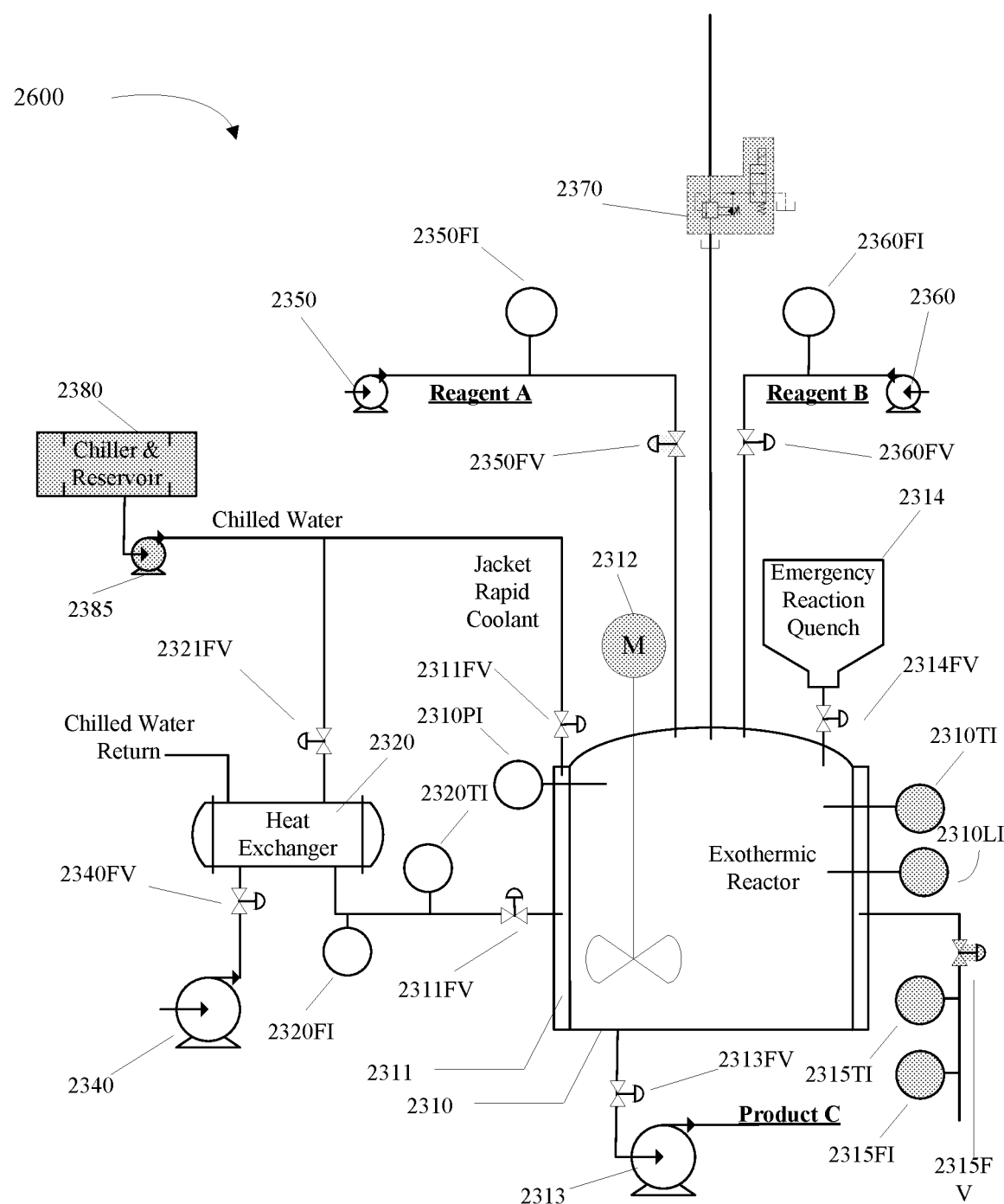
FIG. 26 is a diagram illustrating various aspects of an example of developing a hierarchy of intelligent agents for a Hierarchical Asset Control Application in accordance with various embodiments of the present disclosure.

FIG. 26 is a diagram illustrating various examples of adjusting a hierarchical industrial asset set to effect the change of the application to the optimal point of operation. In the present example, a derived optimization may include, introducing chilled water from the chiller 2380 asset to the reactor jacket 2311 as the temperature in the exothermic reactor is too high to meet the environmental constrains, per the temperature indicator 2310TI. Further, the agitator 2312 asset may be activated on the reactor jacket 2311 effluent purge via the flow valve 2315FV to further assure the effluent temperature is within the constraint range. Finally, to meet the gallons per minute requirement, both the temperature 2315TI and flow rate 2315FI will be monitored and the effluent closed via the valve 2315FV as needed.

An optimized characteristic has been derived 2610 and is transmitted throughout the smart assets, groups of smart assets or other smart asset groupings. From the example above a control optimization to the Integrated Smart Asset Control System 2620 may include a control to pump chill water 2385 at a rate of 5 gallons per minute, while opening the reactor jacket flow valve 2311FV to allow the warmer reaction jacket water to purge through the associated flow valve 2115FV. This optimization may, for example, be allowed to continue for a period of time and verified optimal 2630 through the real time analysis of the complete Integrated Smart Asset Control System.

In this way, as is contemplated in embodiments of this disclosure an Integrated Smart Asset Control System may operate and be optimized in real time for any selected set of objectives and constraints while the industrial process operator, business, or ever evolving industry determines beneficial.

5. Example Features or Aspects of the Asset Control System

Various example features or aspects of the asset control system in accordance with some embodiments of the present disclosure are provided below.

In some embodiments, the asset control system provides a full autonomous or semi-autonomous control system for each asset within industrial plants.

In some embodiments, lower level equipment asset control systems are preconfigured by equipment suppliers.

In some embodiments, automatic control system of systems configured as avatars or intelligent agents at lower levels automatically connect with and morph into avatars at the higher levels.

In some embodiments, configuration is simplified with configuration at each level only involving the specific functionality at that level.

In some embodiments, control from real-time process control for efficiency improvement is extended to real-time process control for efficiency, reliability, safety risk, environmental risk, security risk and profitability improvements.

In some embodiments, system-ness is enforced at each upper level avatar or intelligent agent.

In some embodiments, each intelligent agent provides a full complement of functionality associated with the level of asset or asset set associated with the intelligent agent, including, but not limited to: monitoring, contextual analytics, asset performance control, asset optimization, asset security, and/or asset history (operational, maintenance, performance).

In some embodiments, dynamic business processes (profitability etc.) are treated in the same manner as dynamic physical processes.

In some embodiments, granularity of control is reduced to one, and such a single loop granularity gives unprecedented scalability.

In some embodiments, the asset control system has single loop integrity and any failure needs only a single loop back-up.

In some embodiments, power needs are provided by energy harvesters which can be a component of the smart asset or CPS. The energy harvesters can extract energy from the ambient environment (e.g., vibration).

In some embodiments, the asset control system is self-identified and configured. In the asset control system, each equipment asset can be provided with a CPS and associated intelligent agent by the equipment supplier. When the intelligent agent is connected into a larger asset control system it provides a logical and unique intelligent agent identifier which identifies it to the system.

In some embodiments, control and asset management are embedded within the actual asset, and not "stuck-on" as is typical for traditional process control.

In some embodiments, the physical process devices or smart assets model themselves. There is no artificial equipment model that is needed to mimic the smart assets. The smart assets model themselves.

In some embodiments, the asset becomes as "controlled" as an asset as processes normally are.

In some embodiments, the necessary sensing/measurement are combined with control, output/actuation and asset management in same resource in the asset itself In some embodiments, control and asset management are "clustered" (in a common communication "fog") around clusters of process devices as they naturally exist.

In some embodiments, the device vendors provide control algorithms and asset performance management for their equipment smart assets. Dumb process devices or smart assets can be given intelligence to both control itself and monitor its own health. This can apply to devices or smart assets as dumb as a simple length of pipe. In some embodiments, any asset can be given this intelligence via the techniques disclosed in the present disclosure.

In some embodiments, "control" is sold with the equipment itself, not "added-on."

In some embodiments, at least the intelligent agent can be downloaded to the smart assets later on.

In some embodiments, asset performance intelligence is provided by the vendor.

In some embodiments, wiring for connectivity as well as networking is completely eliminated.

In some embodiments, the definition of "control" is extended to operational control to set and meet financial forecast metrics just like a control loop except that business value performance metrics are controlled, not just process parameters.

In some embodiments, control is distributed to devices or assets and is powered by harvested power, communicating on a wireless cloud of combined meshes, operating within a unifying systems framework.

In some embodiments, control is no longer "stuck on." It is in situ, part of the process.

In some embodiments, a plant models itself and the control represents the actual plant.

In some embodiments, the asset control system provides maximum reliability and resiliency at lowest possible cost.

In some embodiments, control is extended from the process to the business.

In some embodiments, the Internet of Things is applied to industrial process control for its functionality, not just connectivity.

6. Computer Systemization

Figure 27:
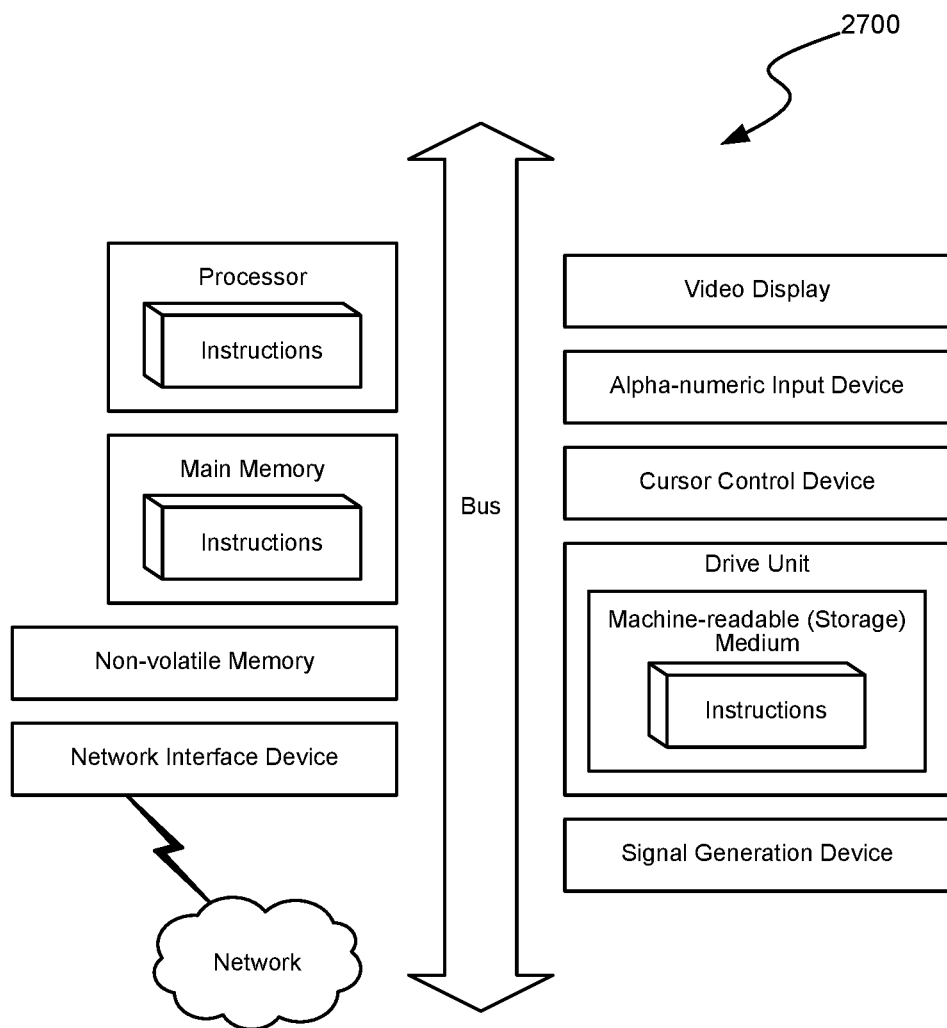
FIG. 27 shows a diagrammatic representation of a machine in the example form of a computer system within which a set of instructions, for causing the machine to perform any one or more of the methodologies discussed herein, may be executed.

FIG. 27 shows a diagrammatic representation of a machine in the example form of a computer system within which a set of instructions, for causing the machine to perform any one or more of the methodologies discussed herein, may be executed.

In the example of FIG. 27, the computer system 2700 includes a processor, main memory, non-volatile memory, and an interface device. Various common components (e.g., cache memory) are omitted for illustrative simplicity. The computer system 2700 is intended to illustrate a hardware device on which any of the components and methods depicted in this disclosure. For example, the processor unit 1400, 1500, 1600, 1700, 1800 depicted in FIGS. 14A, 15A, 16A, 17A, 18A respectively can be a hardware device such as a processor or a computer system capable of performing computations, calculations, processing, and/or the like to perform the tasks described herein. The computer system 2700 can be of any applicable known or convenient type. The components of the computer system 2700 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 2800. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in their respective interface.

In operation, the computer system 2700 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the present disclosure is not limited except as by the appended claims.

We claim:

1. A method of Integrated Smart Asset Control System optimization of an industrial system, performed by a system controller, comprising:

accessing, a smart asset grouping which defines a plurality of parent/child equipment element control relationships from an Integrated Smart Asset Control System, wherein the smart asset grouping includes one or more Intelligent Agents aggregated from one or more intelligent asset templates associated with the smart asset grouping, wherein the intelligent asset templates include smart asset specific data;

accessing, utilizing a parent equipment element, a plurality of operational constraint parameters and a plurality of operational objective parameters associated with an asset within the Integrated Smart Asset Control System;

developing, utilizing the parent equipment element, multi-faceted dynamic process constraints utilizing the plurality of operational constraint parameters and the plurality of operational objective parameters associated with the Integrated Smart Asset Control System;

evaluating, utilizing the parent equipment element, a multi-faceted dynamic process constraint model to balance operational process constraints based on one or more process objectives;

determining, utilizing the parent equipment element, an optimized process operation point for the multi-faceted dynamic process constraint model;

determining, utilizing the parent equipment element, a Hierarchical Asset Control action utilizing the optimized process operation point;

communicating, the Hierarchical Asset Control action utilizing the parent equipment element to a plurality of associated child equipment elements and associated Intelligent Agents; and executing autonomously, utilizing control functions of the one or more Intelligent Agents corresponding to the smart asset grouping associated with the plurality of associated child equipment elements and, the Hierarchical Asset Control action to transition from current operational values to operational values to achieve the balanced operational constraints.

2. The method of claim 1, wherein the operational constraints are developed by a smart asset associated with a smart asset group within the Integrated Smart Asset Control System.

3. The method of claim 1, wherein the Hierarchical Asset Control actions effectuate control change of a smart asset associated with the Integrated Smart Asset Control System.

4. The method of claim 1, wherein determining the optimized process operation point is based on a reliability, safety, and environmental process operational constraints.

5. The method of claim 4, wherein the optimized process operation point is determined based on asset constraint aggregation across each smart asset in a smart asset grouping.

6. The method of claim 4, wherein the reliability process operational constraint is determined for the smart asset set utilizing a reliability risk model.

7. The method of claim 6, wherein the reliability constraint is defined as: RT Reliability Risk=MAX (Operational Reliability Risk, Conditional Reliability Risk, Reliability Safety Risk).

8. The method of claim 4, wherein the environmental constraint is determined for the smart asset set utilizing an environmental risk model.

9. The method of claim 8, wherein the reliability constraint is defined as: RT Environmental Risk=MAX (Operational Environmental Risk, Conditional Environmental Risk, Reliability Environmental Risk.

10. The method of claim 4, wherein the safety constraint is determined for the smart asset set utilizing a safety risk model.

11. The method of claim 10, wherein the reliability constraint is defined as: RT Safety Risk=MAX (Operational Safety Risk, Conditional Safety Risk, Reliability Safety Risk).

12. The method of claim 4, wherein access to a smart asset is dynamically controlled based on aggregated security data.

13. The method of claim 12, wherein the aggregated security data includes both Integrated Smart Asset Control System specific and external security data.

14. The method of claim 1, wherein determining an optimized process operation point is derived utilizing linear analysis.

15. The method of claim 1, wherein the development of the multi-faceted process constraint is derived utilizing non-linear analysis.

16. The method of claim 1, wherein the Hierarchical Smart Asset control action instructs a parametric operational state for a smart asset or group of smart assets.

17. The method of claim 1, wherein the Hierarchical Smart Asset action instructs a parametric operational set point for a smart asset or group of smart assets.

18. The method of claim 1, wherein the Hierarchical Smart Asset control action instructs a parametric operational constraint threshold for a smart asset or group of smart assets.

19. The method of claim 1, wherein accessing the plurality of operational constraint parameters and the plurality of operational objective parameters associated with a Hierarchical Smart Asset system/group is retrieved from a data store.

20. The method of claim 19, wherein the operational process parameters include historic or real time data.

21. The method of claim 1, further comprising:
utilizing aggregated smart asset operational data to improve efficiency and process command selections.

22. The method of claim 1, wherein the Integrated Smart Asset Control System is an associated hierarchical arrangement of operationally optimizable asset control relationships for a Hierarchical Asset Control Application.

23. The method of claim 1, wherein the Integrated Smart Asset Control System is integrated with one or more assets and their corresponding control hardware.

24. The method of claim 1, wherein the one or more Intelligent Agents includes one or more (i) Real-Time (RT) Profitability Controller, (ii) Real-Time Process Efficiency Controller, (iii) Coordinator Module, (iv) RT Environmental Risk Controller, (v) RT Safety Risk Controller, (vi) RT Reliability Risk Controller, (vii) RT Security Risk Controller, (viii) Historization Module, or (ix) Small Data Analytics Engine.

25. The method of claim 1, wherein the smart asset specific data includes one or more (i) suggested asset interconnects with assets, (ii) operational constraints, (iii) operational objectives, (iv) high availability/criticality parameters, or (v) industry specific industrial applications.

26. A system of Integrated Smart Asset Control System optimization of an industrial system, performed by a system controller, comprising:

accessing, with a processor, a smart asset grouping which defines a plurality of parent/child equipment element control relationships from an Integrated Smart Asset Control System, wherein the smart asset grouping includes one or more Intelligent Agents aggregated from one or more intelligent asset templates associated with the smart asset grouping, wherein the intelligent asset templates include smart asset specific data;

accessing, with the processor, utilizing a parent equipment element, a plurality of operational constraint parameters and a plurality of operational objective parameters associated with an asset within the Integrated Smart Asset Control System;

developing, with the processor, utilizing the parent equipment element, multi-faceted dynamic process constraints utilizing the plurality of operational constraint parameters and the plurality of operational objective parameters associated with the Integrated Smart Asset Control System;

evaluating, with the processor, utilizing the parent equipment element, a multi-faceted dynamic process constraint model to balance operational process constraints based on one or more process objectives;

determining, with the processor, utilizing the parent equipment element, an optimized process operation point for the multi-faceted dynamic process constraint model;

determining, with the processor, utilizing the parent equipment element, a Hierarchical Smart Asset control action utilizing the optimized process operation point;

communicating, with the processor, the Hierarchical Asset Control action utilizing the parent equipment element to a plurality of associated child equipment elements and associated Intelligent Agents; and executing autonomously, with the processor, utilizing control functions of the one or more Intelligent Agents associated with the smart asset grouping associated with the plurality of associated child equipment elements and, the Hierarchical Smart Asset control action to transition from current operational values to operational values to achieve the balanced operational constraints.

27. The system of claim 26, wherein the operational constraints are developed by a smart asset associated with a smart asset group within the Integrated Smart Asset Control System.

28. The system of claim 26, wherein the Hierarchical Asset Control actions effectuate control change of a smart asset associated with the Integrated Smart Asset Control System.

29. The system of claim 26, wherein determining the optimized process operation point is based on a reliability, safety, and environmental process operational constraints.

30. The system of claim 29, wherein the optimized process operation point is determined based on asset constraint aggregation across each smart asset in a smart asset grouping.

31. The system of claim 29, wherein the reliability process operational constraint is determined for the smart asset set utilizing a reliability risk model.

32. The system of claim 31, wherein the reliability constraint is defined as: RT Reliability Risk=MAX (Operational Reliability Risk, Conditional Reliability Risk, Reliability Safety Risk).

33. The system of claim 29, wherein the environmental constraint is determined for the smart asset set utilizing an environmental risk model.

34. The system of claim 33, wherein the reliability constraint is defined as: RT Environmental Risk=MAX (Operational Environmental Risk, Conditional Environmental Risk, Reliability Environmental Risk).

35. The system of claim 29, wherein the safety constraint is determined for the smart asset set utilizing a safety risk model.

36. The system of claim 35, wherein the reliability constraint is defined as: RT Safety Risk=MAX (Operational Safety Risk, Conditional Safety Risk, Reliability Safety Risk).

37. The system of claim 29, wherein access to a smart asset is dynamically controlled based on aggregated security data.

38. The system of claim 37, wherein the aggregated security data includes both Integrated Smart Asset Control System specific and external security data.

39. The system of claim 26, wherein determining an optimized process operation point is derived utilizing linear analysis.

40. The system of claim 26, wherein the development of the multi-faceted process constraint is derived utilizing non-linear analysis.

41. The system of claim 26, wherein the Hierarchical Smart Asset control action instructs a parametric operational state for a smart asset or group of smart assets.

42. The system of claim 26, wherein the Hierarchical Smart Asset control action instructs a parametric operational set point for a smart asset or group of smart assets.

43. The system of claim 26, wherein the Hierarchical Smart Asset control action instructs a parametric operational constraint threshold for a smart asset or group of smart assets.

44. The system of claim 26, wherein accessing the plurality of operational constraint parameters and the plurality of operational objective parameters associated with a Hierarchical Smart Asset system/group is retrieved from a data store.

45. The system of claim 44, wherein the operational process parameters include historic or real time data.

46. The system of claim 26, further comprising:
utilizing aggregated smart asset operational data to improve efficiency or prospective process command selections.

47. The method of claim 26, wherein the Integrated Smart Asset Control System is an associated hierarchical arrangement of operationally optimizable asset control relationships for a Hierarchical Asset Control Application.

48. The method of claim 26, wherein the Integrated Smart Asset Control System is integrated with one or more assets and their corresponding control hardware.

49. The system of claim 26, wherein the one or more Intelligent Agents includes one or more (i) Real-Time (RT) Profitability Controller, (ii) Real-Time Process Efficiency Controller, (iii) Coordinator Module, (iv) RT Environmental Risk Controller, (v) RT Safety Risk Controller, (vi) RT Reliability Risk Controller, (vii) RT Security Risk Controller, (viii) Historization Module, or (ix) Small Data Analytics Engine.

50. The system of claim 26, wherein the smart asset specific data includes one or more (i) suggested asset interconnects with assets, (ii) operational constraints, (iii) operational objectives, (iv) high availability/criticality parameters, or (v) industry specific industrial applications.

51. A method of Integrated Smart Asset Control System optimization of an industrial system, performed by a system controller, comprising:
accessing, a smart asset grouping which defines a plurality of parent/child equipment element control relationships from an Integrated Smart Asset Control System, wherein the smart asset grouping includes one or more Intelligent Agents aggregated from one or more intelligent asset templates associated with the smart asset grouping, wherein the intelligent asset templates include smart asset specific data;
accessing a plurality of operational constraint parameters and a plurality of operational objective parameters associated with an asset within an Integrated Smart Asset Control System;
developing multi-faceted dynamic constraints at a smart asset level utilizing the plurality of operational constraint parameters and the plurality of operational objective parameters associated with an automation operational process of the Integrated Smart Asset Control System;
evaluating multi-faceted dynamic process constraint model for the smart asset to balance operational process constraints based on one or more process objectives;
determining an optimized process operation point for the smart asset for the multi-faceted dynamic process constraint model;
transmitting data elements request by a parent used in part by the parent to determine a smart asset control action for an associated child smart asset and associated Intelligent Agents;
receiving a smart asset control action generated from the optimized process operation point; and
executing autonomously the smart asset control action utilizing control functions of the associated Intelligent Agents associated with the smart asset grouping to transition from current operational values to operational values to achieve the balanced operational constraints.

52. The method of claim 51, wherein the one or more Intelligent Agents includes one or more (i) Real-Time (RT) Profitability Controller, (ii) Real-Time Process Efficiency Controller, (iii) Coordinator Module, (iv) RT Environmental Risk Controller, (v) RT Safety Risk Controller, (vi) RT Reliability Risk Controller, (vii) RT Security Risk Controller, (viii) Historization Module, or (ix) Small Data Analytics Engine.

53. The method of claim 51, wherein the smart asset specific data includes one or more (i) suggested asset interconnects with assets, (ii) operational constraints, (iii) operational objectives, (iv) high availability/criticality parameters, or (v) industry specific industrial applications.

* * * * *